United States Patent [19]

Nakano et al.

[11] Patent Number: 5,398,086
[45] Date of Patent: Mar. 14, 1995

[54] PROJECTION TYPE DISPLAY DEVICE

[75] Inventors: Masaaki Nakano; Syuji Iwata; Naoki Shiramatsu; Kunihumi Nakanishi, all of Hyogo, Japan

[73] Assignee: Mitsubishi Denki Kabushiki Kaisha, Tokyo, Japan

[21] Appl. No.: 949,859

[22] PCT Filed: Mar. 19, 1992

[86] PCT No.: PCT/JP92/00342
§ 371 Date: Jan. 19, 1993
§ 102(e) Date: Jan. 19, 1993

[87] PCT Pub. No.: WO92/16872
PCT Pub. Date: Jan. 10, 1992

[30] Foreign Application Priority Data

Mar. 20, 1991 [JP] Japan .................. 3-056776
Mar. 29, 1991 [JP] Japan .................. 3-066411
Aug. 19, 1991 [JP] Japan .................. 3-206829

[51] Int. Cl.6 ............................................. G03B 21/00
[52] U.S. Cl. .......................................... 353/31; 353/37; 359/47; 359/48
[58] Field of Search ............... 353/31, 34, 37, 94, 353/102, 97; 359/47, 48; 358/60, 64, 65, 231, 237, 242, 250, 253

[56] References Cited

U.S. PATENT DOCUMENTS

| 4,544,237 | 10/1985 | Gagnon | 353/31 |
|---|---|---|---|
| 4,826,293 | 5/1989 | Grinberg et al. | 359/47 |
| 5,121,233 | 6/1992 | Spencer et al. | 359/48 |
| 5,135,300 | 8/1992 | Toide et al. | 359/48 |

FOREIGN PATENT DOCUMENTS 52-53633 4/1977 Japan .
1-128689 5/1989 Japan .
2-83523 6/1990 Japan .

Primary Examiner—William A. Cuchlinski, Jr.
Assistant Examiner—William C. Dowling
Attorney, Agent, or Firm—Burns, Doane, Swecker & Mathis

[57] ABSTRACT

The projection type display device includes a light source tube having electron beam generation means and a light-emitting portion consisting of a fluorescent layer emitting light by means of electron beam excitation, a light valve for forming an optical image corresponding to a picture signal, and an optical system for projecting upon a screen the optical image of the light valve by means of the light irradiated from the light source tube. The convex lens is disposed between the light valve and the light-emitting portion, such that the diffusing light emitted from the light emitting portion is condensed toward the light valve. As a result, the diffusing light from the light-emitting portion having a smaller area than the area of the light valve is supplied to the light valve in a substantially parallel beam. Further, the reflection layer for reflecting and condensing the diffusing light emitted from the light-emitting portion toward the light valve may be provided. Furthermore, the projection type display device includes a light source tube including within a single housing an electron beam generation means and a plurality of light emitting portions consisting of fluorescent layers emitting light of distinct colors, respectively, by means of electron beam excitation, light valves for forming optical images corresponding to picture signals of the respective colors, and a prism for synthesizing optical images of distinct colors of the light valves made by a plurality of light beams irradiated from the light source.

19 Claims, 25 Drawing Sheets

PROJECTION TYPE DISPLAY DEVICE

TECHNICAL FIELD

This invention relates to a projection type display device for irradiating the optical image formed by a light valve by means of an irradiation light beam and for projecting the optical image on a screen by means of a projection lens, and more particularly to the light source thereof.

BACKGROUND ART

Conventionally, the following method is well known for displaying a large screen image. Namely, the optical images corresponding to picture signals of respective colors are formed upon liquid crystal light valves of red, green and blue, and the optical images are irradiated with the red, green and blue lights segregated from a white light source such as a halogen lamp. Then the images are synthesized and are projected upon a screen by means of a projection lens. However, if a halogen lamp is used as a light source, a great amount of power is consumed and most of it is converted into heat. Thus there arises the problem of heat dissipation and hence the reduction of the size and the cost of the device is rendered difficult since an optical system for separating the white light into red, green and blue becomes necessary.

Thus, as a projection type display device for solving the above problems, a device shown in Japanese Laid-Open Patent (Kokai) No. 1-128689 is proposed. FIG. 47 is a structural diagram showing the conventional projection type display device disclosed in Japanese Laid-Open Patent (Kokai) No. 1-128689. In FIG. 47, the reference numeral 101 represents a red light source tube for emitting red light; the reference numeral 102 represents a green light source tube for emitting green light; and the reference numeral 103 represents a blue light source tube for emitting blue light. Each of the light source tubes of respective colors consists of a CRT type light source tube capable of emitting light of a single color. Further, the reference numeral 104 represents red light valve for modulating red light; the reference numeral 105 represents green light valve for modulating green light; and the reference numeral 106 represents blue light valve for modulating blue light. The reference numeral 107 represents a synthesis prism for synthesizing the modulated red, green and blue light beams. The projection lens 108 projects the synthesized light. The light-emitting portions of the light source tube of the respective colors have dimensions sufficient to cover the image forming portions of the liquid crystal light valves 104, 105, and 106.

Further, FIG. 48 is an enlarged sectional view of a CRT type light source tube constituting the light source tubes for the respective colors. The CRT type light source tube of FIG. 48 has a structure similar to that of a cathode ray tube (CRT), and includes a heater 50, a cathode 49, a first grid 44, a second grid 43, a third grid 42, and an over-convergence lens 48 accommodated within a glass bulb 46. On the front interior surface of the glass bulb 46 is formed a fluorescent surface 41. Further, upon the interior surface of the fluorescent surface 41 is formed an aluminum back layer 51 which serves as a high voltage electrode for acceleration. Furthermore, the glass bulb 46 is attached to the base portion 45, and the various electrodes are connected to the exterior via the base portion 45.

Next, the operation is described.

In the case of the CRT type light source tube of FIG. 48, the heater 50 is heated and appropriate voltages are applied on the first grid 44, the second grid 43, and the third grid 42, thereby forming an over-convergence lens 48 by means of the respective grids. A high voltage of about 10 KV is applied to the aluminum back layer 51. As a result, the electron beam 47 emitted from the cathode 49 is over-converged and then is accelerated and projected upon the fluorescent surface, which then emits visible light.

Thus, the red light is emitted from the red light source tube 101 and an image of the red component is displayed on the red light valve 104. The image of the red light transmitted through the red light valve 104 is reflected by the synthesis prism 107. The green light is emitted from the green light source tube 102 and an image of the green component is displayed on the green light valve 105. The image of the green light transmitted through the green light valve 105 is transmitted through the synthesis prism 107. The blue light is emitted from the blue light source tube 103 and an image of the blue component is displayed on the blue light valve 106. The image of the blue light transmitted through the blue light valve 106 is reflected by the synthesis prism 107. The image thus synthesized by the synthesis prism 107 is magnified by the projection lens 108 and the projection light 109 is projected on a screen (not shown).

Since the conventional projection type display device has a structure as described above, there exists a gap between the respective light valves and the light source tubes. Thus most of the light emitted from the light source, which is completely diffusing, fails to arrive on the light valves and the projection lens, and thus is not guided to the screen. As a result, the utilization efficiency of the emitted light is low.

DISCLOSURE OF THE INVENTION

This invention has been done to solve the above problems, and aims at guiding most of the emitted light to the light valves, the projection lens and the screen. A further object is to provide a small and low-cost projection type display device of high reliability by which the number-of parts and the number of the high voltage wirings are reduced.

The first projection type display device according to this invention includes: a light source tube including electron beam generation means and a light-emitting portion consisting of a fluorescent layer emitting light by means of electron beam excitation; a light valve for forming an optical image corresponding to a picture signal; and an optical system for projecting upon a screen the optical image of the light valve; wherein the projection type display device is characterized in that a light-condensing optical system for condensing the diffusing light emitted from the light-emitting portion toward the light valve is disposed between the light valve and the light-emitting portion. It is preferred that the area of the light-emitting portion is less than the area of the light valve.

The light-condensing optical system includes a convex lens for condensing the light from the light-emitting portion. It is preferred that the surface of this convex lens at the side of the light valve has the form of an ellipsoid of revolution. It is further preferred that this convex lens is a plano-convex lens disposed adjacent to the light source tube, which has the planar surface at the side facing the light source tube and the convex surface at the side facing the light valve. Under this circumstance, it is preferred that the plano-convex lens has the form of a cone by which the cross-sectional area perpendicular to the optical axis at the side of the light valve decreases in a direction away from the convex side toward the planar side.

Furthermore, the light-condensing optical system may include reflection means for reflecting the diffusing light emitted from the light-emitting portion and for condensing the light toward the light valve. It is preferred that this reflection means is disposed between the light-emitting portion and the the convex lens to oppose the light-emitting portion, and is provided with a reflection layer having an aperture centered at the optical axis of the convex lens. Further, the reflection layer is preferred to have the form of a paraboloid of rotation. Further, the light-emitting portion may be formed into a concave surface with respect to the aperture. Furthermore, an interference multi-layer film may be disposed on the front portion of the fluorescent layer.

The second projection type display device according to this invention includes: a light source tube including within a single housing an electron beam generation means and a plurality of light-emitting portions consisting of fluorescent layers emitting light of distinct colors, respectively, by means of electron beam excitation; light valves for forming optical images corresponding to picture signals of the respective colors; an optical element for synthesizing optical images of distinct colors of the light valves made by a plurality of light beams irradiated from the light source; and an optical system for guiding the light synthesized by the optical element to a screen. In this case, it is preferred that the light source tube includes: a first control means for adjusting the light-emitting luminance of all colors simultaneously, and a second control means for adjusting the light-emitting luminance of respective colors independently.

It is further preferred that the characteristics of the first and the second projection type display device are combined, such that the light-condensing optical system for condensing the diffusing light emitted from the plurality of light-emitting portions to the light valves, respectively, is disposed between the light valves and the light-emitting portion. The light-condensing optical system may include a plurality of convex lenses disposed respectively on the light source tube opposing the light valves in alignment with the positions of the plurality of light-emitting portions. Further, the light-condensing optical system may include reflection means for reflecting the diffusing light emitted from the plurality of light-emitting portions, and for condensing the light toward the light valves. In such case, the reflection means is preferred to be disposed between the plurality of light-emitting portions and the plurality of convex lenses to oppose the light-emitting portions, the reflection means being provided with reflection layers having a plurality of apertures centered at the optical axes of respective convex lenses. Further, the plurality of light-emitting portions emitting lights of distinct colors may be divided into a plurality of matrix forms, and the plurality of convex lenses are each provided with a matrix-shaped lens array corresponding to respective light-emitting portions divided into the plurality of matrix forms.

BRIEF DESCRIPTION OF THE DRAWINGS

FIG. 15 (b) is a front view of the lens of FIG. (a);

FIG. 28 is a perspective view of the three-color complex light source tube of FIG. 27;

DESCRIPTION OF THE PREFERRED EMBODIMENTS

FUNDAMENTAL STRUCTURE OF LIGHT SOURCE OPTICAL SYSTEM

Figure 1:
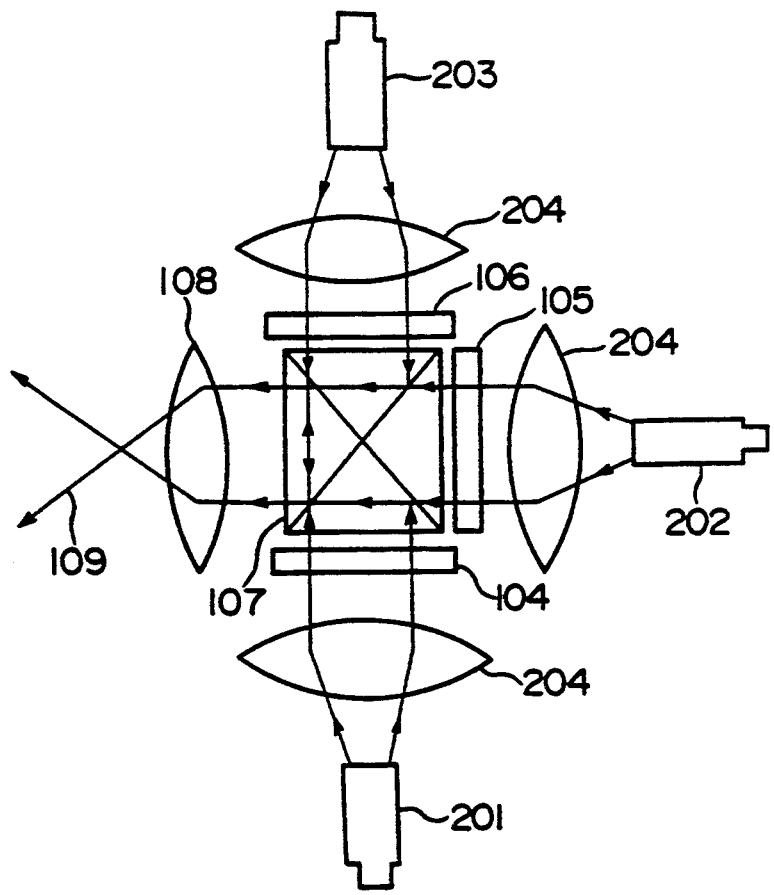
FIG. 1 is a side view showing the Fundamental structure of the projection type display device according to this invention.

FIG. 1 shows the fundamental structure of the light source optical system of the projection type display device according to this invention. The reference numerals 104, 105, 106, 107, 108 and 109 represent, respectively, red liquid crystal light valve, green light valve, blue light valve, synthesis prism, projection lens, and projection light, which are identical to those of the above conventional device.

The reference numeral 201 represents red light source tube for emitting red light; the reference numeral 202 represents green light source tube for emitting green light; and the reference numeral 203 represents blue light source tube for emitting blue light. The respective light source tubes are CRT type light source tubes capable of emitting light of a single color as that of the conventional device. However, the light-emitting area is less than the area of the light valve. Further, the optical lenses 204 are disposed between the light source tubes of respective colors and the light valves of respective colors.

Figure 2:
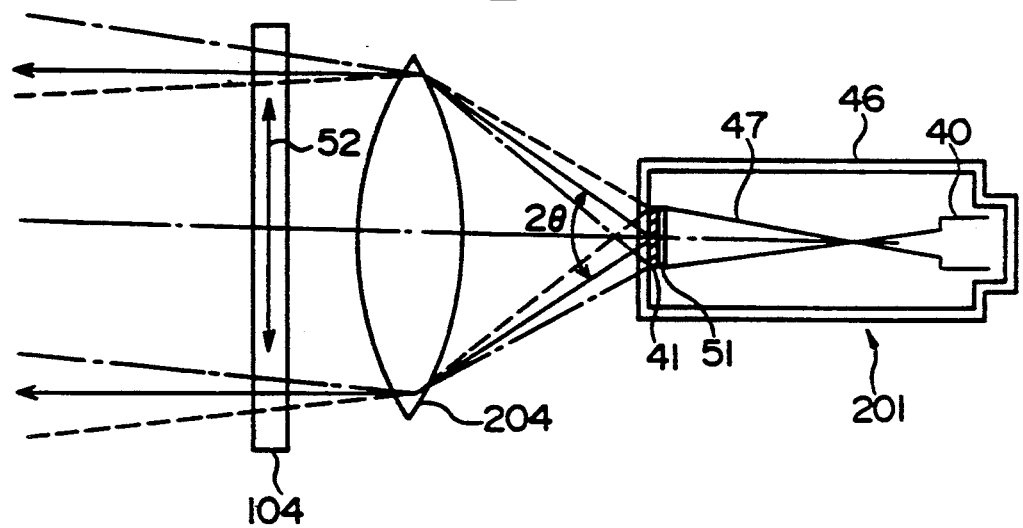
FIG. 2 is a sectional view showing the detailed structure around the light source tube of the projection type display device of FIG. 1.

FIG. 2 is a detailed view of a portion of FIG. 1, wherein the reference numeral 104 represents red liquid crystal light valve and the optical lens 204 has an aperture sufficiently great to cover the image forming portion 52 of the red liquid crystal light valve 104. The red light source tube 201 includes a glass bulb 46, within which the electron gun 40 for forming the over-convergent electron beam 47 and the fluorescent surface 41 is disposed. On the surface of the fluorescent surface 41 irradiated by the electron beam 47 is formed the aluminum back layer 51 serving as the high voltage electrode for acceleration. The dimension of the fluorescent surface 41 is smaller than the dimension of the image forming portion 52 of the red liquid crystal light valve 104. The fluorescent surface 41 is applied upon the front panel of the glass bulb 46. Further, the center of the fluorescent surface 41 is aligned with the focus of the optical lens 204.

In the case of the red light source tube 201 of FIG. 2, all the over-convergent electron beam 47 emitted from the electron gun 40 is irradiated upon the whole of tile fluorescent surface 41. It is assumed that the current level of the over-convergent electron beam 47 is constant. Then, as the area of the fluorescent surface 41 is rendered smaller, the density of electrons incident on the fluorescent surface 41 becomes higher, such that the light-emitting luminance of the fluorescent surface 41 increases. Thus, the fluorescent surface 41 of a small area situated at the focal length of the optical lens 204 emits light at a high luminance.

The light emitted from the central portion of the fluorescent surface 41 is emitted to all the half-space situated to the side of the optical lens. The light emitted within the cone of half-apex angle θ is incident on the optical lens 204 and is formed into parallel light, which is incident on the image forming portion 52 of the red liquid crystal light valve 104. Then the light is projected on the screen (not shown) via the synthesis prism 107 and the projection lens 108. Further, the light emitted from the peripheral portion of the fluorescent surface 41 displaced from central portion thereof is emitted to the whole of the half-space to the side of the optical lens 204. This portion of the light incident on the optical lens is refracted into light somewhat deviated from the parallel. However, a portion thereof is incident on the image forming portion 52 of the red liquid crystal light valve 104. Most of the light incident on the image forming portion 52 is projected and displayed upon the screen (not shown) via the synthesis prism 107 and the projection lens 108. Under this circumstance, the luminance of the red liquid crystal light valve 104 as viewed from an arbitrary point within the projection lens 108 through the synthesis prism 107 is equivalent to the case where the fluorescent surface 41 of a small area emitting light at a high luminance is extended over the whole area covering the back of the red liquid crystal light valve 104 and where the optical lens 204 does not exist.

The red light source tube 201 has been described by reference to FIG. 2. The case is the same for the green light source tube 202 and the blue light source tube 203. The light emitted from the fluorescent surface of a small area is incident on the whole of the image forming portion of the liquid crystal light valve 105, 106. Then the light is projected on the screen (not shown) via the synthesis prism 107 and the projection lens 108. It is equivalent to the case where the fluorescent surface of a small area for respective colors emitting light at a high luminance is extended over the whole of the light valve of respective color.

As described above, the electron beam at a constant current level within the light source tube is irradiated in a high concentration upon the light-emitting portion of the fluorescent material of a small area. The light emitted at a high luminance toward the whole of the half-space is condensed by the lens, and is guided to the light valve and the projection lens. Thus the utilization efficiency of light can be enhanced.

Figure 3:
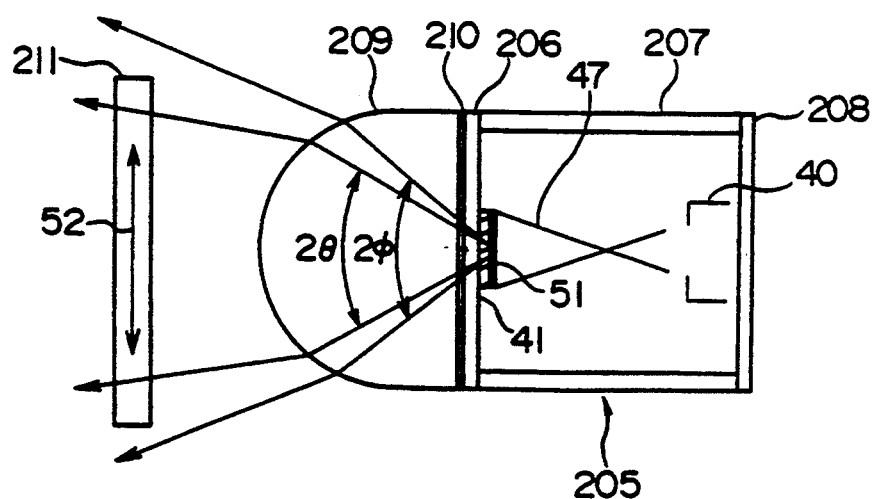
FIG. 3 is a sectional view showing the detailed structure around the light source tube of the projection type display device using a plano-convex lens.

FIG. 3 is a partial view of a projection type display device using a plano-convex lens. In FIG. 3, a CRT type light source tube 205 consists of a front panel 206, a tubular side plate 207, and a back plate 208. The inside of the CRT type light source tube 205 is kept in the vacuum state. Further, on the front panel 206 is formed a fluorescent surface 41 and an aluminum back layer 51. On the back plate 208 is disposed an electron gun 40. The reference numeral 209 represents a plano-convex lens made of molded acrylic resin. The transparent adhesive 210 adheres the plano-convex lens 209 to the front panel 206 without an air gap formed therebetween. On the liquid crystal light valve 211 is formed an image corresponding to the picture signal. The dimension of the fluorescent surface 41 is smaller than the image forming portion 52 of the liquid crystal light valve 211. As in the case of the above embodiment of FIGS. 1 and 2, the electron beam 47 from the electron gun 40 is irradiated upon the whole of the fluorescent surface 41.

In a manner similar to the above embodiment of FIG. 1 and 2, the fluorescent surface 41 of a small area emits light at a high luminance. When viewed microscopically, there exists a gap of refractive index 1 between the fluorescent surface 41 and the front panel 206. Thus, the light emitted from the central portion of the fluorescent surface 41 at high luminance is emitted immediately after the emission to the whole of the half-space between the front panel 206 and the fluorescent surface 41. Then the light is incident on the front panel 206 and the whole flux proceeds within the cone of half-apex angle φ (where $\phi = \sin^{-1}(1/n)$ and n is the refractive index of the front panel 206).

Of the whole flux proceeding within the cone of half-apex angle φ, the flux proceeding within the cone of half-apex angle θ proceeds straight since the front panel 206, the transparent adhesive 210, and the plano-convex lens 209 have substantially the same refractive index. After going out of the plano-convex lens 209, the flux becomes approximately parallel, and as in the case of the above embodiment 1, is incident on the image forming portion 52 of the liquid crystal light valve 211. Most of the light is projected and displayed on the screen (not shown) via the synthesis prism 107 and the projection lens 108.

Thus, the whole of the flux emitted from the fluorescent surface to the half-space is condensed within the cone of half-apex angle φ. The portion of the light thereof reaching the screen from the image forming portion 52 of the liquid crystal light valve 211 is increased and the utilization efficiency of the light is thus extremely high.

Figure 4:
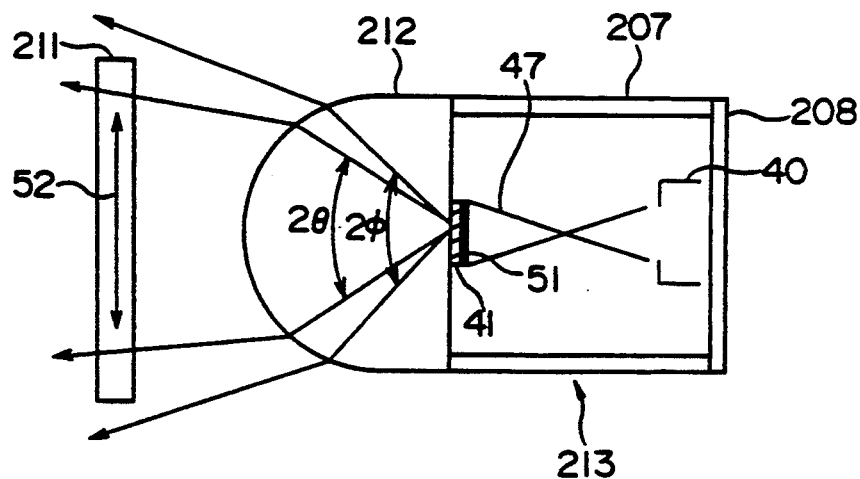
FIG. 4 is a sectional view showing the detailed structure around the light source tube of the projection type display device using a plano-convex lens-shaped front panel.

FIG. 4 is a partial view showing the details of a projection type display device using a plano-convex lens-shaped front panel. The plano-convex lens-shaped front panel 212 is produced by a glass cutting method or a molding method by which the molten glass is poured into a carbon mold of a predetermined form. The plano-convex lens-shaped front panel 212, the tubular side plate 207, and the back plate 208 together constitute the CRT type light source tube 213, the interior of which is kept in a vacuum.

The device shown in FIG. 4 operates similarly to the above device of FIG. 3. In the case of the device of FIG. 4, however, the front panel is constituted integrally with the lens. The adhesive is thus unnecessary. The reflections at respective interfaces are thus avoided and the loss of light is avoided. Further, in the production of the device, the step of adhering the front panel with the acrylic lens becomes unnecessary, and thus the possibility of misalignment at the attachment of the acrylic lens is eliminated. By the way, the description above relates to the case where the lens-shaped front panel consists of the plano-convex lens. It goes without saying, however, that a biconvex lens-shaped front panel operates in the same manner.

Further, in FIGS. 3 and 4, the center of the radius of curvature of the plano-convex lens is positioned nearer to the side of the light valve than to the center of the fluorescent material, such that the utilization efficiency of the light can further be enhanced. Next, this effect is described by reference to FIG. 5.

Figure 5A:
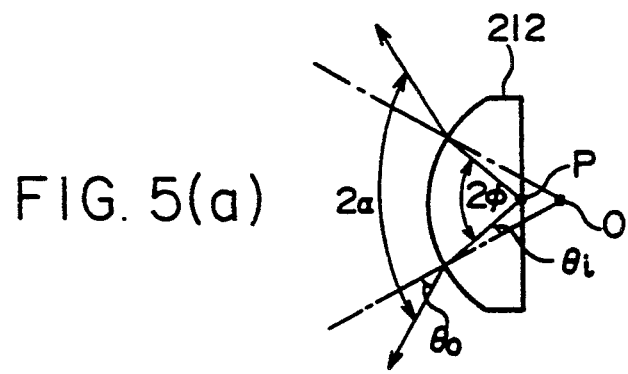
FIG. 5 (a), (b), and (c) are views showing the relationship between the position of the center of the radius of curvature of the plano-convex lens of FIGS. 3 and 4 and the light-condensing effect.
Figure 5B:
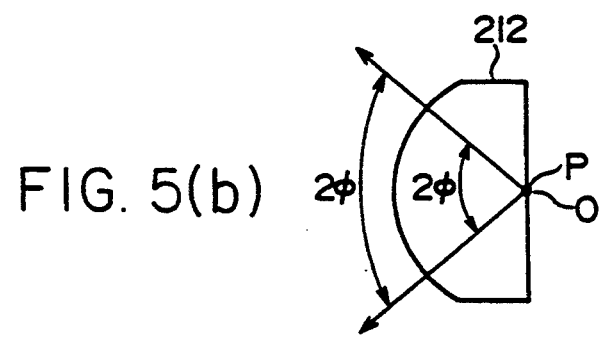
Figure 5C:
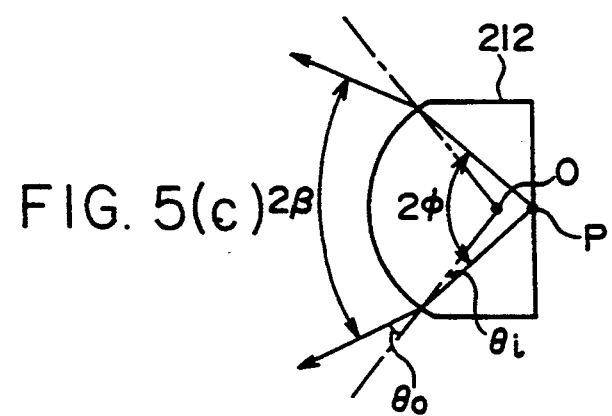

FIG. 5 is a view showing the light condensation effect in relation to the positional relationships between the center O of the radius of curvature of the plano-convex lens 209, 212 and the light-emitting point P. FIG. 8(a) shows the directions of light emitted from the light-emitting point P to the half-space in the case where the light-emitting point P is situated in front of the center of the radius of curvature O. FIG. 8(b) shows the directions in the case where the light-emitting point P coincides with the center of the radius of curvature O. FIG. 5(c) shows the directions in the case where the light-emitting point P is situated to the rear of the center of the radius of curvature 0. As described in reference to the device of FIG. 3, the light emitted from the point P is emitted to the whole half-space between the front panel and the fluorescent surface immediately after the emission from the fluorescent surface. The light is soon incident on the front panel, and the whole light flux proceeds within the cone of the half-apex angle $\phi$ (where $\phi = \sin^{-1}(1/n)$ and n is the refractive index of the whole panel). The light proceeds through the space, and is bent by refraction on coming out of the lens. When the light-emitting point P coincides with the center of the radius of curvature O, the light from the light-emitting point P is incident at right angles on the outgoing surface of the lens, and hence proceeds straight therefrom. Otherwise, the light is refracted to proceed through the space such that the outgoing angle $\theta_o$ is greater than the incident angle $\theta_i$.

Thus, the light emitted from the light-emitting point P to the half-space proceeds within the cone of: (a) half-apex angle $\alpha$, (b) half-apex angle $\phi$, and (c) half-apex angle $\beta$, respectively, as shown in FIG. 5. Under this circumstance, the relation $\alpha > \phi > \beta$ holds. Thus, when the light-emitting point P is to the rear of the center of the radius of curvature O (FIG. 5(c)), the whole flux from the light-emitting point P is condensed within the cone of the smallest half-apex angle. The greatest amount of light is thus guided from the image forming portion of the liquid crystal light valve situated in front thereof to the screen, and the utilization efficiency of the light is enhanced.

Figure 6:
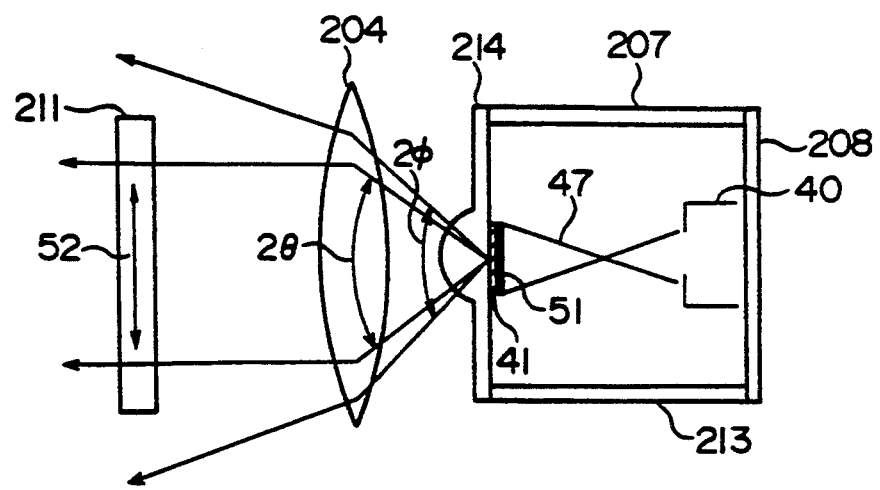
FIG. 6 is a sectional view showing the detailed structure around the light source tube of the projection type display device using a plurality of lenses.

By the way, in the case of the above devices of FIGS. 1 through 4, a single optical lens is disposed between the light valve and the light-emitting portion. As shown in FIG. 6, however, a plurality of lenses may be disposed, as exemplified by a further optical lens 204 disposed between the lens-shaped front panel 214 and the liquid crystal light valve 211.

PROJECTION TYPE DISPLAY DEVICE HAVING A LENS OF ELLIPSOID OF ROTATION

Figure 7:
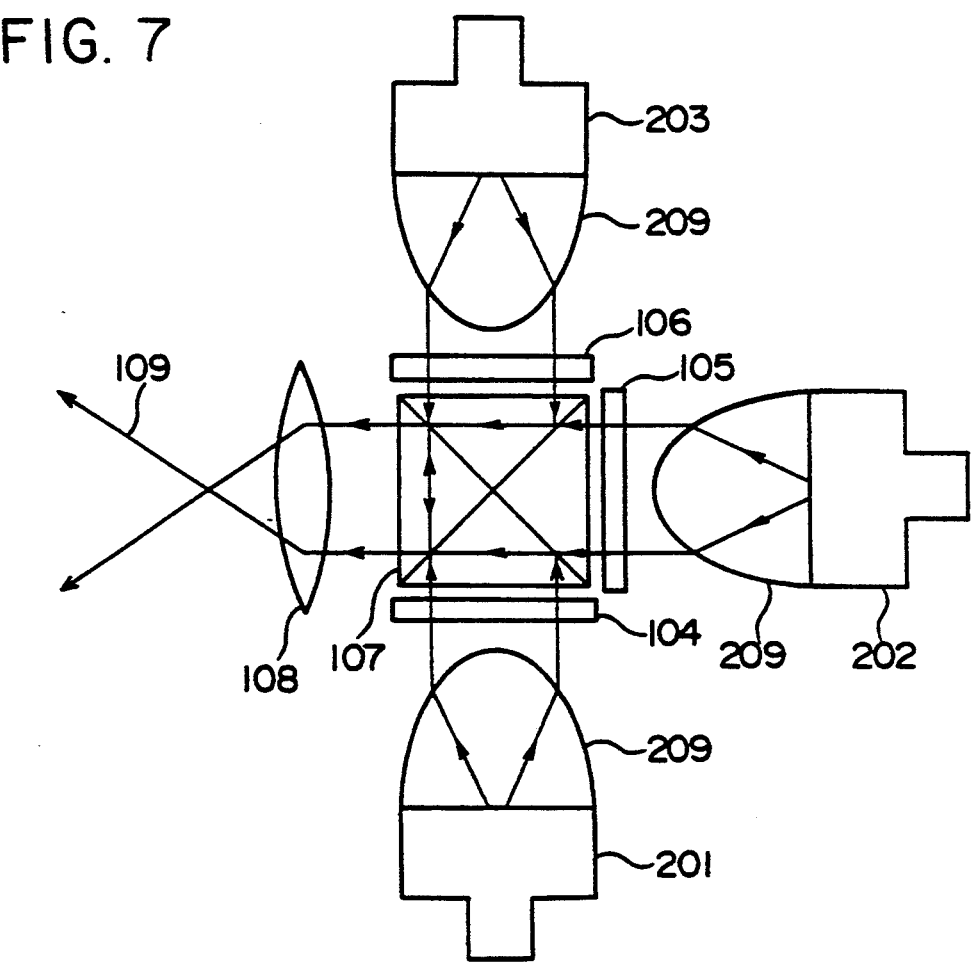
FIG. 7 is a sectional view showing the projection type display device having plano-convex lens of the form of an ellipsoid of revolution.

FIG. 7 is a sectional view of a projection type display device provided with a plano-convex lens with a surface of ellipsoid of revolution. The parts 105 through 109 are the same as those of the above embodiments. The reference numeral 201 represents the red light source tube for emitting red light; the reference numeral 202 represents the green light source tube for emitting green light; and the reference numeral 203 represents the blue light source tube for emitting blue light. The respective light source tubes are CRT type light source tubes capable of emitting light of a single color as that of the conventional device. However, the light-emitting area is less than the area of the light valve.

Figure 8:
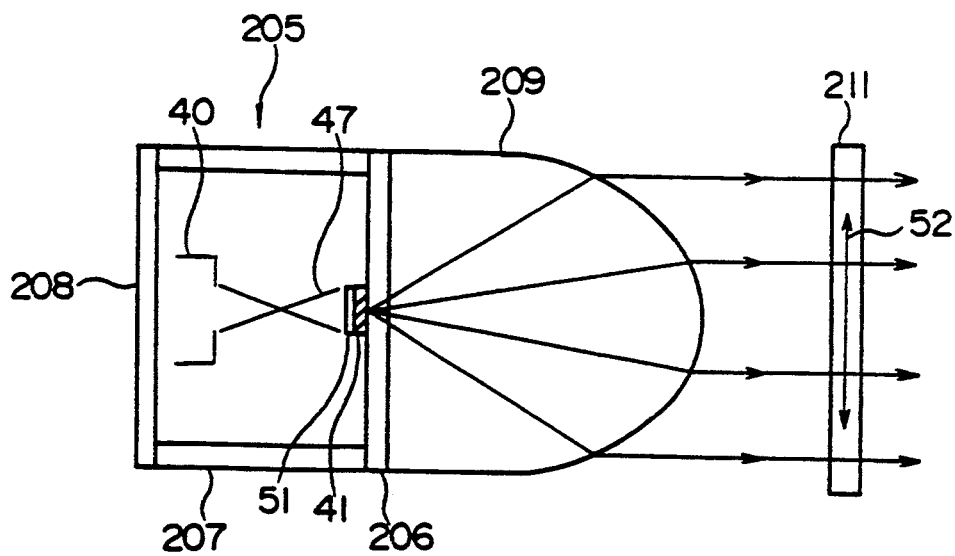
FIG. 8 is a sectional view showing the structure around the light source tube of the projection type display device of FIG. 7.

FIG. 8 is a sectional view showing the detailed structure around the light source tube of the projection type display device of FIG. 7. The CRT type light source tube 205 consists of a front panel 206, a tubular side plate 207, and a back plate 208. The inside of the CRT type light source tube 205 is kept in the vacuum state. Further, on the front panel 206 is formed a fluorescent surface 41 and an aluminum back layer On the back plate 208 is disposed an electron gun 40. The reference numeral 209 represents a plano-convex lens, whose surface form is the ellipsoid of revolution generated by rotating the curve of FIG. 9 around the x-axis.

Figure 9:
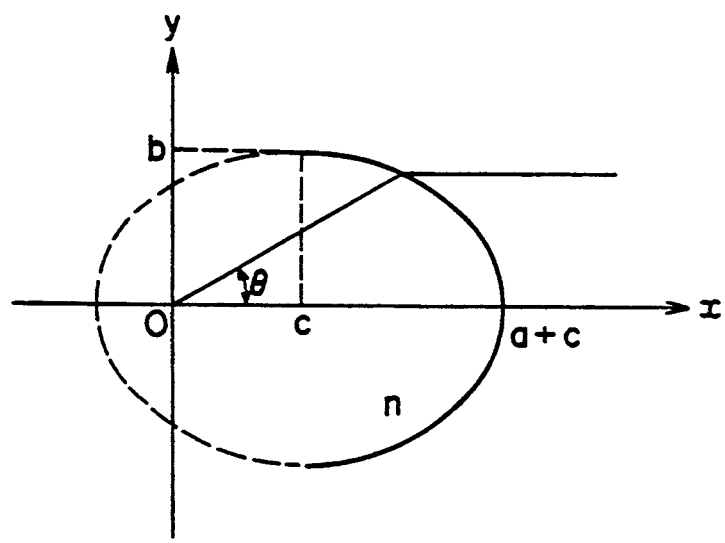
FIG. 9 is a view for explaining the form of the ellipse for generating the ellipsoid of revolution of the plano-convex lens of FIG. 8.

The curve of FIG. 9 is a part of the ellipse represented by:

$$(x-c)^2/a^2 + y^2/b^2 = 1$$

where the light-emitting point on the optical axis is represented by the origin, the optical axis is represented by the x-axis, and a line passing through the origin and perpendicular to the optical axis is represented by the y-axis. Further, if the length of the diagonal of the light valve is represented by L, and the refractive index of the lens by n, then:

$$B \geq L/2,\ a = b\ n(n^2-1)^{-\frac{1}{2}},\ \text{and}\ c = b(n^2-1)^{-\frac{1}{2}}.$$

The origin coincides with one of the loci of the ellipse. The plano-convex lens is attached to the front panel 206 from the exterior by means of a jig (not shown) or an adhesive tape (not shown). Further, at the image forming portion 52 of the liquid crystal light valve 211 is displayed an image corresponding to the picture signal.

In the case of the CRT type light source tube 205 of FIG. 8, all the over-convergent electron beam 47 emitted from the electron gun 40 is irradiated upon the whole of the fluorescent surface 41. It is assumed that the current level of the over-convergent electron beam 47 is constant. Then, as the area of the fluorescent surface 41 is rendered smaller, the density of electrons incident on the fluorescent surface 41 becomes higher, such that the light-emitting luminance of the fluorescent surface 41 increases. Thus, the fluorescent surface 41 of small area emits light at a high luminance.

The light emitted from the fluorescent surface 41 is incident on the front panel 206 after passing through the microscopic space of refractive index 1. As a result, the light flux proceeds within the cone of half-apex angle $\phi$ (where $\phi = \sin^{-1}(1/n)$ and n is the refractive index of the front panel 206). Since the front panel 206 and the plano-convex lens 209 have substantially the same refractive index, the whole flux proceeding within the cone proceeds straight and reaches the plano-convex lens 209. The surface form of the plano-convex lens 209 is the ellipsoid of revolution as described above. If the outgoing angle from the origin is represented by $\theta$, the light after the refraction is thus parallel to the optical axis with respect to the arbitrary light within:

$$-\tan^{-1}(b/c) \leq \theta \leq \tan^{-1}(b/c)$$

This parallel light is incident on the image forming portion of the liquid crystal light valve, and is projected and displayed on the screen via the synthesis prism and the projection lens. Thus, if n=1,5, then:

$$|\phi| \leq |\tan^{-1}(b/c)|$$

Consequently, the whole flux emitted to the half-space from the light-emitting portion existing near the optical axis is condensed within the cone of half-apex angle $\theta$. In addition, the light becomes substantially parallel due to the ellipsoid of revolution form of the lens surface. Thus substantially one hundred percent of the light reaches the image forming portion of the liquid crystal light valve and the screen The light utilization efficiency is extremely high. Furthermore, the variance of the incident angles of the light upon the synthesis prism 107 (the color synthesizing system) is reduced. The brightness of the projected image and the uniformity of the color is thereby enhanced.

Figure 10:
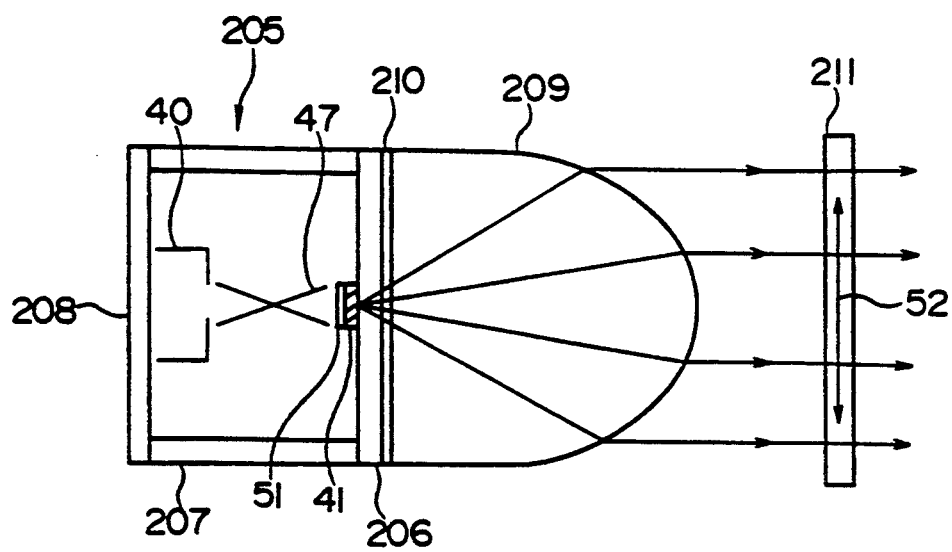
FIG. 10 is a sectional view of another projection type display device having a lens of the ellipsoid of revolution.

FIG. 10 is a sectional view of another projection type display device having a lens with a surface of the ellipsoid of revolution. The parts 205 through 209, 40, 41, 47 and 51 are the same as those of the above embodiments. The transparent adhesive 210 having substantially the same refractive index as the plano-convex lens 209 and the front panel 208 adheres the front panel 206 and the plano-convex lens 209 to each other without an air gap therebetween. In the case of this embodiment, the two-liquid addition reaction type silicone RTV resin (commercially available from Shinetsu Kagaku Kougyou under the trade name of KE1603A/B) is used as the transparent adhesive. Compared with the case of FIG. 8, the thickness of the plano-convex lens 209 at the planar side is shortened by the thickness of the adhesive layer.

The device of FIG. 10 operates similarly as the device of FIG. 7 and 8. However, since the front panel and the lens is attached by means of the transparent adhesive, an exterior supporting means for the lens can be dispensed with. Further, since the air gap between the front panel and the lens can completely be eliminated, the reflection at the interface and hence the loss of light are reduced.

Figure 11:
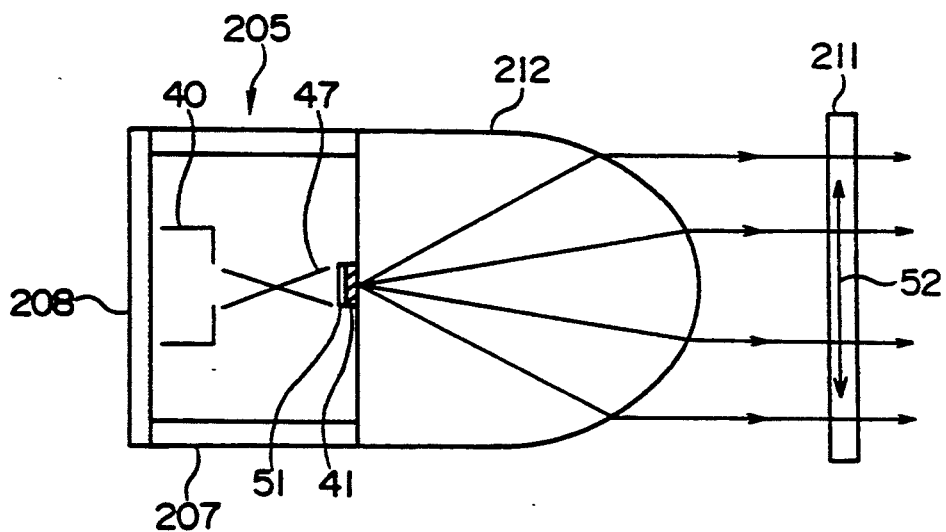
FIG. 11 is a sectional view around the light source tube of the projection type display device using the plano-convex lens-shaped front panel having a front surface of an ellipsoid of revolution.

FIG. 11 is a sectional view showing the details of the portions around the light source tube of the projection type display device using the plano-convex lens-shaped front panel having a front surface of an ellipsoid of revolution. The plano-convex lens-shaped front panel 212 having a front surface of an ellipsoid of revolution is longer in length than the plano-convex lens 209 of FIG. 8 at the planar side thereof, by a length equal to the thickness of the front panel 206. The CRT type light source tube 205 consists of the plano-convex lens-shaped front panel 212, a tubular side plate 207, and a back plate 208. The inside of the CRT type light source tube 205 is kept in the vacuum state.

The device of FIG. 11 also operates similarly as the device of FIGS. 7 and 8. However, since the front panel is formed integrally with the lens, an exterior supporting means for the lens can be dispensed with. Further, since the air gap between the front panel and the lens can completely be eliminated, the reflection at the interface and hence the loss of light are reduced. Further, in the production of the device, the step of adhering the front panel to the lens, which is necessary in the case of the above embodiment, becomes unnecessary. Thus, the production steps are simplified and the possibility of misalignment at the attachment of the lens is eliminated.

Figure 12:
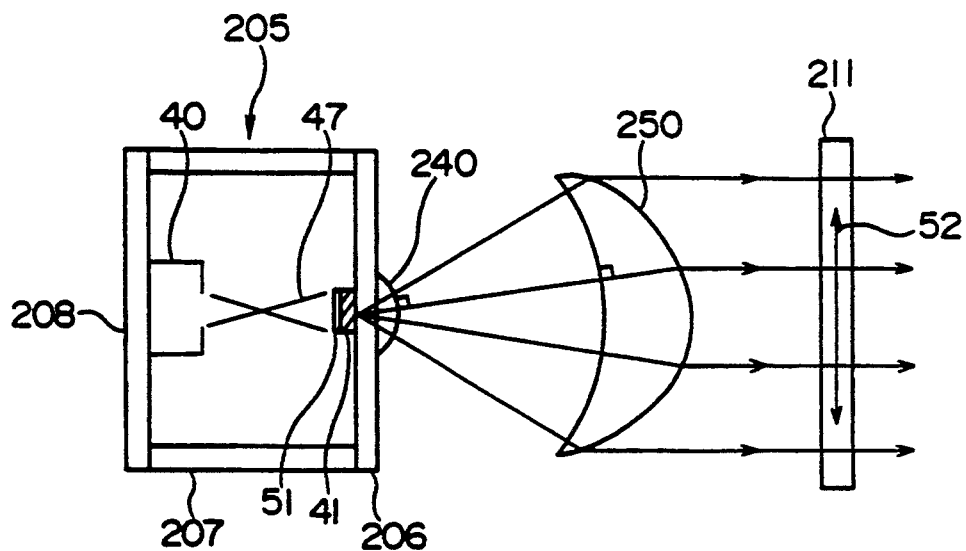
FIG. 12 is a sectional view around the light source tube of the projection type display device using a meniscus lens having a front surface exhibiting the form of an ellipsoid of revolution.

FIG. 12 is a sectional view showing the structure around the light source tube of the projection type display device using a meniscus lens having a front surface exhibiting the form of an ellipsoid of revolution. The plano-convex lens 240 has the spherical portion with a radius of curvature longer than the length: t/cos $\phi$, where $\phi$ is $\phi=\sin^{-1}(1/n)$, n being the refractive index of the lens, and t is the thickness of the front panel 206. The center of curvature of the lens coincides with the light-emitting point upon the optical axis. The planar side of the lens is closely attached to, or integrally formed with, the front panel. The surface of the meniscus lens 250 at the side of light valve (the front side) is the ellipsoid of revolution represented at the same location and by the same coordinates as that of FIG. 8. The surface of the meniscus lens 250 at the side of the light source is a spherical surface having the center of curvature at the light-emitting point on the optical axis and exhibiting a solid angle not less than $\pi \sin 2\phi$.

The light emitted from the light-emitting point upon the optical axis is condensed within the cone of half-apex angle and then goes out of the plano-convex lens 240 as in the case of the embodiment of FIGS. 7 and 8. However, since the center of curvature of the spherical surface coincides with the light-emitting point, the light goes out perpendicularly from the out-going surface of the lens and proceeds straight in the air. The light is then incident on the spherical surface of the meniscus lens 250 at right angles, and then proceeds straight within the lens and reaches the surface of the ellipsoid of revolution. Thereafter, the light proceeds in parallel to the optical axis in a manner similar to the case of the embodiment of FIGS. 7 and 8.

The embodiment of FIG. 12 operates similarly as the embodiment of FIGS. 7 and 8. However, since a space is provided between the light source and the out-going surface of the lens, the cooling of the light source is promoted and the weight of the device can be reduced.

PROJECTION TYPE DISPLAY DEVICE HAVING LENS WITH CONE-SHAPED REAR

Figure 13:
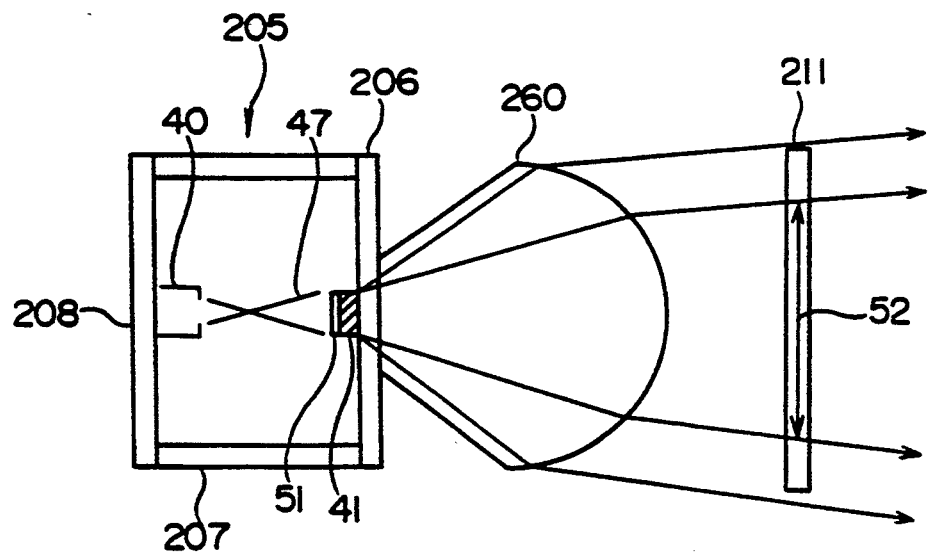
FIG. 13 is a sectional view around the light source tube of the projection type display device using a lens having a rear surface exhibiting the frustoconical form.

FIG. 13 is a sectional view showing the structure around the light source tube of the projection type display device using a lens having a rear exhibiting the frustoconical form.

The diameter of the plano-convex lens 260 at the planar side is reduced compared with the maximum radius at the spherical side, such that the rear side of the plano-convex lens 260 has the form of a frustum. The spherical surface of the plano-convex lens 260 is situated to the side of the liquid crystal light valve 211. The maximum diameter of the spherical surface side thereof covers the image forming portion 52 of the liquid crystal light valve 211. On the other hand, the portion of the plano-convex lens 260 situated to the side of the light source away from the maximum diameter portion at the spherical surface side is gradually reduced in diameter toward the fluorescent surface 41 of the light source. The portion from the maximum diameter portion at the spherical surface side to the side of the light source has the form of a frustum which is obtained by cutting the cone exhibiting the half-apex angle of $\phi=\sin^{-1}(1/n)$ and having the apex upon the fluorescent surface 41, by the surface at the front panel 206. The axis of the frustum is perpendicular to the fluorescent surface 41.

In the above case, the maximum cross-sectional area of the plano-convex lens 260 perpendicular to the optical axis covers the light valve. However, it is possible to change the area depending on the light-condensing efficiency of the lens and the distance between the lens and the light valve, provided that the light is incident on the whole area of the image forming portion 52 of the light valve.

In the case of the embodiment of FIG. 13, the whole flux emitted from the fluorescent surface is condensed within the cone as in the case of the above embodiments. Thus the light utilization efficiency is enhanced. Further, the light emitted from arbitrary points of the light-emitting portion passes exclusively through the solid obtained by superposing the cones of half-apex angle $\phi$. The light does not pass through other part of the space. Thus, the portions of the plano-convex lens through which the light does net pass can be dispensed with without sacrificing any fraction of the light. Further, since a space is provided near the light-emitting portion, the cooling of the light source is promoted and the weight of the lens is reduced.

Figure 14:
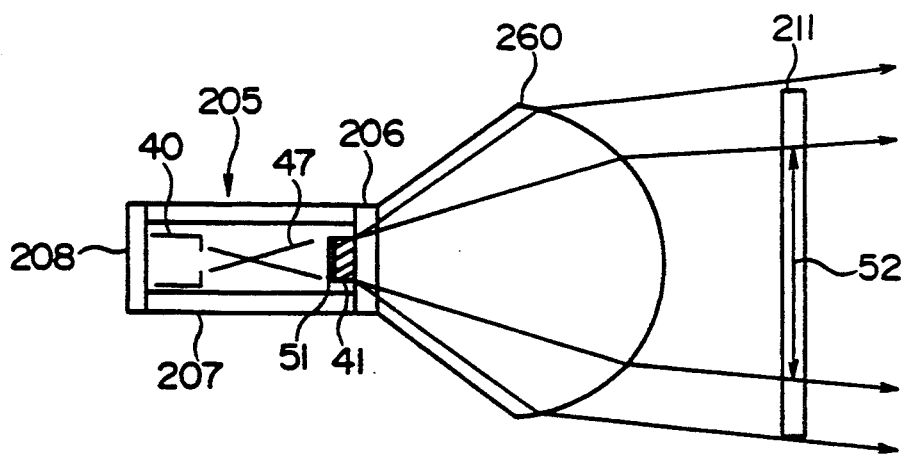
FIG. 14 is a sectional view around the light source tube of another projection type display device using the lens having a rear surface exhibiting a pyramidal frustum form.

FIG. 14 is a sectional view showing the structure around the light source tube of another projection type display device using the lens having a rear exhibiting a pyramidal frustum form. The cross-sectional form of the CRT type light source tube 205 coincides with the planar side form of the plano-convex lens 260. The plano-convex lens 260 is tightly attached on the front panel 206.

The device of FIG. 14 operates similarly as the device of FIG. 13. However, the cross-sectional form of the CRT type light source tube 205 coincides with the planar side form of the plano-convex lens 260, and the portions of the lens other than the light-emitting portion and the light path which are not necessary are removed. Thus, the space can be used efficiently and the size of the light source is reduced.

By the way, in the case of FIG. 14, the plano-convex lens 260 is tightly attached on the front panel 206. However, since the cross-sectional form of the CRT type light source tube 205 coincides with the planar side form of the plano-convex lens 260, the plano-convex lens 260 and the front panel 206 can be formed together integrally.

Figure 15A:
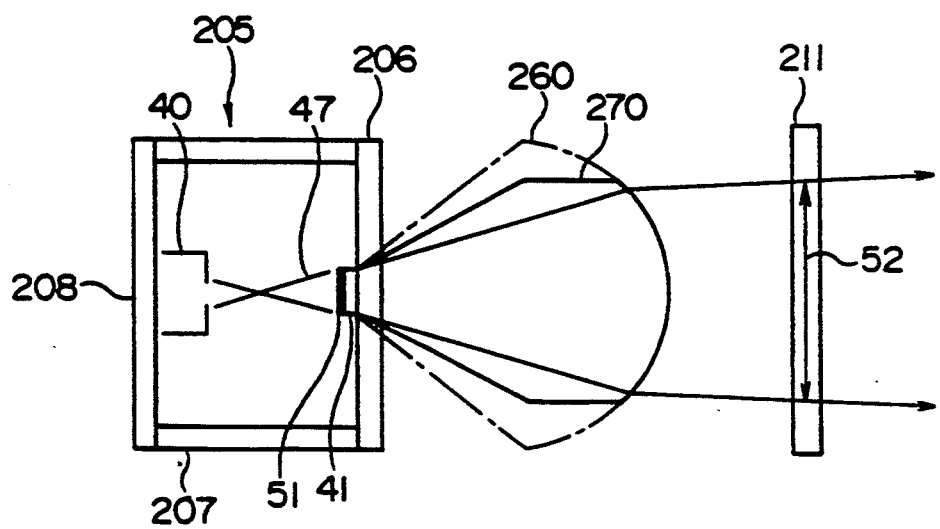
FIG. 15 (a) is a sectional view around the light source tube of the projection type display device using the lens having a rear surface exhibiting a pyramidal frustum form.
Figure 15B:
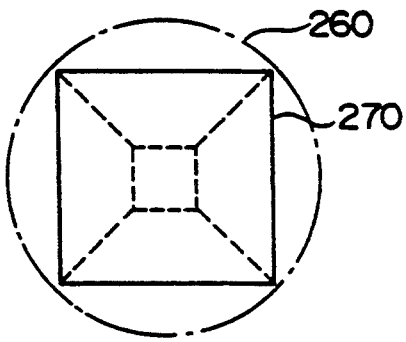

FIG. 15 (a) is a sectional view showing the structure around the light source tube of the projection type display device using the lens having a rear side exhibiting a pyramidal frustum form. The plano-convex lens 270 exhibits a spherical surface at the side of the light valve and a plane at the side of the light source. The outer form of the plano-convex lens 270 as viewed from the front of the spherical surface is a square, which is obtained by removing the peripheral portions of the plano-convex lens 260 of FIG. 13 to leave a dimension sufficient to cover the image forming portion of the liquid crystal light valve 211. Further, as in the case of the plano-convex lens 260 of FIG. 13, the cross-sectional area of the plano-convex lens 270 to the side of the light source is reduced compared with the portion at which the cross-sectional area at the spherical surface side coincides with the image forming portion 52 of the liquid crystal light valve 211. This portion of reduced cross-sectional area has the form of a pyramidal frustum.

FIG. 15 (b) is a front view of the plano-convex lens 270 as viewed from the side of the light valve. The dot-and-dash circle represents the outer form of the plano-convex lens 260 of the embodiment of FIG. 13. The plano-convex lens 270 is attached to the front panel 206 by means of a transparent adhesive.

In the case of this embodiment, the front outer form of the plano-convex lens 270 as viewed from the side of the light valve is identical to the form of the image forming portion 52 of the liquid crystal light valve 211. However, it is possible to change the area of the front of the plano-convex lens 270, depending on the light-condensing efficiency of the plano-convex lens 270 and the distance between the plano-convex lens 270 and the liquid crystal light valve 211, provided that the light is incident on the whole area of the image forming portion 52 of the liquid crystal light valve 211.

As in the case of the embodiment of FIG. 13, also in the case of the embodiment of FIG. 15, the whole flux emitted from the fluorescent surface passes exclusively through the solid obtained by the superposition of the cones of half-apex angle $\phi$. The flux then goes out of the front panel 206. The part of the light proceeding within the plano-convex lens 270 reaches the out-going surface at the spherical side of the plano-convex lens 270. The light is refracted at the out-going surface of the lens, and then is incident upon the whole of the image forming portion of the light valve. On the other hand, the light (passing through the hatched region in the figure) which, when going out of the front panel 206, is not incident on the plano-convex lens 270 is the portion which would not be incident on the image forming portion 52 after going out of the plano-convex lens 260 even if the plano-convex lens 260 of FIG. 13 (shown by the dot-and-dash curve in the figure) should exist. Thus, the plano-convex lens 270 of FIG. 15 does not reduce the amount of light incident on the image forming portion of the light valve. Since the portion of the plano-convex lens disposed immediately in front of the light-emitting portion which does not form the light path to the light valve is removed, the cooling of the light source is facilitated and the weight and the size of the lens are reduced without reducing the amount of light which passes through the light valve and is projected upon the screen.

In the case of the above embodiments of FIGS. 13, 14, and 15, the convex surface of the plano-convex lens is a spherical surface. However, it is possible to use the surface of the ellipsoid of revolution as in the case of the embodiment of FIGS. 7 and 8, such that the out-going light is rendered parallel and the utilization efficiency of light is thereby enhanced.

PROJECTION TYPE DISPLAY DEVICE WITH REFLECTION LAYER

Figure 16:
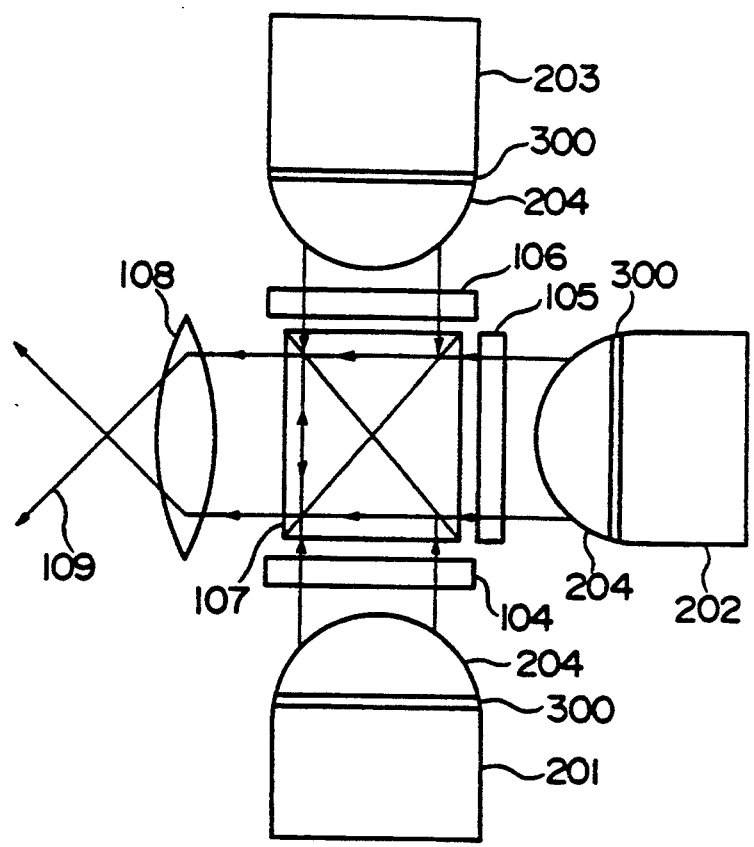
FIG. 16 is a sectional view around the light source tube of the projection type display device having a reflection layer.

FIG. 16 is a sectional view showing the structure of a projection type display device having a reflection layer. The reference numerals 104, 105, 106, 107, 108, and 109 represent the red liquid crystal light valve, the green light valve, the blue light valve, the synthesis prism, the projection lens, and the projection light, respectively. The reference numeral 201 represents red light source tube for emitting red light; the reference numeral 202 represents green light source tube for emitting green light; and the reference numeral 203 represents blue light source tube for emitting blue light. The respective light source tubes 201, 202, 203 are CRT type light source tubes capable of emitting light of a single color as that of the conventional device. The reference numeral 300 represents diffusive reflection layers each having an aperture at its center, which are disposed on the surface of the light-emitting portion of the light source tubes 201, 202, 203 of the respective colors. The diffusive reflection layers 300 are formed, for example, by applying magnesium oxide (MgO) upon the surface of the light emitting-portion. The plano-convex type optical lenses 204 are disposed at the front of the light-emitting portion of the light source tubes 201, 202, 203 of the respective colors to sandwich the diffusive reflection layers 300.

Figure 17:
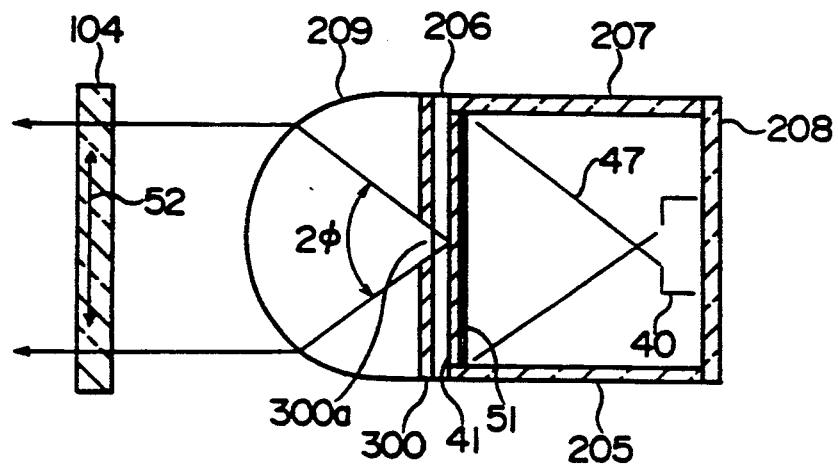
FIG. 17 is a sectional view showing the detailed structure around the light source tube of the projection type display device of FIG. 16.

FIG. 17 is an enlarged sectional view showing the details near a light source tube of the projection type display device of FIG. 16. The reference numeral 205 represents a CRT type light source tube, which consists of the front panel 206, the tubular side plate 207, and the back plate 208. The interior of the CRT type light source tube 205 is kept in vacuum. On the interior surface of the front panel 206 is formed the fluorescent surface 41 and the aluminum back layer 51. On the back plate 208 is disposed an electron gun 40 constituting the electron beam generation means. The diffusive reflection layer 300 is formed on the surface of the front panel 206 at the proceeding side of the emitted light. The diffusive reflection layer 300 has an aperture 300a at the center thereof. The plano-convex lens 209 formed by the acrylic resin molding has such a shape that the focus thereof is situated near the fluorescent surface 41. The plano-convex lens 209 is attached to the front of the front panel 206 via the diffusive reflection layer 300 by means of a transparent adhesive. Thus, at the central aperture 300a of the diffusive reflection layer 300, the plano-convex lens 209 and the front panel 206 are attached to each other without an air gap formed therebetween. The reference numeral 104 represents a liquid crystal light valve. The light transmitted through the aperture 300a is condensed by the plano-convex lens 209. The image corresponding to the picture signal is formed on the liquid crystal light valve 104 by means of the light transmitted through the plano-convex lens 209.

In the case of the CRT type light source tube 205 shown in FIG. 17, all the over-convergent electron beam 47 from the electron gun 40 is radiated upon the whole fluorescent surface 41 via the aluminum back layer 51, thereby generating the visible light. This visible light tends to go out through the front panel 206.

Figure 18:
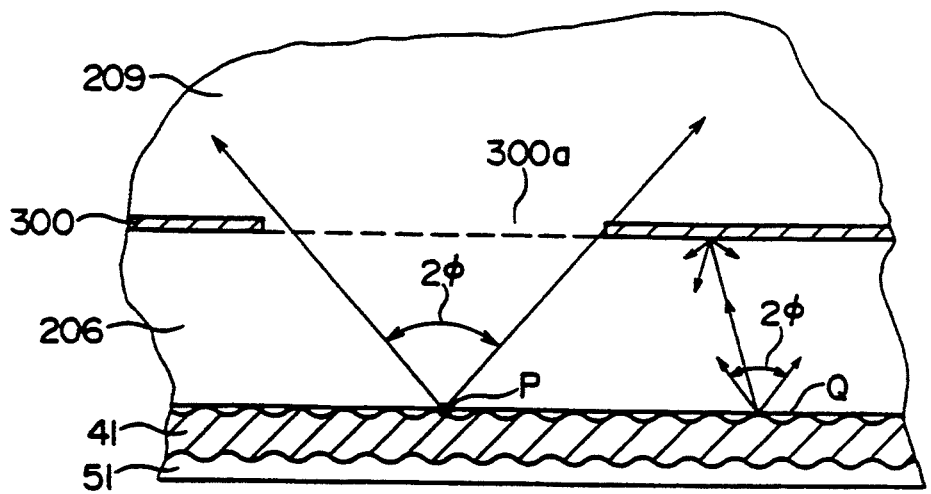
FIG. 18 is a partial sectional view showing the detailed structure around the reflection layer of the projection type display device of FIG. 16.

FIG. 18 is an enlarged sectional view of the peripheral portion of the light emitting-portion, for explaining the effect of the diffusive reflection layer 300 having the aperture 300a shown in FIG. 17. In the figure, the reference numeral 51 represents the aluminum back layer, the reference numeral 41 represents the fluorescent surface, the reference numeral 206 represents the front panel, the reference numeral 300 represents the diffusive reflection layer having the aperture 300a, and the reference numeral 209 represents the plano-convex lens.

As shown in the figure, the light emitted from the point P opposing the central portion of the aperture 300a upon the fluorescent surface 41 goes out therefrom as described below. When viewed microscopically, there exists a gap of refractive index 1 between the fluorescent surface 41 and the front panel 206. Thus, the light emitted from the point P proceeds immediately after the emission to the whole of the half-space between the front panel 206 and the fluorescent surface 41. Immediately thereafter the light is incident on the front panel 206. The whole flux thus proceeds within the cone of half-apex angle $\phi$ (where $\phi = \sin^{-1}(1/n)$ and n is the refractive index of the front panel 206). Thus, if the thickness of the front panel 206 being represented by t and the radius of the aperture 300a is t·tan $\phi$, then all the light emitted from the point P to the half-space proceeds within the cone of the half-apex angle $\phi$ within the plano-convex lens 209 without being screened off by the diffusive reflection layer 300.

On the other hand, the light emitted from the point Q other than at the aperture 300a of the 41 proceeds within the cone of the half-apex angle $\phi$ within the front panel 206, and hits upon the diffusive reflection layer 300 to be subjected to irregular reflection. Further, a part thereof again undergoes irregular reflection at the interface of the front panel 206 at the side of the fluorescent surface 41, or at the fluorescent surface 41. The light emitted from the point Q other than at the aperture 300a repeats irregular reflections at both the interfaces of the front panel 206. Only the light reaching the point P passes through the aperture 300a to proceed within the plano-convex lens 209.

Thus, the light proceeding within the plano-convex lens 209 through the aperture 300a of the diffusive reflection layer 300 is the sum of the light directly coming from the point P and the multiple reflection light originating from the other points Q. Hence the light is at a high luminance.

Thereafter, as shown in FIG. 17, the high luminance light passing through the aperture 300a of the diffusive reflection layer 300 and proceeding within the cone of the half-apex angle $\phi$ within the plano-convex lens 209 is transmitted through whole of the image forming portion 52 of the light valve 104, proceeding substantially in parallel after going out of the plano-convex lens 209.

Further, as shown in FIG. 16, the substantially parallel red light emitted from the red light source tube 201 transmits through the red liquid crystal light valve 104 on which the red component image is displayed. The red light is then reflected by the synthesis prism 107. The substantially parallel green light emitted from the green light source tube 202 transmits through the red liquid crystal light valve 104 on which the green component image is displayed. The green light then transmits through the synthesis prism 107. The substantially parallel blue light emitted from the blue light source tube 203 transmits through the red liquid crystal light valve 104 on which the blue component image is displayed. The blue light is then reflected by the synthesis prism 107. The image synthesized by the synthesis prism 107 is magnified by the projection lens 108 and the projection light 109 is projected on the screen (not shown).

As described above, the diffusive reflection layer 300 having the aperture 300a is disposed at the front of the fluorescent surface 41. The light going out from the aperture 300a thus contains the multiple reflection light reflected at the fluorescent surface 41 and the diffusive reflection layer 300. Further, most of the light is guided to the light valves 104, 105, and 106 and the projection lens 108 and the screen by means of the light-condensation effect of the lens 209. Hence the utilization efficiency of light is enhanced.

By the way, FIG. 17 illustrates the case where the fluorescent surface 41 is applied on the whole surface of the front panel 206. However, the light emitted from the fluorescent surface 41 situated farther away from the aperture 300a is attenuated while repeating the multiple reflections. The multiple reflection light added to the light going out from the aperture 300a receives the largest component from the portion near the aperture 300a. Thus even if the fluorescent surface 41 is applied only on the neighborhood region of the portion of the aluminum back layer 51 opposing the aperture 300a, the electron beam 47 being irradiated upon the whole of such fluorescent surface 41, it is still possible to increase the light-emitting luminance of the fluorescent surface 41, since the electron beam current density increases, provided that the electron beam current is at the same level.

Further, in the case of the embodiment of FIGS. 16 and 17, the optical lens 209 for projecting the light going out of the aperture 300a is a plano-convex type optical lens which is attached to the surface of the front panel 206. It goes without saying that the same effect as described above is obtained by using the optical lenses having another form such as biconvex lenses and disposing them at the front of the front panel.

Figure 19:
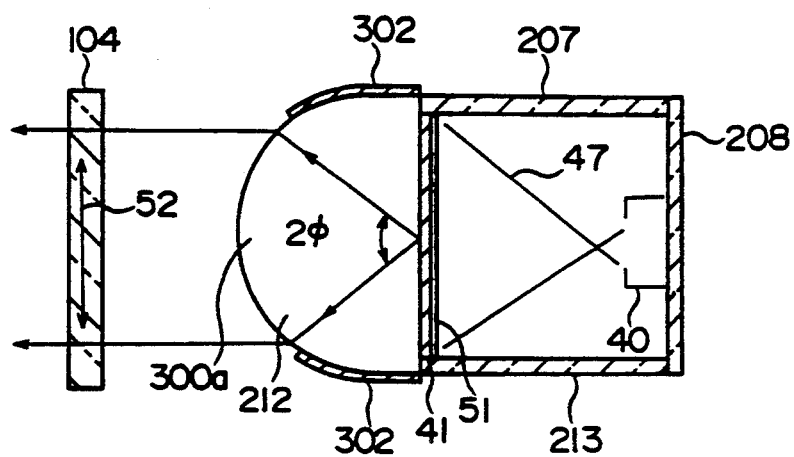
FIG. 19 is a sectional view showing the detailed structure around the light source tube of another projection type display device having a reflection layer.

FIG. 19 is an enlarged sectional view showing the details near the light source tube of another projection type display device having a reflection layer. In the figure, the plano-convex lens-shaped front panel 212 is produced by a glass cutting method or a molding method by which the molten glass is poured into a carbon mold of a predetermined form. On the surface of the plano-convex lens-shaped front panel 212 at the side of the electron gun 40 is applied the fluorescent surface 41. The plano-convex lens-shaped front panel 212, the tubular side plate 207, and the back plate 208 together constitute the CRT type light source tube 213. The band-shaped diffusive reflection layer 302 is disposed upon the periphery of the spherical portion of the plano-convex lens-shaped front panel 212. Namely, the diffusive reflection layer 302 has the aperture 300a which corresponds to the part of the spherical surface of the plano-convex lens-shaped front panel 212 that is cut out therefrom by the cone of half-apex angle $\phi$ having the apex at the center of the fluorescent surface 41. The diffusive reflection layer 302 is applied on the peripheral portion of the spherical portion of the plano-convex lens-shaped front panel 212. The parts in FIG. 19 similar to those of the embodiment 1 of FIG. 2 are represented by the same reference numerals, and the description thereof is omitted.

In the case of the light source tube of FIG. 19, the light emitted from those parts of the fluorescent surface 41 other than the central portion thereof repeats multiple reflections at the diffusive reflection layer 302 and the fluorescent surface 41, as in the case of the light source tube of FIG. 17. The light is synthesized with the light emitted from the central portion of the fluorescent surface 41, and becomes a high luminance light which goes out of the plano-convex lens-shaped front panel 212 substantially in parallel. As a result, similar effects can be obtained as in the case of the above embodiment.

Figure 20:
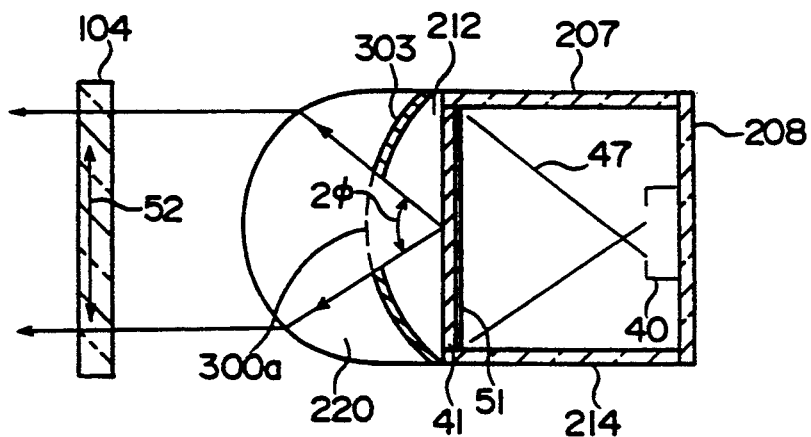
FIG. 20 is a sectional view showing the detailed structure around the light source tube of still another projection type display device having a reflection layer.

FIG. 20 is an enlarged sectional view showing the details of another projection type display device having a reflection layer near the light source tube. The plano-convex lens-shaped front panel 212 is produced by a glass cutting method or a molding method by which the molten glass is poured into a carbon mold of a predetermined form. Upon the planar surface thereof to the side of the electron gun 40 is formed the fluorescent surface 41. The other surface is formed into a paraboloid of rotation. The paraboloid of rotation is a surface which is formed by rotating the curve $y = k\, x^2$, for example, around the y-axis. The y-axis coincides with the optical axis of the emitted light. The central thickness of the plano-convex lens-shaped front panel 212 is $1/(4k)$, and the radius thereof is $1/(2k)$. A reflection layer 303 having a mirror surface made, for example, of aluminum foil, is disposed on the surface of the plano-convex lens-shaped front panel 212. The reflection layer 303 has an aperture 300a which corresponds to the portion of the reflection layer 303 that is cut off therefrom by the cone of half-apex angle $\phi$ having the apex at the center of the fluorescent surface 41. The reflection layer 303 is not formed at the aperture 300a. A concavo-convex lens 220 has a concave surface identical to the paraboloid of rotation surface of the plano-convex lens-shaped front panel 212. The concavo-convex lens 220 is attached at the surface of the paraboloid of rotation to the plano-convex lens-shaped front panel 212 by means of a transparent adhesive without an air gap formed therebetween. The parts in FIG. 20 similar to those of the embodiment 1 of FIG. 17 are represented by the same reference numerals, and the description thereof is omitted.

As in the case of the light source tube of FIG. 17, also in the case of the light source tube of FIG. 20, the light emitted from those parts of the fluorescent surface 41 other than the central portion thereof is synthesized with the light emitted from the central portion of the fluorescent surface 41, by means of the reflection at the reflection layer 303. The light at a high luminance is thus obtained. The reflection layer 303 has the form of the paraboloid of rotation formed by rotating the curve $y = k\, x^2$ around the y-axis. The central thickness of the plano-convex lens-shaped front panel 212 is $1/(4k)$ and the radius thereof is $1/(2k)$. Thus, the light emitted from arbitrary points other than the central portion of the fluorescent surface 41 at right angles thereto is reflected by the reflection layer 303 and thereby condensed to the central portion of the fluorescent surface 41. Thus, the condensed light is again reflected at the central portion of the fluorescent surface 41, and synthesized with the light emitted from the central portion of the fluorescent surface 41. Consequently, the light going out of the concavo-convex lens 220 is at an extremely high luminance.

Figure 21:
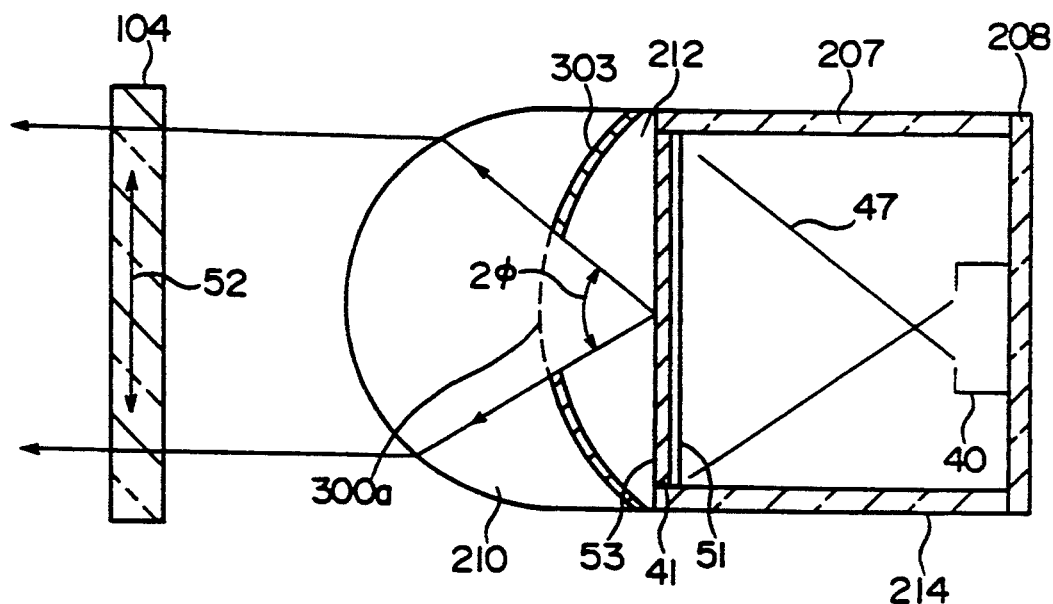
FIG. 21 is a sectional view showing the detailed structure around the light source tube of still another projection type display device having a reflection layer.

It is possible to dispose an interference multi-layer film between the plano-convex lens-shaped front panel 212 and the fluorescent surface 41 in addition to the structure of FIG. 20, such that the light emitted from the fluorescent surface 41 has a directivity along the perpendicular direction. The meritorious effect can thereby be enhanced. FIG. 21 is an enlarged sectional view of the light source tube and the liquid crystal light valve according to such an embodiment. In the figure, the interference multi-layer film 53 consists of alternate layers of a low and a high refractive index. More specifically, the interference multi-layer film 53 may be made of a six-layer coating, wherein the layers of low refractive index may be made of silicon dioxide ($SiO_2$) and the layers of high refractive index may be made of titanium dioxide ($TiO_2$). Alternatively, the interference multi-layer film 53 may be made of a six-layer coating, wherein the layers of low refractive index are made of silicon dioxide ($SiO_2$) and the layers of high refractive index are made of tantanium oxide ($TiO_2$ or $TiO_5$).

Since the interference multi-layer film 53 is disposed between the fluorescent surface 41 and the plano-convex lens-shaped front panel 212, the parts of the light emitted from the fluorescent surface 41 and incident on the interference multi-layer film 53 which exhibit smaller incident angles are transmitted therethrough. The parts of the light exhibiting larger incident angles are reflected back to the fluorescent surface 41. The light having a larger incident angle on the interference multi-layer film 53 and reflected back to the fluorescent surface 41 undergoes irregular reflections at the fluorescent surface 41. Of the light undergoing irregular reflection, the parts exhibiting smaller incident angle on the interference multi-layer film 53 is transmitted therethrough. The rest is reflected back. The process is repeated, and the light flux is converged within a small divergent angle. The light having a directivity along the perpendicular direction is thus obtained.

Figure 22:
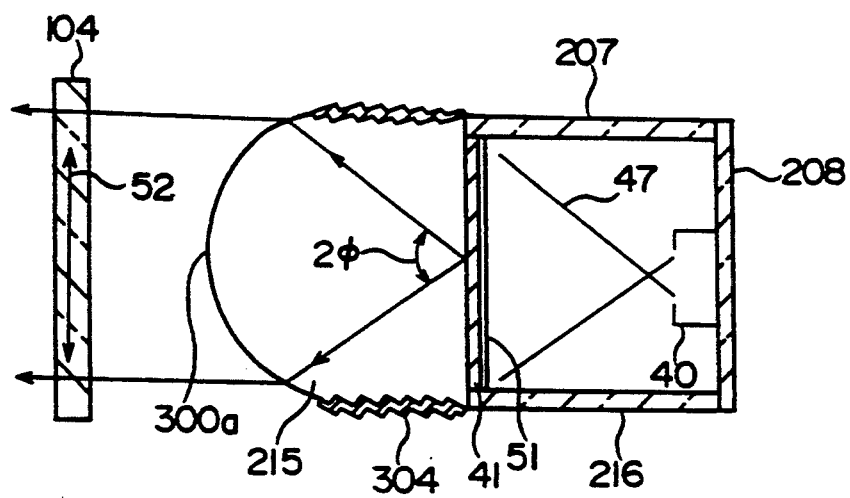
FIG. 22 is a sectional view showing the detailed structure around the light source tube of still another projection type display device having a reflection layer.

FIG. 22 is an enlarged sectional view showing the detailed structure of the projection type display device having a reflection layer near the light source tube thereof. In the figure, the plano-convex lens-shaped front panel 215 is produced by a glass cutting method or a molding method by which the molten glass is poured into a carbon mold of predetermined form. On the planar surface thereof to the side of the electron gun 40 is applied the fluorescent surface 41. Further, a part of the plano-convex lens-shaped front panel 215 has a saw-tooth shaped cross-sectional outer form, the cross-section being along the plane containing the optical axis. The reflection layer 304 is applied on this saw-tooth shaped portion. The parts in FIG. 22 which are similar to those of FIG. 17 are represented by the same reference numerals and the description thereof is omitted.

As in the case of the light source tube of FIG. 17, the light emitted from the central portion of the fluorescent surface 41 is augmented with the light emitted from parts other than the central portion of the fluorescent surface 41. Namely, the light emitted from parts other than the central portion is reflected at the reflection layer 304 and condensed to the central portion of the fluorescent surface 41. Thus a high luminance light is emitted from the plano-convex lens-shaped front panel 215.

Figure 23:
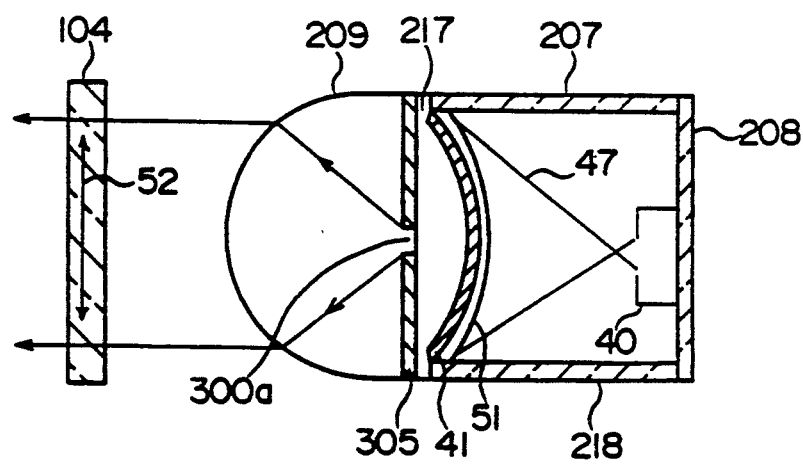
FIG. 23 is a sectional view showing the detailed structure around the light source tube of still another projection type display device having a reflection layer.

FIG. 23 is an enlarged sectional view showing the detailed structure of another projection type display device having a reflection layer near the light source tube thereof. In the figure, the reference numeral 217 represents the plano-convex lens-shaped front panel exhibiting a convex surface at the side of the fluorescent surface 41. The reference numeral 218 represents the light source tube. The convex surface of the plano-convex lens-shaped front panel 217 to the side of the electron gun 40 has the form of a sphere or a paraboloid of rotation.

As in the case of the light source tube of FIG. 17, the light emitted from the aperture 300a of the reflection layer 305 in FIG. 23 is a synthesis of the light coming directly from the fluorescent surface 41 and the light emitted from other parts thereof that has undergone multiple reflections between the diffusive reflection layer 305 and the fluorescent surface 41. Under this circumstance, since the fluorescent surface 41 has the form of a concave surface with respect to the aperture 300a, the light emitted from the parts of the fluorescent surface 41 situated farther away from the aperture 300a that has undergone multiple reflections can reach the aperture 300a with less difficulty. Thus, the light going through the aperture 300a is at an extremely high luminance. By the way, if an interference multi-layer film is disposed between the convex surface portion of the plano-convex lens-shaped front panel 217 and the fluorescent surface 41 as in the case of embodiment 6, the light emitted from arbitrary points of the fluorescent surface exhibits a directivity along the perpendicular direction. As a result, the multiple reflection light component arriving at the aperture 300a is further increased.

PROJECTION TYPE DISPLAY DEVICE PROVIDED WITH THREE COLOR COMPLEX-TYPE LIGHT SOURCE TUBE

Figure 24:
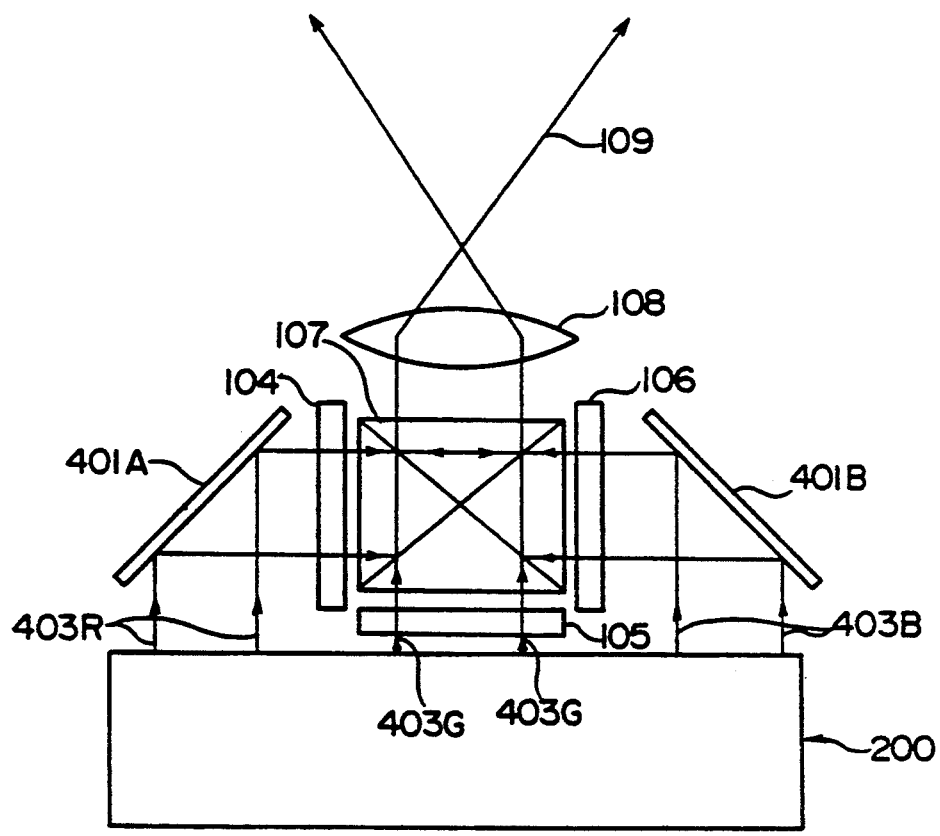
FIG. 24 is a side view showing the structure of a projection type display device having a three-color complex type light source tube.
Figure 47:
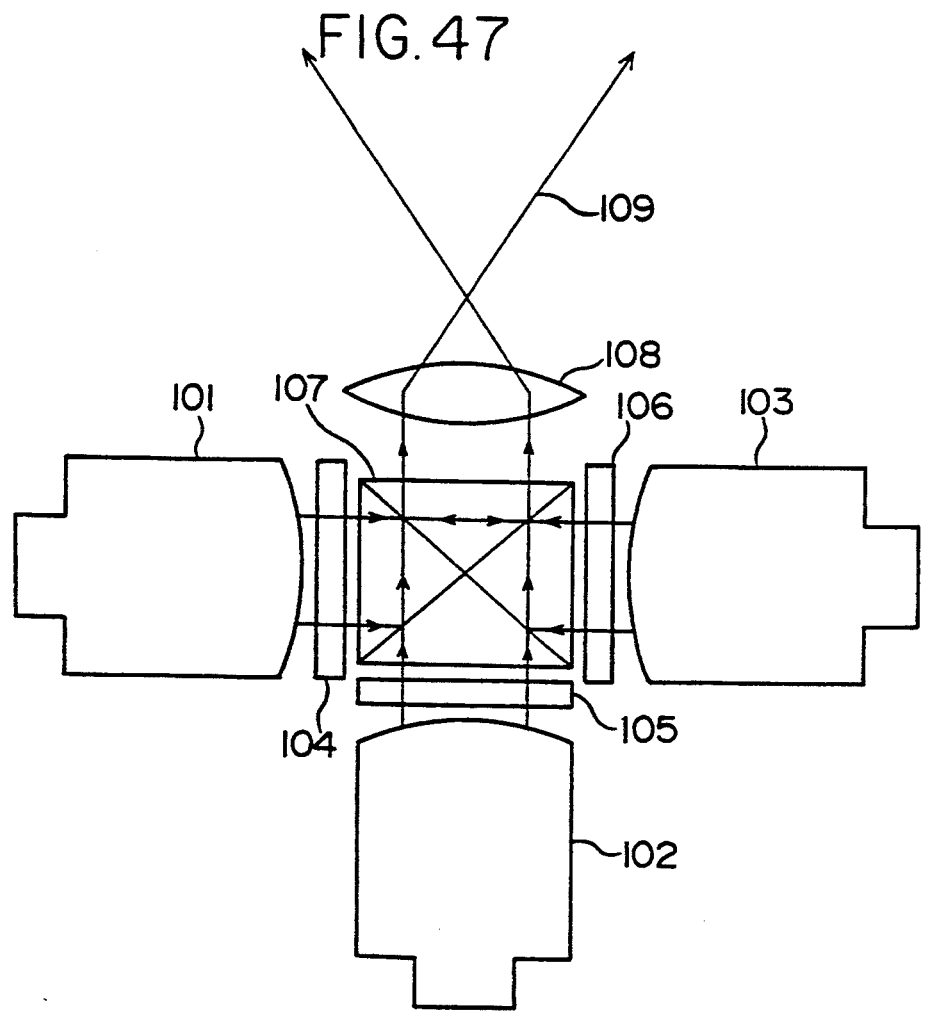
FIG. 47 is a side view showing the structure of the conventional projection type display device.
Figure 48:
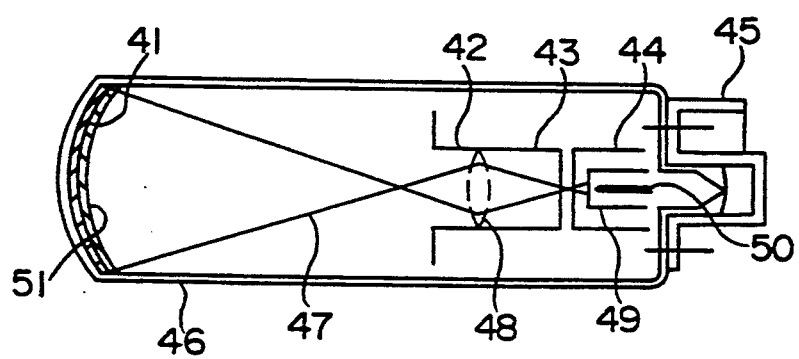
FIG. 48 is a sectional view showing the detailed structure of the light source tube of the conventional projection type display device.

FIG. 24 is a side view showing the structure of the projection type display device provided with a three-color complex type light source tube. The parts identical to those of FIG. 47 are designated by the same reference numerals and the duplicate description is omitted. In the figure, the reference numeral 200 represents three-color light source tube, and the reference numerals 401A and 401B represent mirrors.

Figure 25:
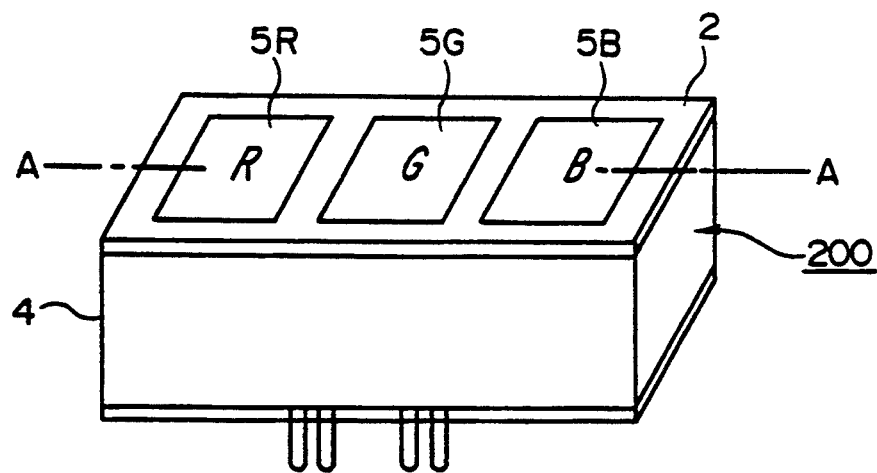
Figure 26:
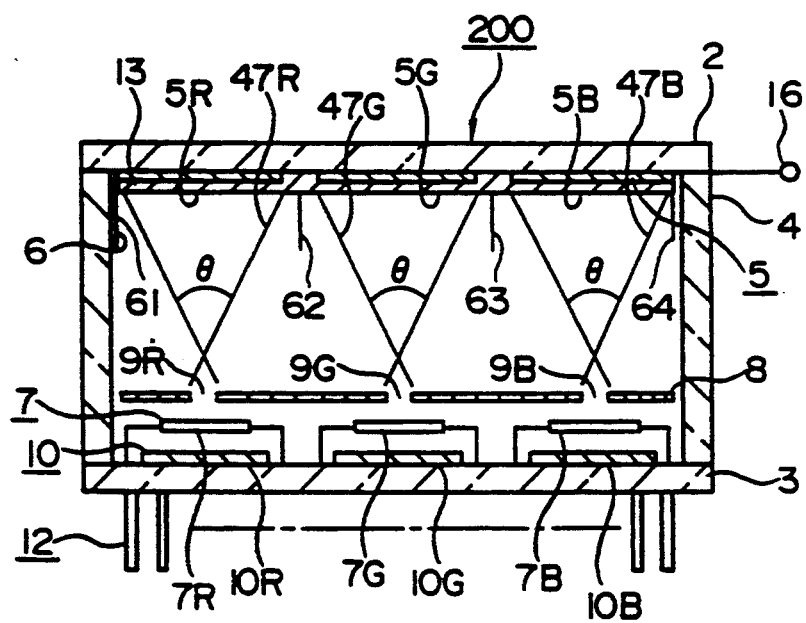
FIG. 26 shows the section of the three-color complex light source tube of FIG. 24 along the line A—A.

FIG. 25 is a perspective view of the three-color light source tube 200 of FIG. 24. FIG. 26 is a sectional view along the line A—A in FIG. 25. In FIGS. 25 and 26, the three-color light source tube 200 consists of a vacuum housing or a glass tube hermetically sealed by the front panel 2, the back plate 3, and the tubular side plate 4. On the interior surface of the front panel 2 is formed the light-emitting surface 5, which includes light-emitting portions 5R, 5G, and 5B consisting of the fluorescent layers emitting red, green and blue lights, respectively, upon receiving the electronic beam. The reference numeral 6 represents the anode group consisting of a plurality of acceleration anodes 61 through 64 disposed around the light-emitting portions 5R, 5G, and 5B in correspondence therewith. To these acceleration anodes 61 through 64 is applied a high voltage via the external terminal 16. The aluminum pack layer 13 is formed on the surface of the light-emitting portions 5R, 5G, and 5B, and is electrically connected to the acceleration anode group 6. The cathode group 7 includes cathodes 7R, 7G, and 7B for electron emission, disposed separately in correspondence to the respective light-emitting portions R, 5G, 5B of the light-emitting surface 5. These cathodes 7R, 7G, and 7B are supported at respective ends by a pair of support members fixed on the back plate 3. By the way, the cathodes 7R, 7G, and 7B may consist of the indirectly-heated cathodes having an oxide coating formed upon a Ni sleeve, or the directly heated cathodes having an oxide coating formed upon tungsten. The control grid electrode 8 is disposed halfway between the cathode group 7 and the light-emitting surface 5. The electron passage holes 9R, 9G, and 9B are formed through the control grid electrode 8 for passing the electron beams 47R, 47G, and 47B coming from the cathodes 7R, 7G, 7B as non-convergent beams, in correspondence with the respective light-emitting portions 5R, 5G, 5B of the light-emitting surface 5. The backside electrode group 10 consists of back electrodes 10R, 10G, and 10B opposing the respective light-emitting portions 5R, 5G, 5B of the light-emitting surface 5 upon the back plate 3 constituting a part of the vacuum container. The back electrodes 10R, 10G, and 10B consist of electrically conductive layers made of a material such as Ag. Negative, zero, or positive voltages at several Volts with respect to the cathodes 7R, 7G, and 7B are applied on the respective back electrodes 10R, 10G, and 10B, such that the electron beams 47R, 47G, and 47B emitted from the cathodes 7R, 7G, and 7B can be controlled individually. Further, a negative, zero, or positive voltage at several Volts with respect to the cathodes 7R, 7G, and 7B is applied on the control grid electrode 8, such that the electron beams 47R, 47G, and 47B emitted from the cathodes 7R, 7G, and 7B are controlled as a whole. By the way, the reference numeral 12 represents the leads serving as external terminals for providing external connection through the back plate 3 for the respective electrodes of the cathode group 7, the control grid electrode 8 and the backside electrode group 10.

Next, the operation is described. First, when the back electrodes 10R, 10G, and 10B are at a negative potential with respect to the potential of the cathodes 7R, 7G, and 7B, the cathodes 7R, 7G, and 7B are surrounded by negative potential. Thus, the electrons emitted from the respective cathodes 7R, 7G, and 7B do not flow to the control grid electrode 8 and the acceleration anodes 61 through 64, and are in the cut-off state. Then a positive potential increasing from zero to several Volts relative to the cathodes 7R, 7G, and 7B is applied to the back electrodes 10R, 10G, and 10B, the electron beams 47R, 47G, and 47B emitted from the cathodes 7R, 7G, and 7B begin to flow toward the control grid electrode 8. So long as the potential of the control grid electrode 8 is negative with respect to the cathodes 7R, 7G, and 7B, the electron beams 47R, 47G, and 47B cannot pass through the electron passage holes 9R, 9G, and 9B of the control grid electrode 8, and the electron beams 47R, 47G, and 47B do not flow to the acceleration anodes 61 through 64. The respective light-emitting portions 5R, 5G, and 5B of the light-emitting surface 5 thus do not emit light. When a positive potential from zero to several Volts is applied to the control grid electrode 8 relative to the cathodes 7R, 7G, and 7B, the electron beams 47R, 47G, and 47B pass through the electron passage holes 9R, 9G, and 9B of the control grid electrode 8, to irradiate the respective light-emitting portions 5R, 5G, and 5B such that the light-emitting portions 5R, 5G, and 5B emit light.

The electron beams 47R, 47G, and 47B are formed into non-convergent beams of predetermined diverging angle $\theta$, which is determined by various conditions such as the diameter of the electron passage holes 9R, 9G, and 9B of the control grid electrode 8, the separation between the control grid electrode 8 and the cathodes 7R, 7G, and 7B, and the anode voltage. The electron beams 47R, 47G, and 47B are irradiated over the respective whole surface of the light-emitting portions 5R, 5G, and 5B. Thus the light-emitting portions 5R, 5G, and 5B emit light at a high luminance.

Further, by adjusting the voltage at the control grid electrode 8, the luminance of the three-color light source tube 200 as a whole can be adjusted. Furthermore, by adjusting the voltages of the back electrodes 10R, 10G, and 10B individually, the luminances of the emitted light of respective color, red, green and blue, can be adjusted independently of each other. Thus, the three color lights consisting of the red light 403R, the green light 403G, and the blue light 403B are emitted from the three-color light source tube 200. The red light 403R is first reflected by the mirror 401A and then is transmitted through the red light valve 104 displaying the red component image. The red light image is then reflected by the synthesis prism 107. The green light 403G transmits through the green light valve 105 displaying the green component image. The green light image is then transmitted through the synthesis prism 107. The blue light 403B is first reflected by the mirror 401B and then is transmitted through the blue light valve 106 displaying the blue component image. The blue light image is then reflected by the synthesis prism 107. Thus, the image synthesized by the synthesis prism 107 is magnified by the projection lens 108 and the resulting projection light 109 is projected on the screen (not shown).

Under this circumstance, by using the TN mode liquid crystal panels of TFTs (thin film transistors) as the liquid crystal light valves, multi-gradation display for respective colors is rendered feasible and thus a full-color display of the screen image is realized.

Further, by adjusting the voltage of the control grid electrode 8, the luminance of the screen image can be varied. Thus, an image at the optimal luminance adapted to the illumination of the screen installation environment can be obtained. Further, by adjusting the voltages of the respective back electrodes 10R, 10G, and 10B, the luminance of the respective colors of red, green and blue of the screen image can be adjusted individually. Thus, the chromaticity adjustment such as the white balance can be effected without difficulty.

As described above, the light source tube includes within a single housing three light-emitting portions for emitting three primary colors, which portions are made of an electron excitation fluorescent substance of high light emitting efficiency. Consequently, the number of parts can be reduced and the high voltage wirings are unified. Thus, the probability of the misfunctions of the peripheral electronic circuits or failures thereof can almost be eliminated. Furthermore, since the light-emitting portions of three colors are aligned on a plane, an adjustment mechanism for a single light source tube is sufficient. As a result, a low-cost and small-sized projection type display device of a high reliability can be realized.

For the purpose of enhancing the light-emitting efficiency of the three-color light source tube 200, it is possible to dispose a multi-layer film of a dielectric material between the front panel 2 and the light-emitting surface 5, thereby condensing the emitted light along the normal to the surface of the front panel 2.

Further it is possible to enhance the light-emitting efficiency and to prolong the life of the fluorescent material by disposing at the front portion of the front panel 2 of the three-color light source tube 200 a coolant unit consisting of a transparent container filled with a coolant liquid such as ethylene glycol or silicone oil, and thereby preventing the temperature rise of the fluorescent layer.

In the description of the above embodiment of FIGS. 24 through 26, the case where a synthesis prism is used as the optical element for synthesizing three-color optical images is described. The same effect can be obtained by using an assembly consisting of a plurality of dichroic mirrors which reflect one of the three colors, red, green and blue, respectively.

Further, in the description of the above embodiment of FIGS. 24 through 26, the light valves of transmitting type are taken as examples. However, the same effect can be obtained by radiating the light from the light source upon the reflection type light valves and then projecting the light via projection lens upon a screen and thereby magnifying the reflected optical images formed upon the light valves.

Further, in the description of the above embodiment of FIGS. 24 through 26, the case where a single light source tube emits three colors of red, green and blue. However, in the case where the displayed colors upon the screen may be predetermined plural colors, the colors emitted from the light source tubes may be other than red, green and blue. Further, the same effect can be obtained where two light-emitting portions consisting of two distinct colors are provided within a single light source tube.

Further, in the case of the above embodiment of FIGS. 24 through 26, the case has been described where the control grid electrode 8 disposed between the cathode group 7 and the light-emitting surface 5 is used as the first control electrode means for adjusting the luminance of the screen as a whole and the backside electrode group 10 at the back of the cathode group 7 is used as the second control electrode means for controlling the respective light-emitting luminance individually. However, the structures of the electrodes are not limited to these. The first control electrode means for adjusting the luminance of the whole screen may be disposed upon the same plane as the backside electrode group 10 at the back of the cathode group 7 for controlling the luminance of the respective colors individually, such that the first control electrode means opposes the backside electrode group 10 in the form of combs. Furthermore, the same effect as that of the embodiment of FIGS. 24 through 26 can be obtained by disposing the second control electrode means for controlling the luminance of respective colors between the control grid electrode 8 for adjusting the luminance of the whole screen and the respective cathodes 7R, 7G, and 7B.

PROJECTION TYPE DISPLAY DEVICE HAVING COMPLEX LIGHT SOURCE WITH PLANO-CONVEX CONDENSOR LENS

Next, the projection type display device having a complex light source provided with a plano-convex condenser lens is described by reference to FIGS. 27, 28, and 29.

Figure 27:
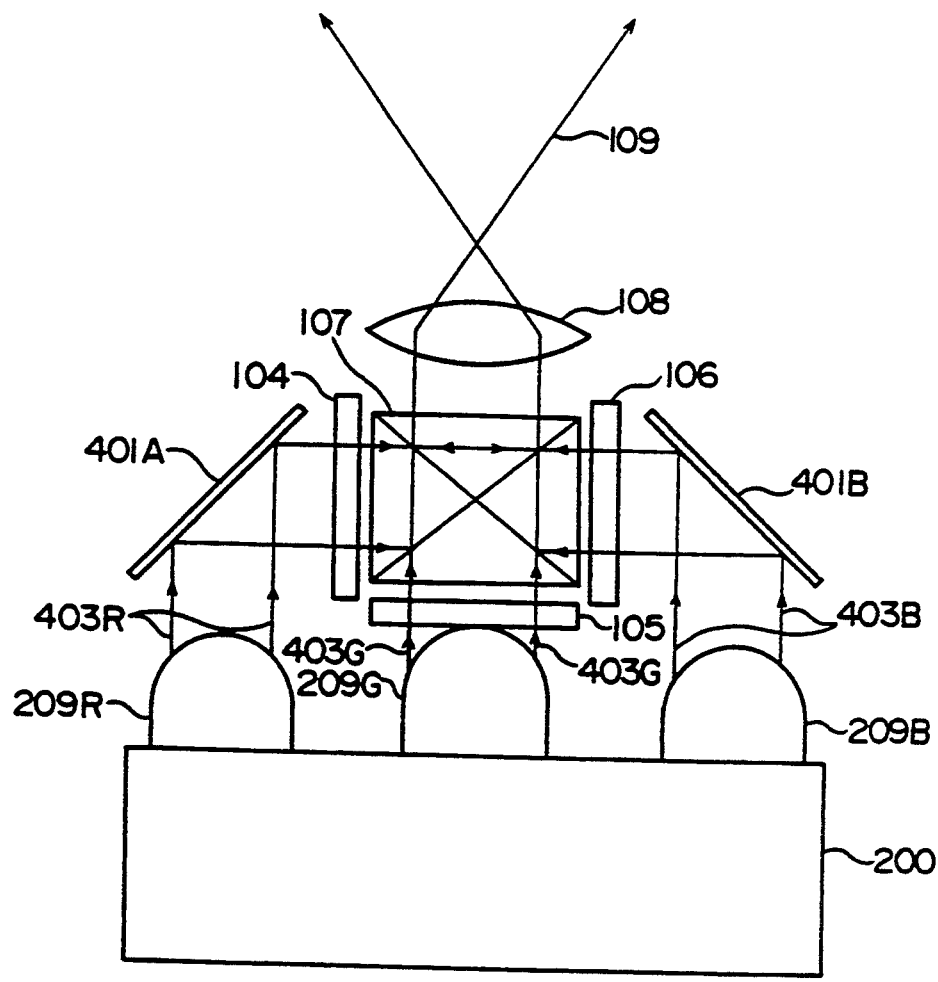
FIG. 27 is a side view showing the structure of the projection type display device having a three-color complex light source tube provided with light-condensing lenses.

FIG. 27 is a view showing the structure of an embodiment of the projection type display device according to this invention. In the figure, the reference numeral 200 represents a three-color light source tube; the reference numerals 401A and 401B represent mirrors; and the reference numerals 209R, 209G, 209B represent plano-convex lenses formed by acrylic resin molding. The red liquid crystal light valve 104 modulates the red light; the green light valve 105 modulates the green light; and the blue light valve 106 modulates the blue light. The synthesis prism 107 synthesizes the red, green and blue light. The projection lens 108 projects the synthesized light.

Figure 28:
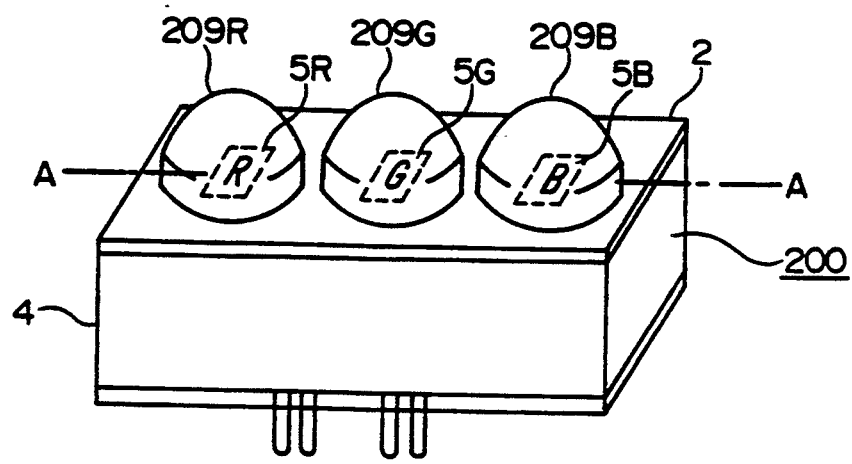
FIG. 28 is a perspective view of the three-color complex light source tube of FIG. 24.
Figure 29:
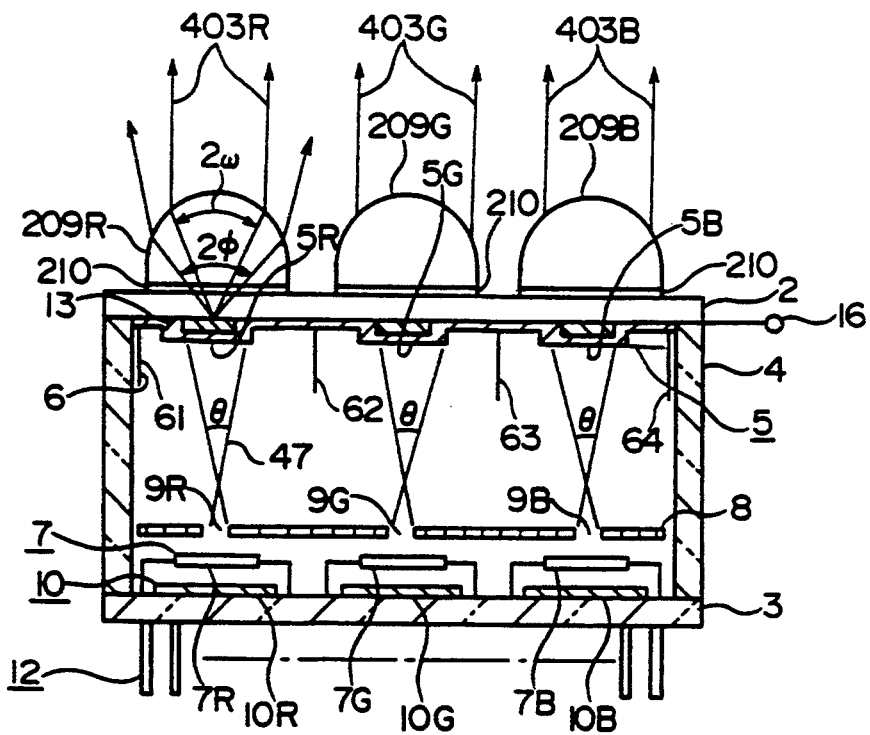
FIG. 29 shows the section of the three-color complex light source tube of FIG. 27 along the line A—A.

FIG. 28 is a perspective view of the three-color light source tube 200 of FIG. 27. FIG. 29 is a sectional view along the line A—A in FIG. 28. In FIGS. 28 and 29, the three-color light source tube 200 consists of a vacuum housing or a glass tube hermetically sealed by the front panel 2, the back plate 3, and the tubular side plate 4. On the interior surface of the front panel 2 is formed the light-emitting surface 5, which includes light-emitting portions 5R, 5G, and 5B consisting of the fluorescent layers emitting red, green and blue lights, respectively, upon receiving the electron beam. The dimensions of the respective light-emitting portions 5R, 5G, and 5B are smaller than the dimensions of the image forming portion of the light valves 104, 105, and 106 of respective colors. The reference numeral 6 represents the anode group consisting of a plurality of acceleration anodes 61 through 64 disposed around the light-emitting portions 5R, 5G, and 5B in correspondence therewith. To these acceleration anodes 61 through 64 is applied a high voltage via the external terminal 16. The aluminum pack layer 13 is formed on the surface of the light-emitting portions 5R, 5G, and 5B, and is electrically connected to the acceleration anode group 6. The cathode group 7 includes cathodes 7R, 7G, and 7B for electron emission, disposed separately of each other in correspondence to the respective light-emitting portions 5R, 5G, 5B of the light-emitting surface 5. These cathodes 7R, 7G, and 7B are supported at respective ends by a pair of support members fixed on the back plate 3. By the way, the cathodes 7R, 7G, and 7B may consist of the indirectly-heated cathodes having an oxide coating formed upon a Ni sleeve, or the directly heated cathodes having an oxide coating formed upon tungsten. The control grid electrode 8 is disposed halfway between the cathode group 7 and the light-emitting surface 5. The electron passage holes 9R, 9G, and 9B are formed through the control grid electrode 8 for passing the electron beams 47 coming from the cathodes 7R, 7G, 7B as non-convergent beams, in correspondence with the respective light-emitting portions 5R, 5G, 5B of the light-emitting surface 5.

The backside electrode group. 10 consists of back electrodes 10R, 10G, and 10B opposing the respective light-emitting portions 5R, 5G, 5B of the light-emitting surface 5 upon the back plate 3 constituting a part of the vacuum container. The back electrodes 10R, 10G, and 10B consist of electrically conductive layers made of a material such as Ag. Negative, zero, or positive voltages at several Volts with respect to the cathodes 7R, 7G, and 7B are applied on the respective back electrodes 10R, 10G, and 10B, such that the electron beams 47 emitted from the cathodes 7R, 7G, and 7B can be controlled individually. Further, a negative, zero, or positive voltage at several Volts with respect to the cathodes 7R, 7G, and 7B is applied on the control grid electrode 8, such that the electron beams 47 emitted from the cathodes 7R, 7G, and 7B are controlled as a whole. By the way, the reference numeral 12 represents the leads serving as external terminals for providing external connection through the back plate 3 for the respective electrodes of the cathode group 7, the control grid electrode 8 and the backside electrode group 10. The foci of the plano-convex lenses 209R, 209G, and 209B formed by acrylic molding are positioned substantially at the centers of the light-emitting portions 5R, 5G, and 5B of respective colors. The plano-convex lenses 209R, 209G, and 209B have diameters sufficient to cover the image forming portion of the light valves. The transparent adhesive 210 adheres the plano-convex lenses 209R, 209G, and 209B to the front panel 2 without forming an air gap therebetween.

Next, the operation is described. First, when the back electrodes 10R, 10G, and 10B are at a negative potential with respect to the potential of the cathodes 7R, 7G, and 7B, the cathodes 7R, 7G, and 7B are surrounded by negative potential, and hence the electrons emitted from the respective cathodes 7R, 7G, and 7B do not flow to the control grid electrode 8 and the acceleration anodes 61 through 64, and are in the cut-off state. Then as a positive potential increasing from zero to several Volts relative to the cathodes 7R, 7G, and 7B is applied to the back electrodes 10R, 10G, and 10B, the electron beams 47 emitted from the cathodes 7R, 7G, and 7B begin to flow toward the control grid electrode 8. However, so long as the potential of the control grid electrode 8 is negative with respect to the cathodes 7R, 7G, and 7B, the electron beams 47 cannot pass through the electron passage holes 9R, 9G, and 9B of the control grid electrode 8, and the electron beams 47 do not flow to the acceleration anodes 61 through 64. The respective light-emitting portions 5R, 5G, and 5B of the light-emitting surface 5 thus do not emit light. When a positive potential from zero to several Volts is applied to the control grid electrode 8 relative to the cathodes 7R, 7G, and 7B, the electron beams 47 pass through the electron passage holes 9R, 9G, and 9B of the control grid electrode 8, to irradiate the respective light-emitting portions 5R, 5G, and 5B such that the light-emitting portions 5R, 5G, and 5B emit light.

The electron beams 47 are formed into non-convergent beams of a predetermined diverging angle $\theta$, which is determined by various conditions such as the diameter of the electron passage holes 9R, 9G, and 9B of the control grid electrode 8, the separation between the control grid electrode 8 and the cathodes 7R, 7G, and 7B, and the anode voltage. The electron beams 47 are irradiated over the respective whole surface of the light-emitting portions 5R, 5G, and 5B. It is assumed that the current level of the electron beams 47 is kept constant. Then, as the areas of the respective light-emitting portions 5R, 5G, and 5B are reduced, the intensity of the electrons incident on the respective light-emitting portions 5R, 5G, and 5B, and hence the luminance of the light-emitting portions 5R, 5G, and 5B, increase. Thus, the respective light-emitting portions 5R, 5G, and 5B situated at the focal distance of the plano-convex lenses 209R, 209G, and 209B emit light at a high luminance.

Further, by adjusting the voltage at the control grid electrode 8, the luminance of the three-color light source tube 200 as a whole can be adjusted. Furthermore, by adjusting the voltages of the back electrodes 10R, 10G, and 10B individually, the luminances of the emitted light of respective color, red, green and blue, can be adjusted independently of each other.

Thus the respective light-emitting portions 5R, 5G, and 5B, each having a small area, of the three-color light source tube 200 emit light at a high luminance. When viewed microscopically, there exists gaps of refractive index 1 between the fluorescent layers of the respective light-emitting portions 5R, 5G, and 5B and the front panel 2. Thus, the light emitted from the central portions of the respective light-emitting portions 5R, 5G, and 5B at high luminance is emitted immediately after the emission to the whole of the half-space between the front panel 2 and the fluorescent layers. Then the light is incident on the front panel 2 and the whole flux proceeds within the cone of half-apex angle $\phi$ ($\phi = \sin^{-1}(1/n)$ where n is the refractive index of the front panel 2). Of the whole flux proceeding within the cone of half-apex angle $\phi$, the flux proceeding within the cone of half-apex angle $\omega$ proceeds straight since the front panel 2, the transparent adhesive 210, and the plano-convex lenses 209R, 209G, and 209B have substantially the same refractive index. After going out of the plano-convex lenses 209R, 209G, and 209B, the flux becomes approximately parallel.

The substantially parallel red light 403R is reflected by the mirror 401A and then is transmitted through the image forming portion of the red liquid crystal light valve 104 on which the image of the red component is displayed. The red light image is then reflected by the synthesis prism 107. The substantially parallel green light 403G is transmitted through the image forming portion of the green light valve 105 on which the image of the green component is displayed. The green light image is then transmitted through the synthesis prism 107. The substantially parallel blue light 403B is reflected by the mirror 401B and then is transmitted through the image forming portion of the blue light valve 106 on which the image of the blue component is displayed. The blue light image is then reflected by the synthesis prism 107. Thus, the image synthesized by the synthesis prism 107 is magnified by the projection lens 108 and the resulting projection light 109 is projected on the screen (not shown).

Under this circumstance, by using the TN mode liquid crystal panels consisting of TFTs (thin film transistors) as the liquid crystal light valves, multi-gradation display for respective colors is rendered feasible and thus a full-color display of the screen image is realized.

Further, by adjusting the voltage of the control grid electrode 8, the luminance of the screen image can be varied. Thus, an image at the optimal luminance adapted to the illumination of the screen installation environment can be obtained. Further, by adjusting the voltages of the respective back electrodes 10R, 10G, and 10B, the luminance of the respective colors of red, green and blue of the screen image can be adjusted individually. Thus, the adjustment of chromaticity such as the white balance can be effected without difficulty.

As described above, the electron beams at constant current level within the light source tube are irradiated in high concentration upon the fluorescent light-emitting portions having small areas. The whole flux emitted from the fluorescent surfaces are condensed within the cone of half-apex angle $\phi$. The light is further condensed upon exiting the plano-convex lenses. As a result, the percentage of the light reaching the screen from the image forming portion of the liquid crystal light valves 104, 105, and 106 of respective colors increases, and the utilization efficiency of light is highly enhanced. In addition, the light source tube includes within a single housing three light-emitting portions for emitting three primary colors, which portions are made of an electron excitation fluorescent substance of high light emitting efficiency. Consequently, the number of parts can be reduced and the high voltage wirings can be unified into a single line. Thus, the probability of the misfunctions of the peripheral electronic circuits or failures thereof can almost be eliminated. Furthermore, since the light-emitting portions of three colors are aligned on a plane, an adjustment mechanism for a single light source tube is sufficient. As a result, a low-cost and small-sized projection type display device of high reliability can be realized.

Figure 30:
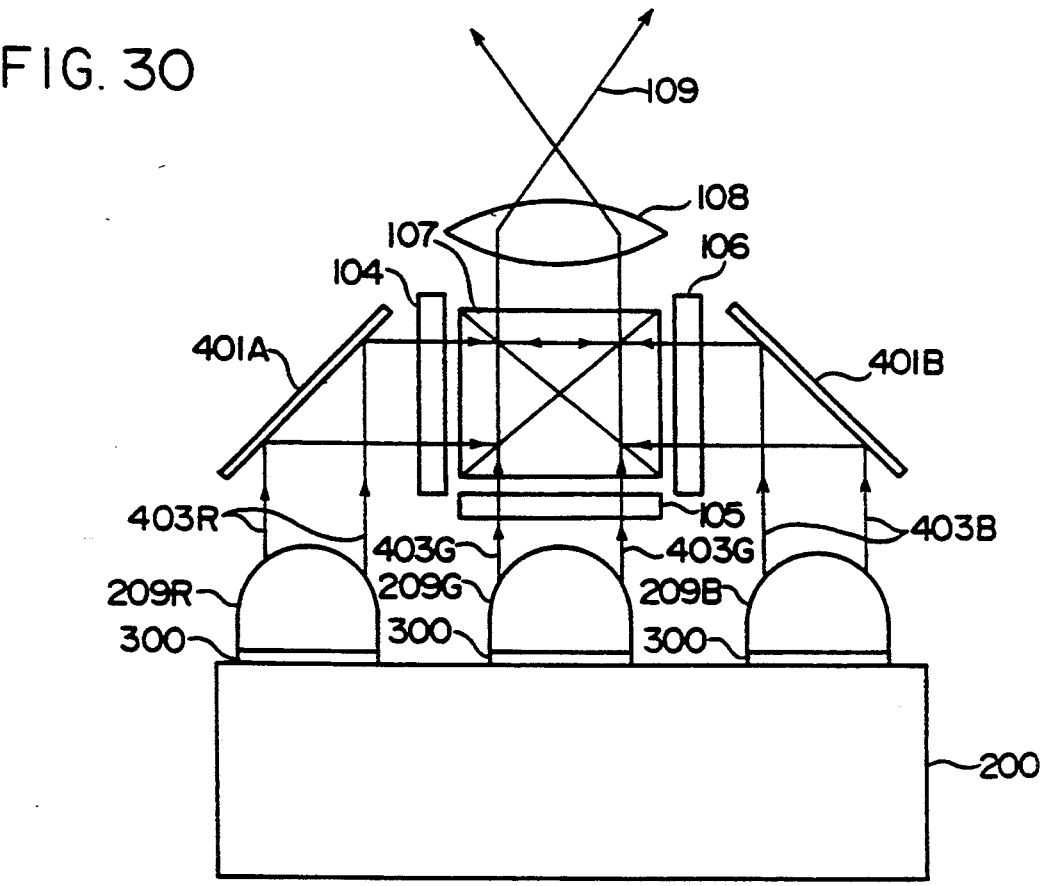
FIG. 30 is a side view showing the structure of another projection type display device having a three-color complex light source tube provided with light-condensing lenses.
Figure 31:
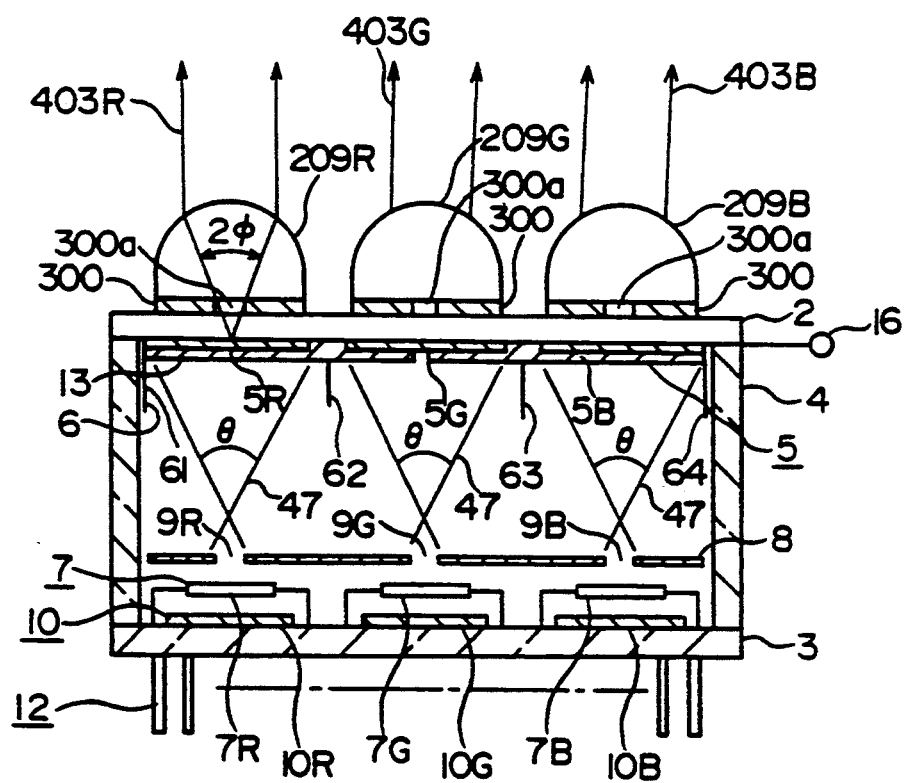
FIG. 31 is a sectional view of the three-color complex light source tube of FIG. 30.

Next, another embodiment is descried by reference to FIGS. 30 and 31.

In the figure, the reference numeral 200 represents a three-color light source tube. The reference numerals 401A and 401B represent mirrors. The diffusive reflection layers 300 having an aperture at the center thereof are disposed on the surface of the light-emitting portions of respective colors of the three-color light source tube. The diffusive reflection layers 300 are formed by applying, for example, magnesium oxide (MgO) upon the surface of the light-emitting portions. The reference numerals 209R, 209G, 209B represent plano-convex lenses formed by acrylic resin molding. The plano-convex lenses 209R, 209G, and 209B are disposed upon the front surface of the light-emitting portions of respective colors of the three-color light source tube, via the diffusive reflection layers. The red liquid crystal light valve 104 modulates the red light; the green light valve 105 modulates the green light; and the blue light valve 106 modulates the blue light. The synthesis prism 107 synthesizes the red, green and blue light. The projection lens 108 projects the synthesized light.

FIG. 31 is a sectional view of a three-color light source tube of FIG. 30. In FIG. 31, the three-color light source tube 200 consists of a vacuum housing or a glass tube consisting of and hermetically sealed by the front panel 2, the back plate 3, and the tubular side plate 4. On the interior surface of the front panel 2 is formed the light-emitting surface 5, which includes light-emitting portions 5R, 5G, and 5B consisting of the fluorescent layers emitting red, green and blue lights, respectively, upon receiving the electron beam. The reference numeral 6 represents the anode group consisting of a plurality of acceleration anodes 61 through 64 disposed around the light-emitting portions 5R, 5G, and 5B in correspondence therewith. To these acceleration anodes 61 through 64 is applied a high voltage via the external terminal 16. The aluminum pack layer 13 is formed on the surface of the light-emitting portions 5R, 5G, and 5B, and is electrically connected to the acceleration anode group 6. The cathode group 7 includes cathodes 7R, 7G, and 7B for electron emission, disposed separately of each other in correspondence with the respective light-emitting portions 5R, 5G, 5B of the light-emitting surface 5. These cathodes 7R, 7G, and 7B are supported at respective ends by a pair of support members fixed on the back plate 3. By the way, the cathodes 7R, 7G, and 7B may consist of the indirectly-heated cathodes having an oxide coating formed upon a Ni sleeve, or the directly heated cathodes having an oxide coating formed upon a tungsten member. The control grid electrode 8 is disposed halfway between the cathode group 7 and the light-emitting surface 5. The electron passage holes 9R, 9G, and 9B are formed through the control grid electrode 8 for passing the electron beams 47 coming from the cathodes 7R, 7G, 7B as non-convergent beams, in correspondence with the respective light-emitting portions 5R, 5G, 5B of the light-emitting surface 5.

The backside electrode group 10 consists of back electrodes 10R, 10G, and 10B opposing the respective light-emitting portions 5R, 5G, 5B of the light-emitting surface 5 upon the back plate 3 constituting a part of the vacuum container. The back electrodes 10R, 10G, and 10B consist of electrically conductive layers made of a material such as Ag. Negative, zero, or positive voltages at several Volts with respect to the cathodes 7R, 7G, and 7B are applied on the respective back electrodes 10R, 10G, and 10B, such that the electron beams 47 emitted from the cathodes 7R, 7G, and 7B can be controlled individually. Further, a negative, zero, or positive voltage at several Volts with respect to the cathodes 7R, 7G, and 7B is applied on the control grid electrode 8, such that the electron beams 47 emitted from the cathodes 7R, 7G, and 7B are controlled as a whole. By the way, the reference numeral 12 represents the leads serving as external terminals for providing external connection through the back plate 3 for the respective electrodes of the cathode group 7, the control grid electrode 8 and the backside electrode group 10.

The diffusive reflection layers 300 formed on the surface of the front panel 2 at the proceeding direction of the emitted light each have an aperture 300a at the center thereof. The plano-convex lenses 209R, 209G, and 209B formed by acrylic molding are attached upon the front of the front panel 2 via the diffusive reflection layers 300 by means of a transparent adhesive, such that the optical axes are positioned at the center of the respective apertures 300a. The plano-convex lenses 209R, 209G, and 209B have such forms that the foci thereof are positioned substantially at the center of the light-emitting portions 5R, 5G, and 5B of respective colors. The plano-convex lenses 209R, 209G, and 209B are adhered to the front panel 2 without an air gap therebetween, at the respective aperture 300a of the diffusive reflection layers 300.

Next, the operation of the embodiment of FIGS. 30 and 31 is described.

First, when the back electrodes 10R, 10G, and 10B are at a negative potential with respect to the potential of the cathodes 7R, 7G, and 7B, the cathodes 7R, 7G, and 7B are surrounded by negative potentials. Thus, the electrons emitted from the respective cathodes 7R, 7G, and 7B do not flow to the control grid electrode 8 and the acceleration anodes 61 through 64, and are in the cut-off state. Then as a positive potential increasing from zero to several Volts relative to the cathodes 7R, 7G, and 7B is applied to the back electrodes 10R, 10G, and 10B, the electron beams 47 emitted from the cathodes 7R, 7G, and 7B begin to flow toward the control grid electrode 8. However, so long as the potential of the control grid electrode 8 is negative with respect to the cathodes 7R, 7G, and 7B, the electron beams 47 cannot pass through the electron passage holes 9R, 9G, and 9B of the control grid electrode 8, and the electron beams 47 do not flow to the acceleration anodes 61 through 64. Thus the respective light-emitting portions 5R, 5G, and 5B of the light-emitting surface 5 do not emit light. When a positive potential from zero to several Volts is applied to the control grid electrode 8 relative to the cathodes 7R, 7G, and 7B, the electron beams 47 pass through the electron passage holes 9R, 9G, and 9B of the control grid electrode 8, to irradiate the respective light-emitting portions 5R, 5G, and 5B such that the light-emitting portions 5R, 5G, and 5B emit light.

The electron beams 47 are formed into non-convergent beams of predetermined diverging angle $\theta$, which is determined by various conditions such as the diameter of the electron passage holes 9R, 9G, and 9B of the control grid electrode 8, the separation between the control grid electrode 8 and the cathodes 7R, 7G, and 7B, and the anode voltage. The electron beams 47 are irradiated over the respective whole surface of the light-emitting portions 5R, 5G, and 5B.

Thus, the light-emitting portions 5R, 5G, and 5B of respective colors of the three-color light source tube 200 emit light of three colors, red, green and blue, which tends to go out through the front panel 2. When viewed microscopically, there exist gaps of refractive index 1 between the fluorescent layers of the respective light-emitting portions 5R, 5G, and 5B and the front panel 2. Thus, the light emitted from the fluorescent layers at the center of the aperture 300a of the diffusive reflection layers 300 is emitted immediately after the emission to the whole of the half-space between the front panel 2 and the fluorescent layers of the respective light-emitting portions 5R, 5G, and 5B. Then the light is incident on the front panel 2 and the respective whole fluxes proceed within the cones of half-apex angle $\phi$ (where $\phi=\sin^{-1}(1/n)$ and n is the refractive index of the front panel 2). Thus, representing the thickness of the front panel 2 by t, if the radius of the apertures 300a is equal to $t \cdot \tan \phi$, then all the light emitted from these points to the half-space proceeds within the cones of the half-apex angle $\phi$ within the plano-convex lenses 209 without being screened off by the diffusive reflection layers.

On the other hand, the light emitted from points of the respective light-emitting portions 5R, 5G, and 5B other than at the aperture 300a proceeds within the cones of the half-apex angle $\phi$ within the front panel 2, and hits upon the diffusive reflection layers 300 to be subjected to an irregular reflection. Further, a part thereof again undergoes an irregular reflection at the interface of the front panel 2 at the side of the fluorescent layers, or at the fluorescent layers 300. The light emitted from the points other than at the aperture 300a repeats irregular reflections at both interfaces of the front panel 2. Only the light reaching the points at the center of the aperture 300a passes through the aperture 300a of the diffusive reflection layers 300 to proceed within the plano-convex lenses 209.

Thus, the light proceeding within the plano-convex lenses 209R, 209G, and 209B after passing through the apertures 300a of the diffusive reflection layers 300 is the sum of the light directly coming from the points at the center of the apertures 300a and the multiple reflection light originating from other points. Hence the light is at a high luminance. The light at high luminance of respective colors proceeding within the cones of half-apex angle $\phi$ within the plano-convex lenses 209R, 209G, and 209B becomes substantially parallel upon going out of the plano-convex lenses 209R, 209G, and 209B, and then is transmitted through the whole area of the image forming portions of the liquid crystal light valves 104, 105, and 106 of respective colors.

Further, by adjusting the voltage of the control grid electrode 8, the luminance of the three-color light source tube 200 as a whole can be controlled. Further, by adjusting the voltages of the back electrodes 10R, 10G, and 10B individually, the luminance of the emitted light of respective colors, red, green and blue, can be controlled independently of each other.

Thus substantially parallel lights of three colors: the red light 403R, the green light 403G, and the blue light 403B, are emitted. The substantially parallel red light 403R is reflected by the mirror 401A and then is transmitted through the image forming portion of the red liquid crystal light valve 104 on which the image of the red component is displayed. The red light image is then reflected by the synthesis prism 107. The substantially parallel green light 403G is transmitted through the image forming portion of the green light valve 105 on which the image of the green component is displayed. The green light image is then transmitted through the synthesis prism 107. The substantially parallel blue light 403B is reflected by the mirror 401B and then is transmitted through the image forming portion of the blue light valve 106 on which the image of the blue component is displayed. The blue light image is then reflected by the synthesis prism 107. Thus, the image synthesized by the synthesis prism 107 is magnified by the projection lens 108 and the resulting projection light 109 is projected on the screen (not shown).

Under this circumstance, by using the TN mode liquid crystal panels consisting of TFTs (thin film transistors) as the liquid crystal light valves, multi-gradation display for respective colors is rendered feasible and thus a full-color display of the screen image is realized.

Further, by adjusting the voltage of the control grid electrode 8, the luminance of the screen image can be varied. Thus, an image at the optimal luminance adapted to the illumination of the screen installation environment can be obtained. Further, by adjusting the voltages of the respective back electrodes 10R, 10G, and 10B, the luminance of the respective colors of red, green and blue of the screen image can be adjusted individually. Thus, the adjustment of chromaticity such as the white balance can be effected without difficulty.

As described above, the diffusive reflection layers each having an aperture are disposed upon the front surface of the fluorescent layers, such that the light going out of the apertures include the multiple reflection light reflected at the fluorescent layers and at the reflection layers. Further, most of the light is guided to the light valves and the projection lens by means of the light-condensing effect of the lenses. Thus the utilization efficiency of light is enhanced. In addition, the light source tube includes within a single housing three light-emitting portions for emitting three primary colors, which portions are made of an electron excitation fluorescent substance of high light emitting efficiency. Consequently, the number of parts can be reduced and the high voltage wirings can be unified into a single line. Thus, the probability of the misfunctions of the peripheral electronic circuits or failures thereof can almost be eliminated. Furthermore, since the light-emitting portions of three colors are aligned on a plane, an adjustment mechanism for a single light source tube is sufficient. As a result, a low-cost and small-sized projection type display device of a high reliability can be realized.

Figure 32:
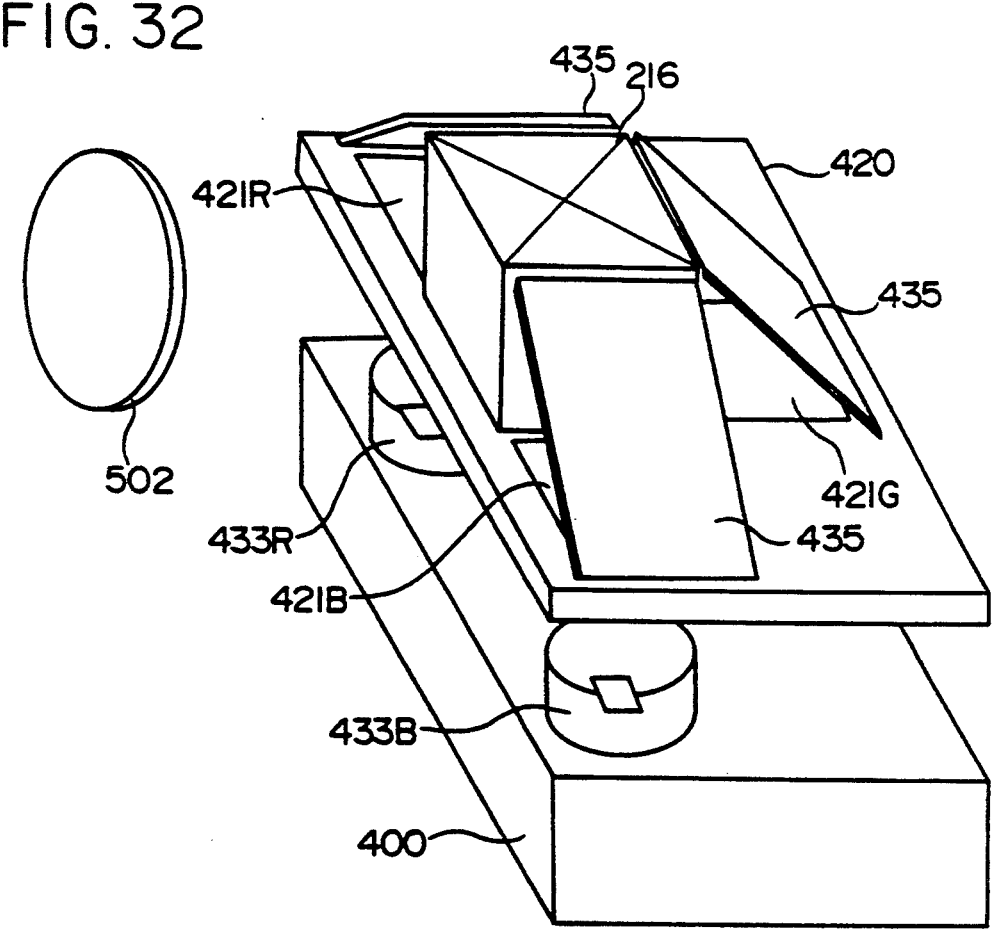
FIG. 32 is a perspective view of still another projection type display device having a three-color complex light source tube provided with a light-condensing lens.
Figure 33:
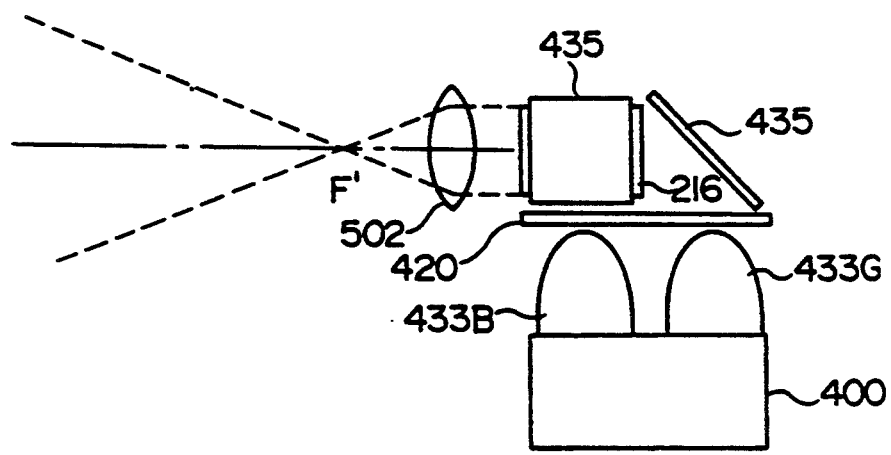
FIG. 33 is a side view of the projection type display device of the complex light source type of FIG. 32.

FIG. 32 is a perspective view of a projection type display device having a complex light source with plano-convex lenses according to this invention. FIG. 33 is a side view of the device of FIG. 32.

In FIG. 32, the reference numeral 216 represents a dichroic prism for synthesizing the red, green and blue light. The reference numeral 502 represents a projection lens for projecting the synthesized light. The reference numeral 435 represents a mirror for reflecting the light. An active matrix type liquid crystal light valve 420 for modulating light includes three image display portions: a red image display portion 421R, a green image display portion 421G, and a blue image display portion 421B. Upon the three-color light source tube 400 for emitting red, green and blue light are disposed the plano-convex lenses 433R, 433G, and 433B, at positions opposing the red, green and blue image display portions 421R, 421G, and 421B, between the liquid crystal light valve 420 and the three-color light source tube 400. The plano-convex lenses 433R, 433G, and 433B are closely attached at the planar side thereof to the three-color light source tube 400 without an air gap formed therebetween, by means of a transparent adhesive.

Figure 34:
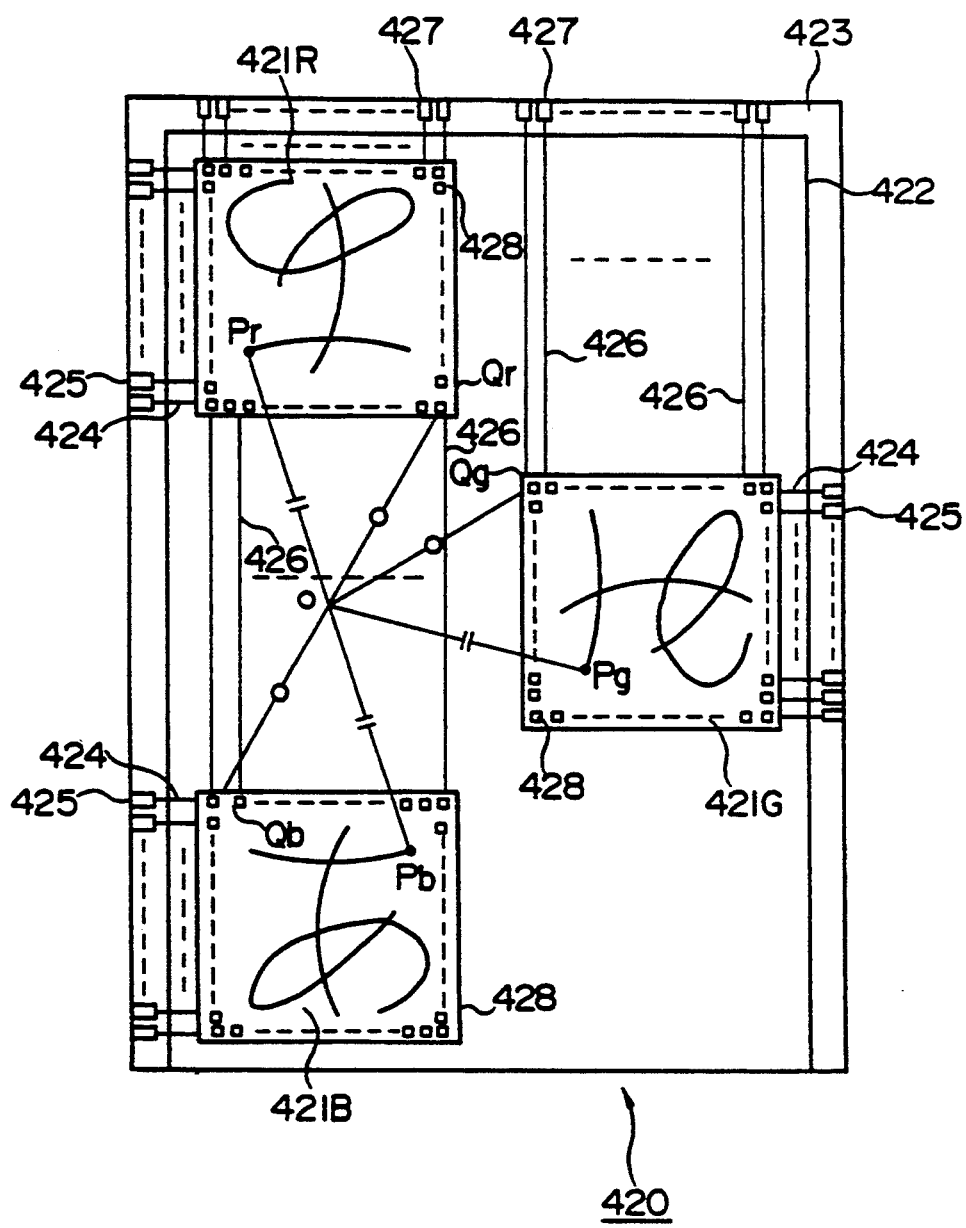
FIG. 34 is a view showing the image pattern on the liquid crystal light valve of the projection type display device of the complex light source type.

FIG. 34 shows an example of the pattern formed upon the liquid crystal light valve 420. Between an upper glass plate 422 and a lower glass plate 423 is sealed a liquid crystal with an appropriate orientation treatment. On the lower glass plate 423 are disposed the display signal lines 424 and the scan lines 426 running at right angles. To respective intersections of these lines are connected pixel electrodes 428 via thin film transistors (not shown). The signals are applied from the exterior to the display signal lines 424 via the display signal terminals 425, and to the scan lines 426 via the signal terminals 427. On the interior surface of the upper glass plate 422 are disposed the opposing electrodes consisting of transparent electrodes.

The red, green and blue image display portions 421R, 421G, and 421B consist of collections of the pixel electrodes 428. The three image display portions are synthesized into a single image upon the projection screen (not shown). As shown in FIG. 34, the corresponding pixel electrodes of the three image display portions constituting the respective points synthesized upon the projection screen are situated at the same distance from the point O. Namely, the pixels corresponding to a corner upon the screen are represented by the pixel electrodes Qr, Qg, and Qb upon the red, green and blue image display portions 421R, 421G, and 421B, respectively. Pixels corresponding to a point on a character upon the screen are represented by the pixel electrodes Pt, Pg, and Pb upon the red, green and blue image display portions 421R, 421G, and 421B,.respectively. The pixel electrodes Qr, Qg, and Qb are at an equal distance from the point O. The pixel electrodes Pt, Pg, and Pb are also at an equal distance from the point O. Namely, the respective points of the three image display portions corresponding to an arbitrary point of the optical image displayed on the projection screen are situated upon a circle having its center at the point O. Further, the center of the light synthesis of the dichroic prism 216 of FIG. 32 is positioned exactly upon the point O.

Figure 35:
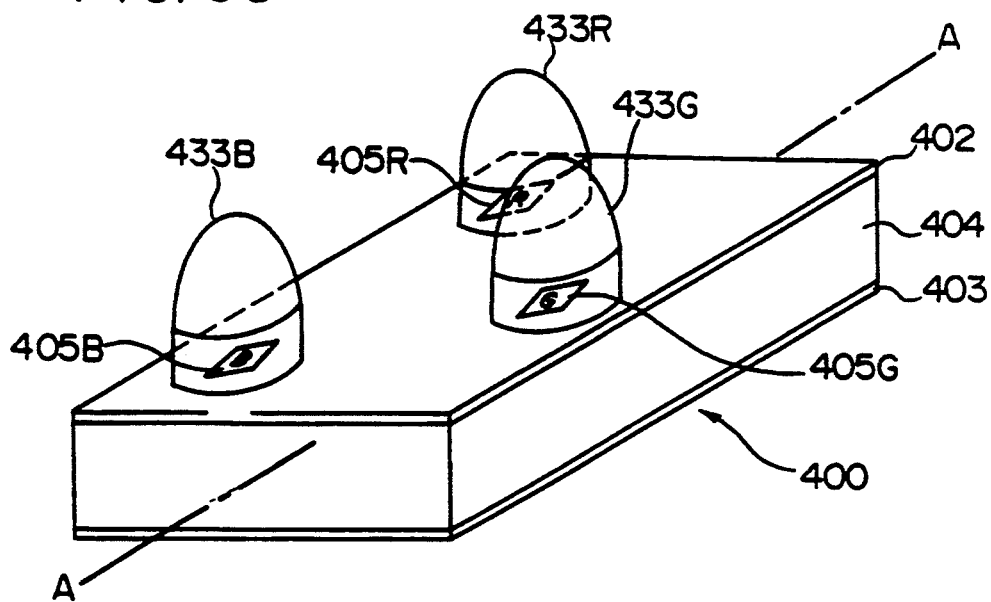
FIG. 35 is a perspective view near the complex type light source of the projection type display device of FIG. 32.
Figure 36:
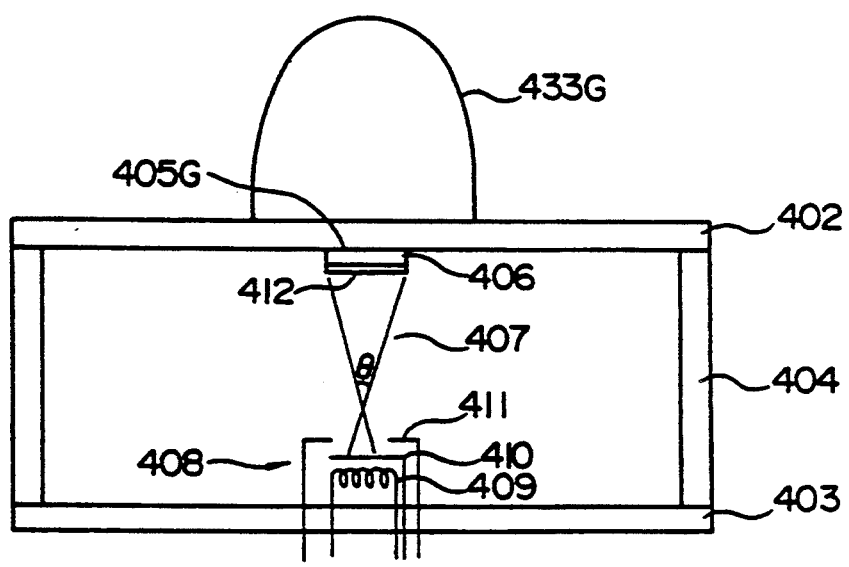
FIG. 36 is a sectional view along line A—A of FIG. 35.

FIG. 35 is a perspective view of the three-color light source tube 400 and the plano-convex lenses 433R, 433G, and 433B. FIG. 36 is a sectional view along the line A—A in FIG. 35 of the three-color light source tube 400 and the plano-convex lens 433G. In the figure, the three-color light source tube 400 consists of a glass housing or a vacuum container consisting of and sealed by: a front panel 402, a back plate 403, and a side plate member 404. Upon the inner surface of the front panel 402 are disposed three light-emitting portions 405R, 405G, and 405B consisting of the fluorescent layers 406 emitting light of red, green and blue, respectively. The dimension of the three light-emitting portions 405R, 405G, and 405B is smaller than the dimension of the red, green and blue image display portions 421R, 421G, and 421B of the liquid crystal light valve 420. The convex surface of the plano-convex lenses 433R, 433G, and 433B is an ellipsoid generated by rotating an ellipse around the x-axis. The ellipse is represented by:

$$(x-c)^2 / a^2 + y^2 / b^2 = 1$$

If the length of the diagonal of the image forming portion of the light valve is represented by L, and the refractive index of the lens by n, then:

$$b \geq L/2,$$

$$a = b\, n(n^2-1)^{-\frac{1}{2}}, \text{ and}$$

$$c = b(n^2-1)^{-\frac{1}{2}}.$$

Further, the three light-emitting portions 405R, 405G, and 405B are disposed at positions corresponding to the origin of the above formula of the ellipse.

Furthermore, upon the back plate 403 of the three-color light source tube 400 are disposed three electron guns 408 (two of which are not shown) for irradiating the whole surface of the fluorescent layers 406, respectively, by the non-convergent electron beams 407, in correspondence with the respective light-emitting portions 405R, 405G, and 405B. The electron guns 408 consist of the heater 409, the cathode 410, and the grid 411. Further, the fluorescent layers 406 are made of: ZnS:Ag, Cl for blue; ZnS:Au, Cu, Al for green; and $Y_2O_2S:Eu^{3+}$ for red. Upon the respective fluorescent layers 406 are formed the aluminum back layer 412 serving as the anodes for applying a high voltage.

Next the operation is described. First, a high voltage at ten plus several KV (kilovolts) is applied on the aluminum back layer 412, and a negative voltage is applied on the grid 411 relative to the cathode 410. Further, predetermined current is supplied to the heater 409 to heat the cathode 410, and the voltage of the grid 411 is adjusted near to the voltage of the cathode 410, such that the electron beams 407 are emitted from the cathode 410 to the fluorescent layers 406. The electron beams 407 are accelerated and irradiated upon the whole surface of the fluorescent layers 406 as the non-convergent electron beams 407 having a predetermined diverging angle $\theta$, which depends on various conditions such as the diameter of the holes formed at the center of the grid 411, the separation between the grid 411 and the cathode 410, and the anode voltage at the aluminum back layer 412. The respective light-emitting portions 405R, 405G, and 405B of the fluorescent layers 406 thus emit light of the color corresponding to the respective fluorescent layers at a high luminance. It is assumed that the current level of the over-convergent electron beams 407 is kept constant. Then, as the area of the fluorescent layers 406 decreases, the intensity of the electrons incident upon the fluorescent layers 406 increases. Hence the light-emitting luminance of the fluorescent layers 406 also increases. As a result, the fluorescent layers 406 each having a small area emit light at an extremely high luminance.

The light emitted to the half-space from the fluorescent layer 406 is incident on the front panel 402 immediately after passing the microscopic space of refractive index 1. Thus, the whole flux proceeds within the cone of half-apex angle $\phi$ (where $\phi = \sin^{-1}(1/n)$ and n is the refractive index of the front panel). Since the front panel 402 and the plano-convex lens 433G have substantially the same refractive index, the whole flux proceeding within the cone propagates straight and reaches the surface of the plano-convex lens 433G. It is assumed that the surface of this lens has the form of the ellipsoid of revolution as described above. Then, the light becomes parallel to the optical axis after refraction for arbitrary light within the range: $-\tan^{-1}(b/c) \leq \theta \leq \tan^{-1}(b/c)$ where $\theta$ is the outgoing angle from the origin. Thus, if $n=1.5$, it follows that $|\phi| \leq |\tan^{-1}(b/c)|$. Consequently, the whole flux emitted from the fluorescent layer 406 to the half-space is formed into a completely parallel beam after going out of the plano-convex lens 433G.

The whole red light emitted to the half-space from the red light-emitting portion 405R existing near the optical axis of the plano-convex lens 433R of the three-color light source tube 400 becomes a substantially parallel beam after going out of the plano-convex lens 433R. Then the red light is transmitted through and modulated by the whole of the red image display portion 421R displaying the image of the red component. Further, the red light is reflected by the mirror 435 at right angles, and then is reflected again by the dichroic prism 216 at right angles. The whole green light emitted to the half-space from the green light-emitting portion 405G existing near the optical axis of the plano-convex lens 433G of the three-color light source tube 400 becomes a substantially parallel beam after going out of the plano-convex lens 433G. Then the green light is transmitted through and modulated by the whole of the green image display portion 421G displaying the image of the green component. Further, the green light is reflected by the mirror 435 at right angles, and then is transmitted through the dichroic prism 216. The whole blue light emitted to the half-space from the blue light-emitting portion 405B existing near the optical axis of the plano-convex lens 433B of the three-color light source tube 400 becomes a substantially parallel beam after going out of the plano-convex lens 433B. Then the blue light is transmitted through and modulated by the whole of the blue image display portion 421B displaying the image of the blue component. Further, the blue light is reflected by the mirror 435 at right angles, and then is reflected again by the dichroic prism 216 at right angles.

The three-color image synthesized by the dichroic prism 216 is magnified and projected by the projection lens 502 to be displayed upon the screen. By the way, in the case of the above embodiment, the electron guns 408 operate by the principle of thermal electron emission. It goes without saying that those based on field-emission or photo-electron emission may be used.

In the case of the above embodiment, the red and blue images are reflected twice by the mirror 435 and the dichroic prism 216. The green image, however, is reflected only once by the mirror 435. Thus, the image upon the green image display portion 421G is displayed upon the liquid crystal light valve 420 in the mirror image relationship with respect to the images displayed upon the red and blue image display portions 421R and 421B.

As described above, the light source tube for emitting light of the three colors is accommodated within a single housing, and plano-convex lenses having convex surfaces of the ellipsoid of revolution are disposed on the front panel immediately in front of the light-emitting portions thereof. Thus, substantially one hundred percent of the light from the light-emitting portions of respective colors reaches the liquid crystal light valves and the screen. As a result the utilization efficiency of light is extremely enhanced, and the size of the projection type display device is reduced. Further, by adjusting the potential of the grid 411 of respective colors, the luminance of the red, green and blue components upon the screen can be adjusted independently of each other. Hence the adjustment of chromaticity such as the white balance can be effected without difficulty. Further, the light-emitting portions and the image forming portions for the three colors are disposed integrally upon the same plane, such that the optical alignment can be effected by an adjustment mechanism for adjusting a single light source tube. Thus, a low-cost and small projection type display device of high reliability can be realized.

Further, the optical distances from the respective three-color image display portions 421R, 421G, and 421B to the image synthesis points within the dichroic prism 216, hence the optical distances to the projection lens 502, are equal to each other. Thus the respective magnification factors and the image forming distances between the projection lens 502 and the projection screen are equal to each other. As a result, a high quality display is realized.

LIGHT SOURCE TUBE HAVING MATRIX-SHAPED PLANO-CONVEX LENS ARRAY

Figure 37:
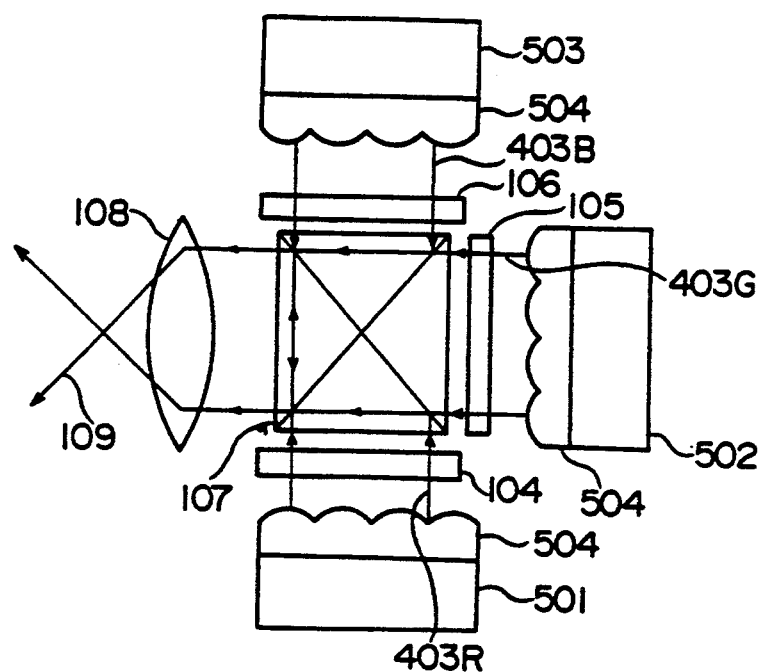
FIG. 37 is a side view showing the structure of the projection type display device having matrix-shaped plano-convex lens arrays.

FIG. 37 shows an embodiment according to this invention provided with light source tubes having a matrix-shaped plano-convex lens array. In the figure, the red light source tube 501 emits red light; the green light source tube 502 emits green light; and the blue light source tube 503 emits blue light. The light source tubes of respective colors are CRT type light source tubes capable of emitting light of a single color. The light-emitting portion of the light source tubes is divided into a four-by-four matrix. Upon the surface of the respective light source tubes is disposed a matrix-shaped plano-convex lens array 504. The red liquid crystal light valve 104 modulates the red light. The green light valve 105 modulates the green light. The blue light valve 106 modulates the blue light. The synthesis prism 107 synthesizes the modulated red, green and blue light. The projection lens 108 projects the synthesized light.

Figure 38:
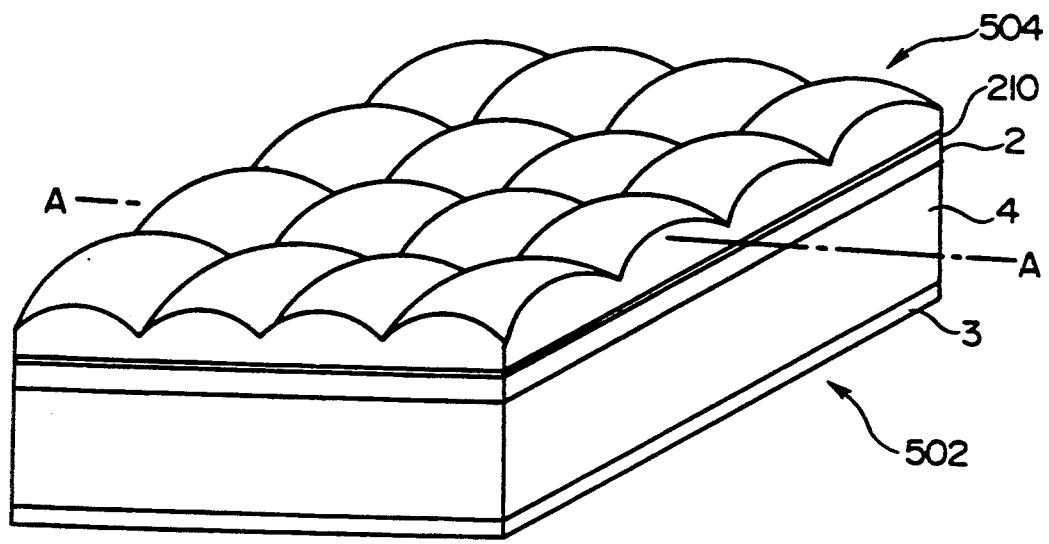
FIG. 38 is a perspective view of the light source tube of the projection type display device of FIG. 37.
Figure 39:
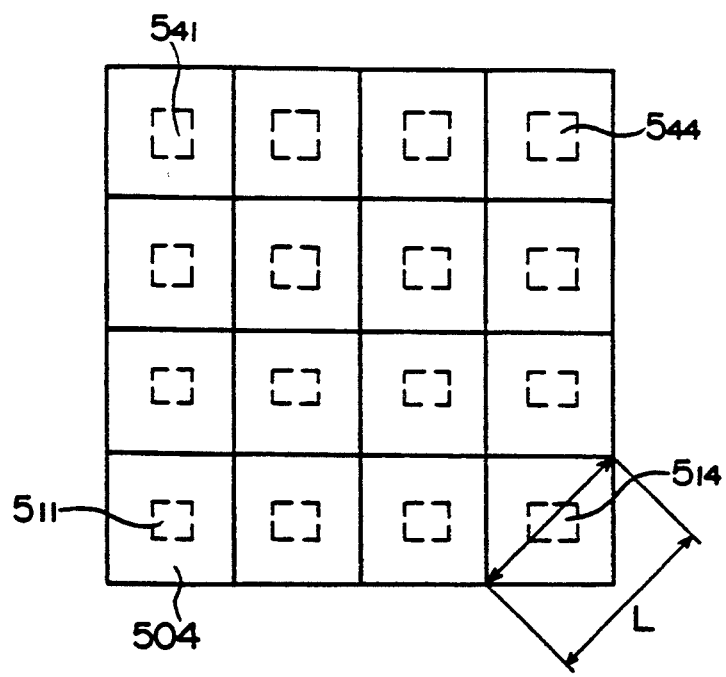
FIG. 39 is a front view of the light source tube of the projection type display device of FIG. 37.
Figure 40:
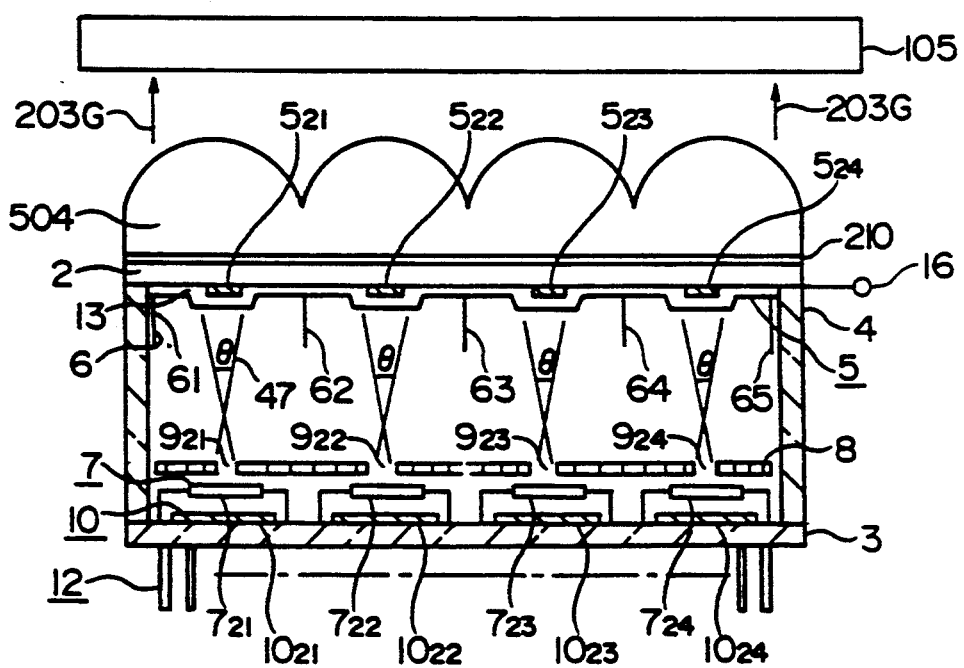
FIG. 40 is a sectional view along the line A—A in FIG. 38.

FIG. 38 is a perspective view of the green light source tube 502 having a matrix-shaped plano-convex lens array 504. FIG. 39 is a front view thereof as viewed from the side of the matrix-shaped plano-convex lens array. FIG. 40 is a sectional view thereof along the line A—A in FIG. 38. In the figures, the green light source tube 502 consisting of a glass tube or a vacuum container consists of and is sealed by the front panel 2, the back plate 3, and the tubular side plate 4. Upon the inner surface of the front panel 2 is disposed a light-emitting surface 5, which includes a four-by-four matrix of light-emitting portions $5_{11}$ through $5_{44}$ (of which the light-emitting portions $5_{21}$ through $5_{24}$ are shown in FIG. 39) disposed at equal intervals consisting of fluorescent layers emitting green light upon receiving an electron beam. The first and the second suffix of the light-emitting portions $5_{11}$ through $5_{44}$ correspond to the first through fourth rows and columns, respectively. The dimension of the respective light-emitting portions $5_{11}$ through $5_{44}$ disposed in matrix form is such that the length of the sides thereof is substantially shorter than the pitch length between the light-emitting portions $5_{11}$ through $5_{44}$. The anode group 6 consists of a plurality of acceleration anodes 61 through 65 disposed around the respective light-emitting portions $5_{11}$ through $5_{44}$ in correspondence therewith. A high voltage is applied to the acceleration anodes 61 through 65 via the external terminal 16. The aluminum pack layer 13 formed upon the surface of the light-emitting portions $5_{11}$ through $5_{44}$ is electrically connected to the acceleration anode group 6.

The cathode group 7 consists of the cathodes $7_{11}$ through $7_{44}$ for emitting electrons, disposed independently of each other in correspondence with the respective light-emitting portions $5_{11}$ through $5_{44}$ of the light-emitting surface 5. The cathodes $7_{11}$ through $7_{44}$ are supported at the two ends thereof by a pair of support members fixed upon the back plate 3. The first and the second suffixes of the cathodes $7_{11}$ through $7_{44}$ correspond to the first through fourth rows and columns, respectively. By the way, the cathodes $7_{11}$ through $7_{44}$ may be the indirect heating type consisting of a Ni sleeve coated with an oxide material, or the direct heating type consisting of a tungsten member coated with an oxide material. Through the control grid electrode 8 disposed between the cathode group 7 and the light-emitting surface 5 are formed the electron passage holes $9_{11}$ through $9_{44}$ in correspondence with the respective light-emitting portions $5_{11}$ through $5_{44}$, for passing the electron beams 47 from the respective cathodes $7_{11}$ through $7_{44}$. The first and the second suffixes of the electron passage holes $9_{11}$ through $9_{44}$ correspond to the first through fourth rows and columns, respectively.

The backside electrode group 10 consists of the back electrodes $10_{11}$ through $10_{44}$ disposed at the back side of the cathode group 7, namely, upon the back plate 3 constituting a part of the vacuum container, in correspondence with the respective light-emitting portions $5_{11}$ through $5_{44}$ of the light-emitting surface 5 to oppose therewith. The back electrodes $10_{11}$ through $10_{44}$ are made of layers of electrically conductive material such as Ag. To the respective back electrodes $10_{11}$ through $10_{44}$ are applied negative, zero, or positive voltages at several Volts relative to the cathodes through $7_{44}$, and the electron beams 47 emitted from the cathodes $7_{11}7_{11}$ through $7_{44}$ are thereby controlled individually. Further, to the control grid electrode 8 is applied a negative, zero, or a positive voltage at several Volts relative to the cathodes $7_{11}$ through $7_{44}$, and the electron beams 47 emitted from the cathodes $7_{11}$ through $7_{44}$ are thereby controlled as a whole. By the way, the leads 12 serve as the external connections through the back plate 3 for respective electrodes: the cathode group 7, the control grid electrode 8 and the backside electrode group 10. The foci of the matrix-shaped plano-convex lens array 504 formed by acrylic resin molding are aligned with the respective centers of the light-emitting portions $5_{11}$ through $5_{44}$. The matrix-shaped plano-convex lens array 504 includes plano-convex lenses each with a convex surface of an ellipsoid of revolution arranged in the form of four-by-four matrix. By the way, the respective plano-convex lenses are adjacent to the neighboring plano-convex lenses at the convex surface of the ellipsoid of revolution. Thus, the plano-convex lenses corresponding to respective light-emitting portions each have the form of a square when viewed from the side of the convex surface. The convex surface of the respective plano-convex lens has the form of the ellipsoid of revolution which is generated by rotating the ellipse shown in FIG. 41:

$$(x-c)^2/a^2 + y^2/b^2 = 1$$

If the length of the diagonal of the square of the respective plano-convex lens is represented by L and the irregular reflection of the plano-convex lens is represented by n, then $b \geq L/2$, $a = b\, n(n^2-1)^{-\frac{1}{2}}$, $c = b(n^2-1)^{-\frac{1}{2}}$. The matrix-shaped plano-convex lens array 504 and the front panel 2 are adhered to each other by means of the transparent adhesive 210 without an air gap formed therebetween. The reference numeral 105 in FIG. 40 represents green light valve.

Next, the operation is described. First, when the respective back electrodes $10_{11}$ through $10_{44}$ are at a negative potential relative to the cathodes $7_1$ through $7_{44}$, the cathodes $7_{11}$ through $7_{44}$ are surrounded by negative potential. The electrons from the respective cathodes $7_{11}$ through $7_{44}$ thus do not flow to the control grid electrode 8 and the acceleration anodes 61 through 64. The electrons are thus in the cut-off state. When a positive voltage from zero to several Volts is applied to the back electrodes $10_{11}$ through $10_{44}$ relative to the cathodes $7_{11}$ through $7_{44}$, the electron beams 47 emitted from the cathodes $7_{11}$ through $7_{44}$ begin to flow toward the control grid electrode 8. So long as the potential of the control grid electrode 8 is negative with respect to the cathodes $7_{11}$ through $7_{44}$, however, the electron beams 47 cannot pass through the electron passage holes $9_{11}$ through $9_{44}$ of the control grid electrode 8, and the electron beams 47 do not flow to the acceleration anodes 61 through 64. The respective light-emitting portions $5_{11}$ through $5_{44}$ Of the light-emitting surface 5 thus do not emit light. When a positive potential from zero to several Volts is applied to the control grid electrode 8 relative to the cathodes $7_{11}$ through $7_{44}$ the electron beams 47 pass through the electron passage holes $9_{11}$ through $9_{44}$ of the control grid electrode 8, to irradiate the respective light-emitting portions $5_{11}$ through $5_{44}$ through the aluminum pack layer 13 such that the light-emitting portions $5_{11}$ through $5_{44}$ emit light.

The electron beams 47 are formed into beams of predetermined diverging angle $\theta$, which is determined by various conditions such as the diameter of the electron passage holes $9_{11}$ through $9_{44}$ of the control grid electrode 8, the separation between the control grid electrode 8 and the cathodes $7_{11}$ through $7_{44}$, and the anode voltage. The electron beams 47 are irradiated over the respective whole surface of the light-emitting portions $5_{11}$ through $5_{44}$, It is assumed that the current level of the electron beams 47 is constant. Then, as the area of the respective light-emitting portions $5_{11}$ through $5_{44}$ decreases, the intensity of the electrons incident on the fluorescent layers of the respective light-emitting portions $5_{11}$ through $5_{44}$ increases and hence the light-emitting luminance of the respective light-emitting portions $5_{11}$ through $5_{44}$ also increases. As a result, the light-emitting portions $5_{11}$ through $5_{44}$ each having a small area situated at the focal positions of the plano-convex lenses of the matrix-shaped plano-convex lens array 504 emit light at an extremely high luminance.

Further, by adjusting the voltage at the control grid electrode 8, the luminance of the green light source tube 502 as a whole can be adjusted. Furthermore, by adjusting the voltages of the back electrodes $10_{11}$ through $10_{44}$ individually, the luminances of the respective light-emitting portions $5_{11}$ through $5_{44}$ can be adjusted independently of each other.

Figure 41:
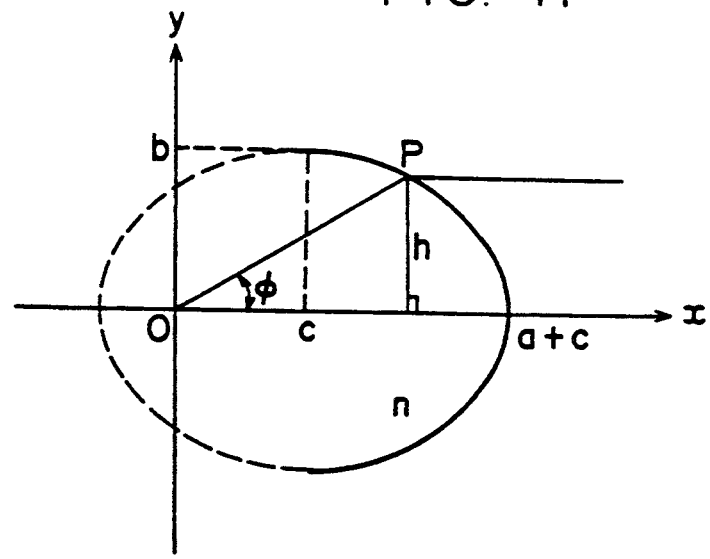
FIG. 41 is a view showing the ellipse for generating the convex surface of the matrix-shaped plano-convex lens array of the projection type display device of FIG. 37.

Thus, the respective light-emitting portions $5_{11}$ through $5_{44}$ each having a small area of the green light source tube 502 emit light at a high luminance. When viewed microscopically, there exists a gap of refractive index 1 between the fluorescent layers of the respective light-emitting portions $5_{11}$ through $5_{44}$ and the front panel 2. Thus, the light from the central portions of the respective light-emitting portions $5_{11}$ through $5_{44}$ emitting light at a high luminance is emitted to the whole half-space between the front panel 2 and the fluorescent layers immediately after the emission from the fluorescent layers. The light is then incident on the front panel 2 such that the whole flux proceeds within the cone of half-apex angle $\phi$ ($\phi = \sin^{-1}(1/n)$, where n is the refractive index of the front panel 2). Since the front panel 2, the transparent adhesive 210, and the matrix-shaped plano-convex lens array 504 have substantially the same refractive index, the whole flux proceeding within the cone of half-apex angle $\phi$ proceeds straight and most of the flux reaches the surface of the respective plano-convex lenses of the matrix-shaped plano-convex lens array 504. Since the surface of the plano-convex lenses has the form of ellipsoid of revolution, the flux becomes completely parallel after going out of the plano-convex lenses. It is assumed that the surface of the plano-convex lenses has the form of the ellipsoid of revolution as described above. Further, as shown in FIG. 41, the intersection of the ellipse and the line passing through the origin and exhibiting a slope: tan $\phi$ is represented by P, and the length of the line drawn from point P perpendicularly to the x-axis is represented by h. Then, if $h = L/2$, the square of the respective plano-convex lenses of the matrix-shaped plano-convex lens array 504 delimiting the convex surface of the ellipsoid of revolution is inscribed in the cone of half-apex angle $\phi$ containing the whole flux emitted from the optical axis. Thus, if this condition is satisfied, the greatest part of the flux from the respective light-emitting portions $5_{11}$ through $5_{44}$ is converted into parallel light beams. The parallel green light 403G is emitted from the whole surface of the matrix-shaped plano-convex lens array 504.

The description above relates to the green light source tube 502. In the case of the red light source tube 501 and the blue light source tube 503, the fluorescent layers of the light-emitting portions $5_{11}$ through $5_{44}$ are made of $Y_2O_2S:Eu^{3+}$ for the red light source tube 501, and ZnS:Ag, Cl for the blue light source tube 503. Otherwise, the structure is the same as for the green light source tube 502.

Figure 42:
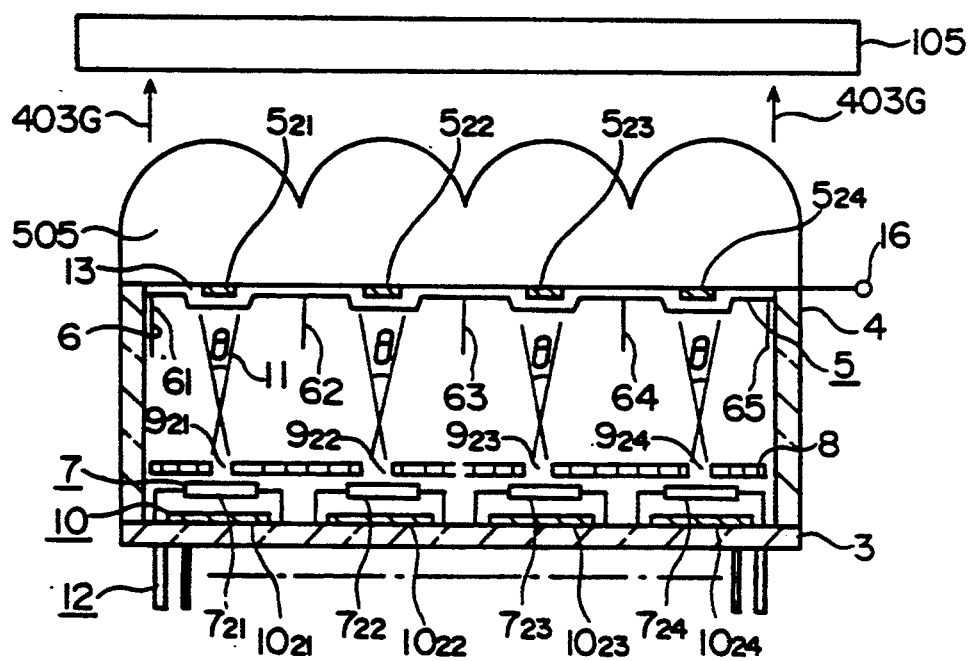
FIG. 42 is a sectional view showing the structure of another light source tube having matrix-shaped plano-convex lens arrays.

The embodiment of FIG. 42 operates similarly as the embodiment of FIG. 37 and exhibits the same meritorious effects. Further, since the adhesive which is necessary for the embodiment of FIG. 37 can be dispensed with, the reflection at the respective interfaces can be eliminated and the loss of light can thus be prevented. Further, the step of adhering the front panel to the matrix-shaped plano-convex lens array becomes unnecessary in the production thereof.

By the way, in the case of the embodiments of FIGS. 37 and 42, the plano-convex lenses of the matrix-shaped plano-convex lens array 504 and the light-emitting portions $5_{11}$ through $5_{44}$ are divided into a four-by-four matrix. However, the number of division is not limited to this. The division into an n times m matrix or an arbitrary two-dimensional arrangement may be used with the same meritorious effect.

By the way, in the case of the embodiments of FIGS. 37 and 42, the fluorescent layers of the light-emitting portions $5_{11}$ through $5_{44}$ are applied separately on the inner surface of the front panel in the form of four-by-four matrix. However, the fluorescent material may be applied over the whole interior surface of the front panel, provided that the electron beams are radiated exclusively upon the small areas arranged in the four-by-four or n times m matrix, thereby forming the light-emitting portions corresponding to the respective plano-convex lenses of the matrix-shaped plano-convex lens array 504. Then, the same meritorious effects can be obtained. In addition, the step of patterning the fluorescent material in the form of a matrix becomes unnecessary in the production steps.

Figure 43:
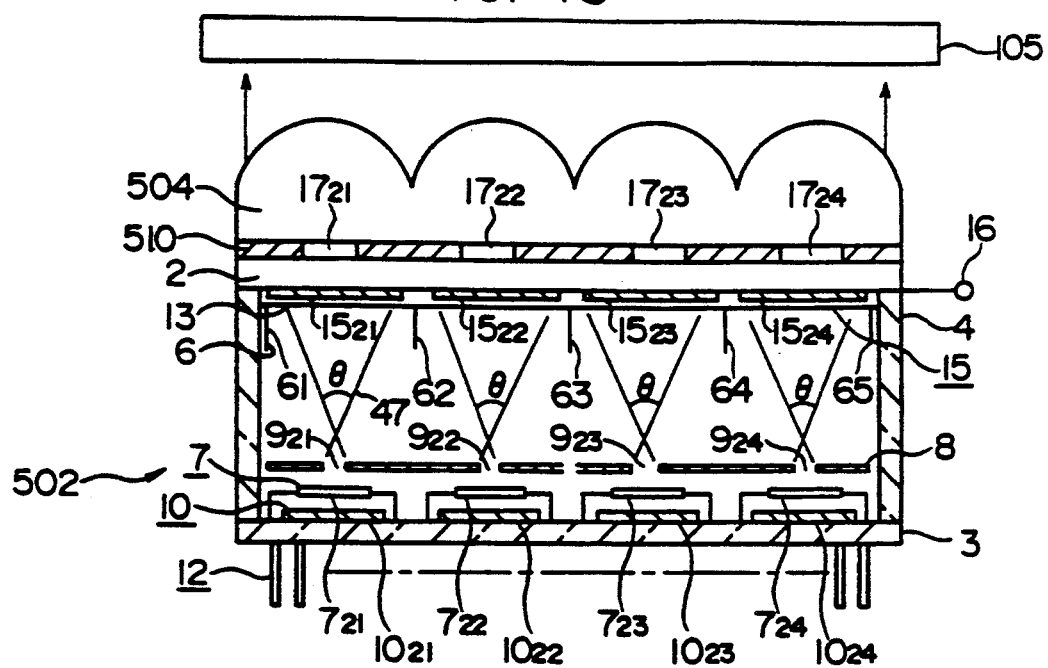
FIG. 43 is a sectional view showing the structure of still another light source tube having matrix-shaped plano-convex lens arrays.

A further embodiment is described by reference to FIG. 43. The structure of the projection type display device of FIG. 43 is the same as that of the embodiment of FIG. 37. FIG. 43 is a sectional view showing another embodiment of the structure in the neighborhood of the green light source tube 502 of FIG. 37. The green light source tube 502 is a CRT type light source tube by which the light-emitting portion is divided into a four-by-four matrix. Further, a matrix-shaped plano-convex lens array 504 is disposed upon the surface of the green light source tube 502.

In FIG. 43, the green light source tube 502 is constituted by a vacuum container or a glass tube consisting of and sealed by: the front panel 2, the back plate 3, and the tubular side plate 4. Upon the interior surface of the front panel 2 is formed the light-emitting surface 15, which consists of light-emitting portions $15_{11}$ through $15_{44}$ (in FIG. 43, only the light-emitting portions $15_{21}$ through $15_{24}$ are shown) made of fluorescent layers (ZnS:Au, Cu, Al) emitting green light upon receiving electron beam, disposed at equal intervals to form a four-by-four matrix. The first and the second suffixes of the light-emitting portions $15_{11}$ through $15_{44}$ correspond to the first through the fourth rows and columns, respectively, of the matrix. The length of the sides of the respective light-emitting portions $15_{11}$ through $15_{44}$ arranged in the matrix is substantially equal to the pitch length between the respective light-emitting portions $15_{11}$ through $15_{44}$. The parts 6, 61 through 65, 7, $7_{11}$ through $7_{44}$, 10, $10_{11}$ through $10_{44}$, 12, 13, 16, and 105 are identical to those of the embodiment of FIG. 37, and operate in a similar manner.

The matrix-shaped plano-convex lens array 504 formed by acrylic molding includes the plano-convex lenses having the convex surface of an ellipsoid of revolution having the foci at the centers of the respective light-emitting portions $15_{11}$ through $15_{44}$, arranged in the form of a four-by-four matrix. The respective plano-convex lenses are arranged at an equal pitch length such that the plano-convex lenses are in contact with the neighboring plano-convex lenses at the surface of ellipsoid of revolution. Thus, as in the case of the embodiment of FIG. 37, the respective plano-convex lenses corresponding to the respective light-emitting portions $15_{11}$ through $15_{44}$ have the form of a square when viewed from the side of the convex side. A diffusive reflection layer 510 disposed between the front panel 2 and the matrix-shaped plano-convex lens array 504 has apertures $17_{11}$ through $17_{44}$ formed therethrough arranged in the form of a four-by-four matrix. The first and the second suffixes of the apertures $17_{11}$ through $17_{44}$ correspond to the first through fourth rows and columns of the matrix, respectively. Further, the apertures are disposed at an equal pitch length such that the centers thereof are aligned on the optical axes of the respective plano-convex lenses of the matrix-shaped plano-convex lens array 504. Furthermore, the respective apertures $17_{11}$ through $17_{44}$ has the form of a disk with a radius equal to $t \cdot \tan \phi$ ($\phi = \sin^{-1}(1/n)$), where t is the thickness of the front panel 2 and n is the refractive index thereof. The diffusive reflection layer 510 is formed by applying, for example, magnesium oxide (MgO) upon the surface of the front panel 2. The matrix-shaped plano-convex lens array 504 is attached thereon by means of a transparent adhesive.

Next, the operation is described. In a manner similar to that of the embodiment of FIG. 37 described above, when the electron beams 47 are radiated upon the respective light-emitting portions $15_{11}$ through $15_{44}$, the green light is emitted from the whole surface thereof toward the front panel 2. First, the light emitted from the fluorescent layers (at the focal positions) of the respective light-emitting portions $15_{11}$ through $15_{44}$ upon the optical axes of the respective piano,convex lenses of the matrix-shaped plano-convex lens array 504 proceeds as follows.

Microscopically, there exists space of refractive index 1 between the fluorescent layers of the respective light-emitting portions $15_{11}$ through $15_{44}$ and the front panel 2. Thus, the light emitted from these light-emitting parts is emitted to the whole half-space between the front panel 2 and the respective light-emitting portions $15_{11}$ through $15_{44}$. Immediately thereafter, the light is incident upon the front panel 2, and then the whole flux proceeds within the cone of half-apex angle $\phi$ ($\phi = \sin^{-1}(1/n)$ where n is the refractive index of the front panel 2). The respective apertures $17_{11}$ through $17_{44}$ of the diffusive reflection layer 510 have the form of a disk of radius $t \cdot \tan \phi$, where t is the thickness of the front panel 2. Thus, the whole light emitted from the light-emitting points reaches the surface of the respective plano-convex lenses of the matrix-shaped plano-convex lens array 504 without being screened off by the diffusive reflection layer 510. The light becomes completely parallel after going out of the plano-convex lenses, since the surface of the plano-convex lenses has the form of an ellipsoid of revolution.

On the other hand, the light emitted from the points other than the points opposing the respective apertures $17_{11}$ through $17_{44}$ of the respective light-emitting portions $15_{11}$ through $15_{44}$ proceeds within the cones of half-apex angle $\phi$ within the front panel 2, and then hits upon the diffusive reflection layer 510 to undergo an irregular reflection. A portion of the light again undergoes an irregular reflection at the interface of the front panel 2 at the side of the fluorescent layer or at the fluorescent layer. Thus, the light emitted from points other than at the apertures $17_{11}$ through $17_{44}$ repeats irregular reflections at the two interfaces of the front panel 2. Only the light reaching the central portions of the respective apertures $17_{11}$ through $17_{44}$ passes through the apertures $17_{11}$ through $17_{44}$ of the diffusive reflection layer 510 and reaches the surface of the respective plano-convex lenses of the matrix-shaped plano-convex lens array 504, to be emitted therefrom as completely parallel light beam.

Thus, the light passing through the respective apertures $17_{11}$ through $17_{44}$ of the diffusive reflection layer 510 and reaching the surface of the respective plano-convex lenses of the matrix-shaped plano-convex lens array 504 to go out therefrom is the sum of light directly coming from the central points at the apertures $17_{11}$ through $17_{44}$ and the multiple reflection light from other points. Thus the green light is radiated at a high luminance. The parallel green light 403G is emitted from the whole surface of the matrix-shaped plano-convex lens array 504.

In the above, the case of the green light source tube 502 has been described. In the case of the red light source tube 501 and the blue light source tube 503, the fluorescent layers of the light-emitting portions $5_{11}$ through $5_{44}$ are made of $Y_2O_2S:Eu^{3+}$ and ZnS:Ag, Cl, respectively, for the red light source tube 501 and the blue light source tube 503. The red light 403R and the blue light 403B are thus emitted from the whole surface of the matrix-shaped plano-convex lens array 504.

The parallel red light 403R is reflected by the mirror 401A and then transmits through the whole of the image forming portion of the red liquid crystal light valve 104 on which the image of the red component is displayed. The red light is then reflected by the synthesis prism 107. The parallel green light 403G transmits through the whole of the image forming portion of the green light valve 105 on which the image of the green component is displayed. The green light is then transmitted through the synthesis prism 107. The parallel blue light 403B is reflected by the mirror 401B and then transmits through the whole of the image forming portion of the blue light valve 106 on which the image of the blue component is displayed. The blue light is then reflected by the synthesis prism 107. The image thus synthesized by the synthesis prism 107 is magnified by the projection lens 108 and the resulting projection light 109 is projected upon the screen (not shown).

As described above, the light-emitting portion corresponding to a single light valve of the light source tube is divided into a plurality of units. Further, the matrix-shaped plano-convex lens array, consisting of a plurality of plano-convex lenses each having a convex surface of an ellipsoid of revolution, is disposed in correspondence with the positions of the light-emitting portions divided into a plurality, at the side the light valve of the light source tube. Thus, the light emitted from the matrix-shaped plano-convex lens array is parallel, and substantially one hundred percent of the light reaches the screen through the image forming portions of the liquid crystal light valves. The utilization efficiency of the light is thus extremely high. Further, as in the case of the embodiment of FIG. 37, the light-emitting portions and the plano-convex lenses are divided and hence the diameter of the respective plano-convex lenses is reduced. As a result, the thickness of the plano-convex lenses is reduced and hence the light source tube is made thin and small. Further, in accordance with this embodiment, electron beams irradiates upon a plurality of light-emitting portions of a large area for obtaining a predetermined amount of light. The emitted light repeats multiple reflections at the fluorescent surface and the reflective layers, and goes out through a plurality of apertures as a synthesized light. Thus the intensity of irradiation electron beam is reduced. Thus the life of the fluorescent substance and hence that of the light source tube are prolonged.

By the way, in the case of the embodiments of FIG. 43, the plano-convex lenses of the matrix-shaped plano-convex lens array 504, the apertures $17_{11}$ through $17_{44}$ of the diffusive reflection layer 510, and the light-emitting portions $15_{11}$ through $15_{44}$ are divided into a four-by-four matrix. However, the number of division is not limited to this. The division into an n times m matrix or an arbitrary two-dimensional arrangement may be used with the same meritorious effect.

By the way, in the case of the embodiments of FIG. 43, the fluorescent layers of the light-emitting portions $15_{11}$ through $15_{44}$ are applied separately on the inner surface of the front panel in the form of four-by-four matrix. However, the fluorescent material may be applied over the whole interior surface of the front panel, provided that the electron beams are radiated exclusively upon the areas arranged in the four-by-four or n times m matrix, such that the predetermined areas including the neighborhood of the apertures $17_{11}$ through $17_{44}$ corresponding to the apertures $17_{11}$ through $17_{44}$ of the diffusive reflection layer 510 emit light. Then, the same meritorious effects can be obtained. In addition, the step of patterning the fluorescent material in the form of a matrix becomes unnecessary in the production steps.

A further embodiment according to this invention is described by reference to FIGS. 44 and 45.

Figure 44:
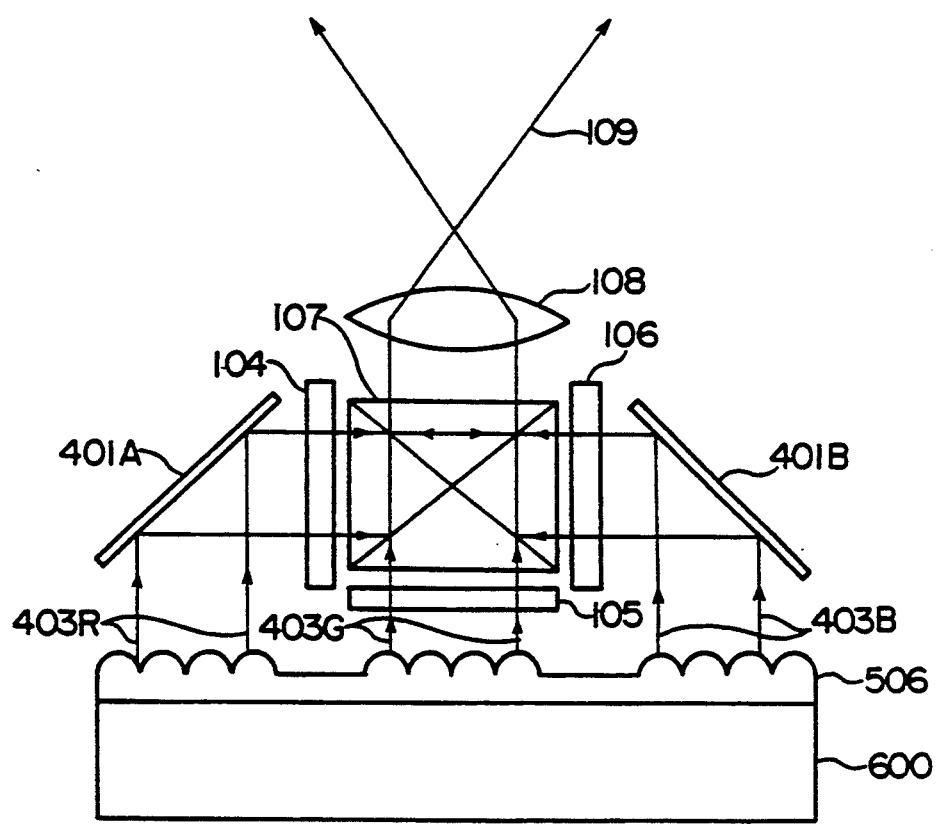
FIG. 44 is a sectional view showing the structure of a further light source tube having a matrix-shaped plano-convex lens array.

FIG. 44 shows another embodiment of the projection type display device provided with a matrix-shaped plano-convex lens array according to this invention. In the figure, the reference numeral 600 represents a three-color light source tube. The matrix-shaped plano-convex lens array 506 is formed by acrylic molding. The reference numerals 401A and 401B represent mirrors. The red liquid crystal light valve 104 modulates the red light. The green light valve 105 modulates the green light. The blue light valve 106 modulates the blue light. The synthesis prism 107 synthesizes the modulated red, green and blue light. The projection lens 108 projects the synthesized light.

Figure 45:
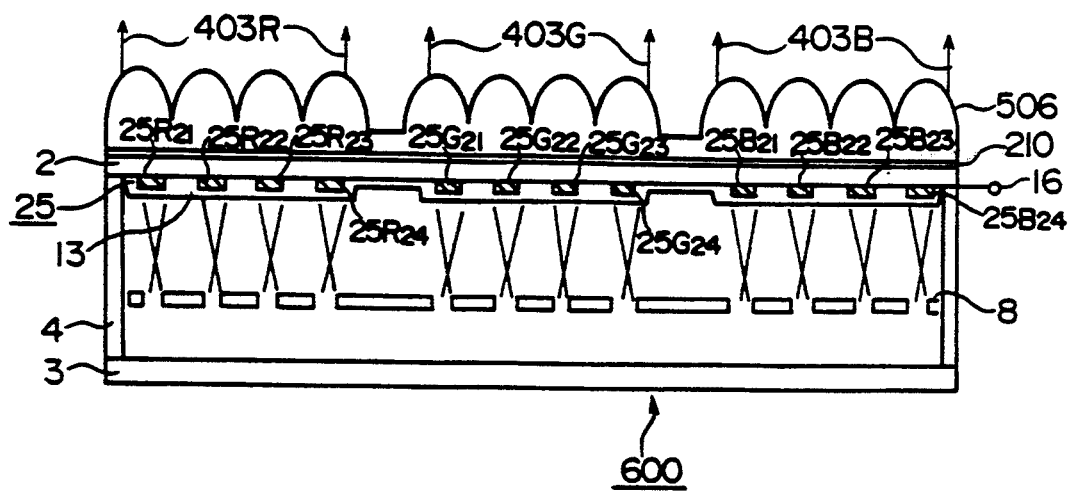
FIG. 45 is a sectional view showing the structure of still another light source tube having matrix-shaped plano-convex lens arrays.

FIG. 45 is a sectional view showing the structure of the three-color light source tube of FIG. 44. In FIG. 45 the three-color light source tube 600 is constituted by a vacuum container or a glass tube consisting of and sealed by: the front panel 2, the back plate 3, and the tubular side plate 4. Upon the interior surface of the front panel 2 is formed the fluorescent layers 25, which include: red light-emitting portions $25R_{11}$ through $25R_{44}$ (of which only the light-emitting portions $25R_{21}$ through $25R_{24}$ are shown in FIG. 45) consisting of fluorescent layers ($Y_2O_2S:Eu^{3+}$) emitting red light upon receiving electron beam, arranged at an equal pitch length in the form of four-by-four matrix; green light-emitting portions $25G_{11}$ through $25G_{44}$ (of which only the-light-emitting portions $25G_{21}$ through $25G_{24}$ are shown in FIG. 45) consisting of fluorescent layers (ZnS:Au, Cu, Al) emitting green light upon receiving electron beam, arranged at an equal pitch length in the form of four-by-four matrix; and blue light-emitting portions $25B_{11}$ through $25B_{44}$ (of which only the light-emitting portions $25B_{21}$ through $25B_{24}$ are shown in FIG. 45) consisting of fluorescent layers (ZnS:Ag, Cl) emitting blue light upon receiving electron beam, arranged at an equal pitch length in the form of four-by-four matrix. The length of the sides of the respective light-emitting portions $25R_{11}$ through $25R_{44}$, $25G_{11}$ through $25G_{44}$, and $25B_{11}$ through $25B_{44}$ are substantially smaller than the pitch length between the respective light-emitting portions $25R_{11}$ through $25R_{44}$, $25G_{11}$ through $25G_{44}$, and $25B_{11}$ through $25B_{44}$.

The first and the second suffixes of the respective light-emitting portions $25R_{11}$ through $25R_{44}$, $25G_{11}$ through $25G_{44}$, and $25B_{11}$ through $25B_{44}$ correspond to the first through fourth rows and columns of the matrix, respectively. Upon the inner surface of the front panel 2 are disposed four rows times twelve columns of small light-emitting portions. The first through fourth columns emit red light. The fifth through eighth columns emit green light. The ninth through twelfth columns emit blue light. The interior structure of the three-color light source tube 600 is the same as that of the embodiment of FIG. 37. The aluminum pack layer 13 is applied on the surfaces of the respective light-emitting portions $25R_{11}$ through $25R_{44}$, $25G_{11}$ through $25G_{44}$, and $25B_{11}$ through $25B_{44}$, and is electrically connected to the electrode group for acceleration (not shown), such that a high voltage is applied thereto via the external terminal 16. Further, upon the back plate 3 are disposed four times twelve units of the cathode electrode group and the back electrode group (not shown), thereby emitting electron beams for irradiating the respective light-emitting portions $25R_{11}$ through $25R_{44}$, $25G_{11}$ through $25G_{44}$, and $25B_{11}$ through $25B_{44}$ through the four times twelve electron passage holes formed through the control grid electrode 8. The matrix-shaped plano-convex lens array 506 formed by acrylic molding consists of plano-convex lenses having the convex surface of an ellipsoid of revolution arranged in the form of four-by-twelve matrix, the foci thereof being positioned at the center of the respective light-emitting portions $25R_{11}$ through $25R_{44}$, $25G_{11}$ through $25G_{44}$, and $25B_{11}$ through $25B_{44}$. The matrix-shaped plano-convex lens array 506 is attached to the front panel 2 by means of the transparent adhesive 210.

Next the operation is described. In the case of the three-color light source tube 600 according to this embodiment, in a manner similar to that of the embodiment of FIG. 37, the light of respective colors emitted respectively from the light-emitting portions $25R_{11}$ through $25R_{44}$, $25G_{11}$ through $25G_{44}$, and $25B_{11}$ through $25B_{44}$ becomes parallel after going through the matrix-shaped plano-convex lens array 506. Namely, from the first through fourth rows and the first through fourth columns of the matrix-shaped plano-convex lens array 506 upon the front panel 2 of the three-color light source tube 600 is emitted the red parallel light beam 403R; from the plano-convex lenses of the first through fourth rows and the fifth through eighth columns is emitted the green parallel light beam 403G; and from the plano-convex lenses of the first through fourth rows and the ninth through twelfth columns is emitted the blue parallel light beam 403B.

The parallel red light 403R is reflected by the mirror 401A and then transmits through the whole of the image forming portion of the red liquid crystal light valve 104 on which the image of the red component is displayed. The red light is then reflected by the synthesis prism 107. The parallel green light 403G transmits through the whole of the image forming portion of the green light valve 105 on which the image of the green component is displayed. The green light is then transmitted through the synthesis prism 107. The parallel blue light 403B is reflected by the mirror 401B and then transmits through the whole of the image forming portion of the blue light valve 106 on which the image of the blue component is displayed. The blue light is then reflected by the synthesis prism 107. The image thus synthesized by the synthesis prism 107 is magnified by the projection lens 108 and the resulting projection light 109 is projected upon the screen (not shown).

Figure 46:
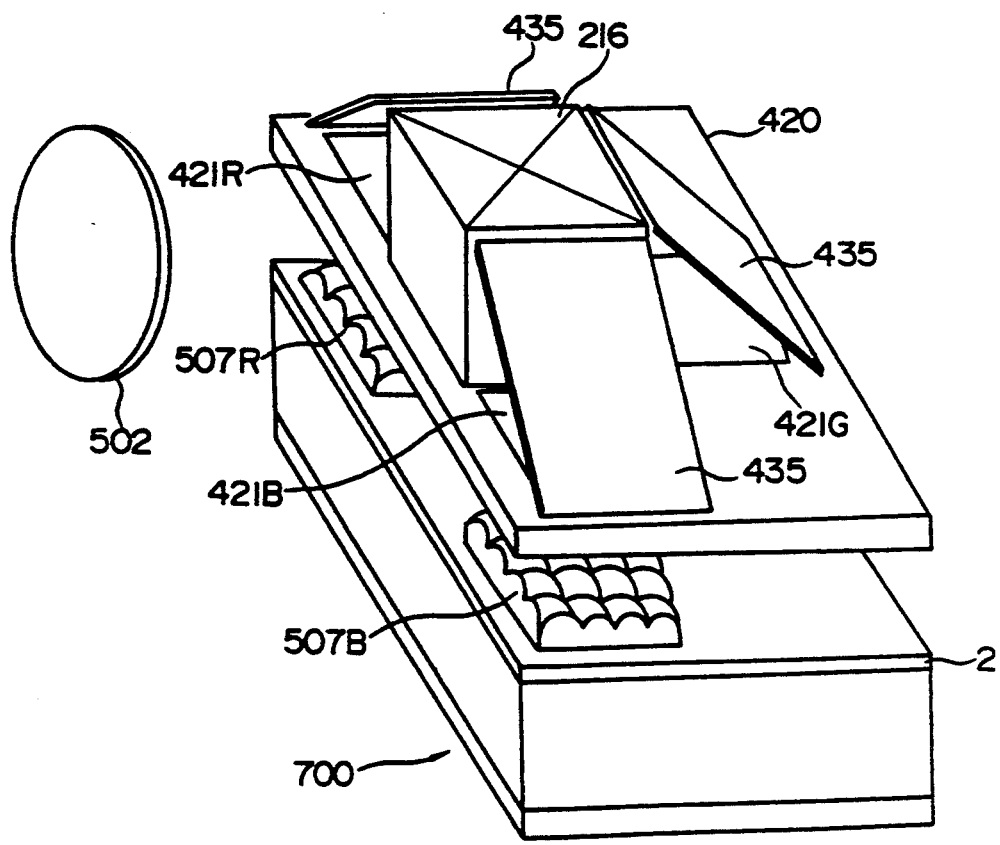
FIG. 46 is a sectional view showing the structure of a further light source tube having matrix-shaped plano-convex lens arrays.

FIG. 46 is a perspective view showing the structure of a projection type display device according to another embodiment. The reference numeral 700 represents the three-color light source tube. The dichroic prism 216, the projection lens 502, the mirror 435, and the liquid crystal light valve 420 are identical to those of FIGS. 32 and 33 and operate in a similar manner. The three-color light source tube 700 has a structure similar to that of the three-color light source tube 600 of FIGS. 44 and 45, and the red light-emitting portions $25R_{11}$ through $25R_{44}$, the green light-emitting portions $25G_{11}$ through $25G_{44}$, and the blue light-emitting portions $25B_{11}$ through $25B_{44}$ upon the inner surface of the front panel 2 as described above are disposed at parts opposing the red image display portion 421R, the green image display portion 421G, and the blue image display portion 421B of the liquid crystal light valve 420. The matrix-shaped plano-convex lens arrays 507R, 507G (not shown), and 507B made of acrylic molding include plano-convex lenses having a convex surface of an ellipsoid of revolution arranged in the form of four-by-four matrix, the foci thereof being positioned at the centers of the respective light-emitting portions $25R_{11}$ through $25R_{44}$, $25G_{11}$ through $25G_{44}$, and $25B_{11}$ through $25B_{44}$. The matrix-shaped plano-convex lens array 507R is attached to the front panel 2 by means of a transparent adhesive, between the red image display portion 421R and the red light-emitting portions $25R_{11}$ through $25R_{44}$. The matrix-shaped plano-convex lens array 507G is attached to the front panel 2 by means of a transparent adhesive between the green image display portion 421G and the green light-emitting portions $25G_{11}$ through $25G_{44}$. The matrix-shaped plano-convex lens array 507B is attached to the front panel 2 by means of a transparent adhesive between the blue image display portion 421B and the blue light-emitting portions $25B_{11}$ through $25B_{44}$. The three-color light source tube 700, the matrix-shaped plano-convex lens arrays 507R, 507G, and 507B operate similarly as the three-color light source tube 600 and the matrix-shaped plano-convex lens array 506 of the embodiment of FIGS. 44 and 45. Red parallel light is emitted from the matrix-shaped plano-convex lens array 507R upon the front panel 2 of the three-color light source tube 700. Green parallel light is emitted from the matrix-shaped plano-convex lens array 507G. Blue parallel light is emitted from the matrix-shaped plano-convex lens array 507B.

The red parallel light is transmitted through and modulated by the whole of the red image display portion 421R of the liquid crystal light valve 420 on which the image of the red component is displayed, then, the red light is reflected at right angles by the mirror 435, and reflected again at right angles by the dichroic prism 216. The green parallel light is transmitted through and modulated by the whole of the green image display portion 421G of the liquid crystal light valve 420 on which the image of the green component is displayed, then, the green light is reflected at right angles by the mirror 435, and transmitted through the dichroic prism 216. The blue parallel light is transmitted through and modulated by the whole of the blue image display portion 421B of the liquid crystal light valve 420 on which the image of the blue component is displayed, then, the blue light is reflected at right angles by the mirror 435, and reflected again at right angles by the dichroic prism 216. The images of three colors synthesized by the dichroic prism 216 is magnified by the projection lens 502 and is projected and displayed upon the screen.

As described above the light-emitting portion of the light source tube corresponding to a light valve of a single color is divided into a plurality of units. Further, the matrix-shaped plano-convex lens array consisting of a plurality of plano-convex lenses each having a convex surface of an ellipsoid of revolution is disposed in correspondence with the positions of the light-emitting portions divided into a plurality, at the side the light valve of the light source tube. Furthermore, the light source tube for emitting light of three colors is accommodated within a single housing. Thus the utilization efficiency of the light is enhanced, the number of parts is reduced, and the high voltage wirings can be unified into a single line. In addition, a single adjustment mechanism for adjusting the position of a single light source tube is sufficient for positioning the directions of the light-emitting surfaces upon synthesizing the projected light of respective colors. Hence, the size of the light source tube and the projection type display device can be substantially reduced.

We claim:

1. A projection type display device comprising:
   a light source tube including electron beam generation means and a light-emitting portion consisting of a fluorescent layer emitting light by means of electron beam excitation;
   a light valve for forming an optical image corresponding to a picture signal; and
   an optical system for projecting upon a screen said optical image of said light valve;
   wherein said projection type display device comprises a light-condensing optical system for condensing said light emitted from said light-emitting portion toward said light valve disposed between said light valve and said light-emitting portion.

2. A projection type display device as claimed in claim 1, wherein said light-emitting portion has an area less than said area of said light valve.

3. A projection type display device as claimed in claim 1, wherein said light-condensing optical system includes a convex lens for condensing said light from said light-emitting portion.

4. A projection type display device as claimed in claim 3, wherein a surface of said convex lens at a side of said light valve has a form of an ellipsoid of revolution.

5. A projection type display device as claimed in claim 3, wherein said convex lens is a plano-convex lens disposed adjacent to said light source tube, which has a planar surface at a side facing said light source tube and a convex surface at a side facing said light valve.

6. A projection type display device as claimed in claim 5, wherein said plano-convex lens has a form of a cone by which a cross-sectional area perpendicular to an optical axis at a side of said light valve decreases in a direction away from said convex side toward said planar side.

7. A projection type display device as claimed in claim 3, wherein said light-condensing optical systems includes reflection means for reflecting said diffusing light emitted from said light-emitting portion and for condensing said light toward said light valve.

8. A projection type display device as claimed in claim 7, wherein said reflection means includes a reflection layer disposed between said light-emitting portion and said convex lens to oppose said light-emitting portion, said reflection layer having an aperture centered at said optical axis of said convex lens.

9. A projection type display device as claimed in claim 8, wherein said reflection layer has a form of a paraboloid of rotation.

10. A projection type display device as claimed in claim 8, wherein said light-emitting portion is formed into a concave surface with respect to said aperture.

11. A projection type display device as claimed in claim 8, wherein an interference multi-layer film is disposed on said front portion of said fluorescent layer.

12. A projection type display device comprising:
    a light source tube including within a single housing an electron beam generation means and a plurality of light-emitting portions of differing colors each consisting of a fluorescent layer emitting light of a respectively distinct color by means of electron beam excitation, said plurality of light-emitting portions being of a number equal to the number of distinct colors;
    light valves for forming optical images corresponding to picture signals of said respective colors;
    an optical element for synthesizing optical images of distinct colors of said light valves made by a plurality of light beams irradiated from said light source; and
    an optical system for guiding said light synthesized by said optical element to a screen.

13. A projection type display device as claimed in claim 12, wherein said light source tube comprises:
    a first control means for adjusting said light-emitting luminance of all colors simultaneously; and
    a second control means for adjusting said light-emitting luminance of respective colors independently.

14. A projection type display device as claimed in claim 12, further comprising:
    a light-condensing optical system for condensing a diffusing light emitted from said plurality of light emitting portion to said light valves, respectively, disposed between said light valves and said light-emitting portion.

15. A projection type display device as claimed in claim 12, wherein an area of said light-emitting portions is smaller than an area of said light valves.

16. A projection type display device as claimed in claim 14, wherein said light-condensing optical system includes a plurality of convex lenses disposed respectively on said light source tube opposing said light valves in alignment with said plurality of light-emitting portions.

17. A projection type display device as claimed in claim 16, said light-condensing optical system includes reflection means for reflecting said diffusing light emitted from said plurality of light-emitting portions, and for condensing said light toward said light valves.

18. A projection type display device as claimed in claim 17, wherein said reflection means includes a reflection layer disposed between said plurality of light-emitting portions and said plurality of convex lenses to oppose said light-emitting portions, said reflection layer having a plurality of apertures centered at said optical axes of respective convex lenses.

19. A projection type display device as claimed in claim 17, wherein said plurality of light-emitting portions emitting portions of distinct colors are divided into a plurality of matrix forms, and said plurality of convex lenses are each provided with a matrix-shaped lens array corresponding to respective light-emitting portions divided into said plurality of matrix forms.

* * * * *